US011937539B2

(12) United States Patent
Kulkarni et al.

(10) Patent No.: US 11,937,539 B2
(45) Date of Patent: Mar. 26, 2024

(54) SENSOR FUSION FOR LOCALIZATION AND PATH PLANNING

(71) Applicant: Samsung Electronics Co., Ltd., Suwon-si (KR)

(72) Inventors: Mandar N. Kulkarni, Richardson, TX (US); Yuming Zhu, Plano, TX (US); Neha Dawar, Plano, TX (US); Songwei Li, Lewisville, TX (US); Boon L. Ng, Plano, TX (US); Jianzhong Zhang, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 314 days.

(21) Appl. No.: 17/003,834

(22) Filed: Aug. 26, 2020

(65) Prior Publication Data
US 2021/0064043 A1 Mar. 4, 2021

Related U.S. Application Data

(60) Provisional application No. 62/966,769, filed on Jan. 28, 2020, provisional application No. 62/941,126, (Continued)

(51) Int. Cl.
A01D 34/00 (2006.01)
G05D 1/00 (2006.01)
(Continued)

(52) U.S. Cl.
CPC ......... *A01D 34/008* (2013.01); *G05D 1/0214* (2013.01); *G05D 1/0227* (2013.01); (Continued)

(58) Field of Classification Search
CPC .. G05D 1/0214; G05D 1/0227; G05D 1/0274; G05D 2201/0208; G05D 1/0268;
(Continued)

(56) References Cited

U.S. PATENT DOCUMENTS 1,037,038 A 8/1912 Mott
6,377,888 B1 4/2002 Olch
(Continued)

FOREIGN PATENT DOCUMENTS

CN 109000660 A 12/2018
JP 2007-141108 A 6/2007
(Continued)

OTHER PUBLICATIONS

International Search Report and Written Opinion of the International Searching Authority dated Nov. 20, 2020 in connection with International Application No. PCT/KR2020/011577, 8 pages.
(Continued)

*Primary Examiner* — Jeff A Burke
*Assistant Examiner* — Sihar A Karwan

(57) ABSTRACT

An electronic device includes a first set of sensors configured to generate motion information. The electronic device also includes a second set of sensors configured to receive information from multiple anchors. The electronic device further includes a processor configured to generate a path to drive the electronic device within an area. The processor is configured to receive the motion information. The processor is configured to generate ranging information based on the information that is received. While the electronic device is driven along the path, the processor is configured to identify a location and heading direction within the area of the electronic device based on the motion information. The processor is configured to modify the estimate of location and the heading direction of the electronic device based on the ranging information. The processor is configured to drive within the area according to the path, based on the location and heading direction.

20 Claims, 36 Drawing Sheets

Related U.S. Application Data filed on Nov. 27, 2019, provisional application No. 62/938,509, filed on Nov. 21, 2019, provisional application No. 62/892,762, filed on Aug. 28, 2019.

(51) Int. Cl.
  *G05D 1/02* (2020.01)
  *G06F 18/22* (2023.01)
  *G06V 10/80* (2022.01)
  *G06V 20/58* (2022.01)
  *H04W 84/18* (2009.01)
  *A01D 101/00* (2006.01)

(52) U.S. Cl.
  CPC ........... *G05D 1/0274* (2013.01); *G06F 18/22* (2023.01); *G06V 10/803* (2022.01); *G06V 20/58* (2022.01); *H04W 84/18* (2013.01); *A01D 2101/00* (2013.01); *G05D 2201/0208* (2013.01)

(58) Field of Classification Search
  CPC .. G05D 1/028; A01D 34/008; A01D 2101/00; G06K 9/6215; G06K 9/6289; H04W 84/18; G06V 2201/10; G06V 10/803; G06V 20/58
  See application file for complete search history.

(56) References Cited

U.S. PATENT DOCUMENTS

| | | | |
|---|---|---|---|
| 8,938,318 B2 | 1/2015 | Bergstrom et al. | |
| 9,510,505 B2 | 12/2016 | Halloran et al. | |
| 9,826,678 B2 | 11/2017 | Balutis et al. | |
| 9,854,737 B2 | 1/2018 | Yamauchi et al. | |
| 10,029,368 B2 * | 7/2018 | Wolowelsky | B25J 9/0003 |
| 10,353,399 B2 * | 7/2019 | Ebrahimi Afrouzi | G05D 1/0219 |
| 11,178,811 B2 | 11/2021 | Ko et al. | |
| 11,266,067 B2 | 3/2022 | Ko et al. | |
| 2009/0262710 A1 * | 10/2009 | Doi | H04W 56/001 370/336 |
| 2012/0290165 A1 * | 11/2012 | Ouyang | A01D 34/008 701/25 |
| 2013/0030609 A1 | 1/2013 | Jagenstedt | |
| 2013/0110322 A1 | 5/2013 | Jagenstedt et al. | |
| 2014/0102061 A1 | 4/2014 | Sandin et al. | |
| 2014/0159888 A1 | 6/2014 | Gauger et al. | |
| 2016/0100522 A1 | 4/2016 | Yamauchi et al. | |
| 2016/0349362 A1 | 12/2016 | Rorh et al. | |
| 2017/0042087 A1 | 2/2017 | Ohrlund et al. | |
| 2017/0357006 A1 * | 12/2017 | Öhrlund | G01S 19/49 |
| 2018/0257502 A1 | 9/2018 | Park | |
| 2018/0267552 A1 * | 9/2018 | Artes | G05D 1/0219 |
| 2019/0294172 A1 * | 9/2019 | Liu | G05D 1/0246 |
| 2019/0378360 A1 * | 12/2019 | Bergenholm | G05D 1/027 |
| 2020/0041601 A1 | 2/2020 | Ko et al. | |
| 2021/0064043 A1 | 3/2021 | Kulkarni et al. | |
| 2021/0168996 A1 | 6/2021 | Lee et al. | |

FOREIGN PATENT DOCUMENTS

| | | |
|---|---|---|
| JP | 2021-093032 A | 6/2021 |
| KR | 10-2003-0049319 A | 6/2003 |
| KR | 10-2021-0059839 A | 5/2021 |
| KR | 10-2021-0071383 A | 6/2021 |
| WO | 2017/167207 A1 | 10/2017 |
| WO | 2019/068175 A1 | 4/2019 |

OTHER PUBLICATIONS

Extended European Search Report dated Jul. 28, 2022 regarding Application No. 20858207.2, 10 pages.
International Search Report and Written Opinion dated Dec. 28, 2023 regarding International Application No. PCT/KR2022/015293, 7 pages.

* cited by examiner

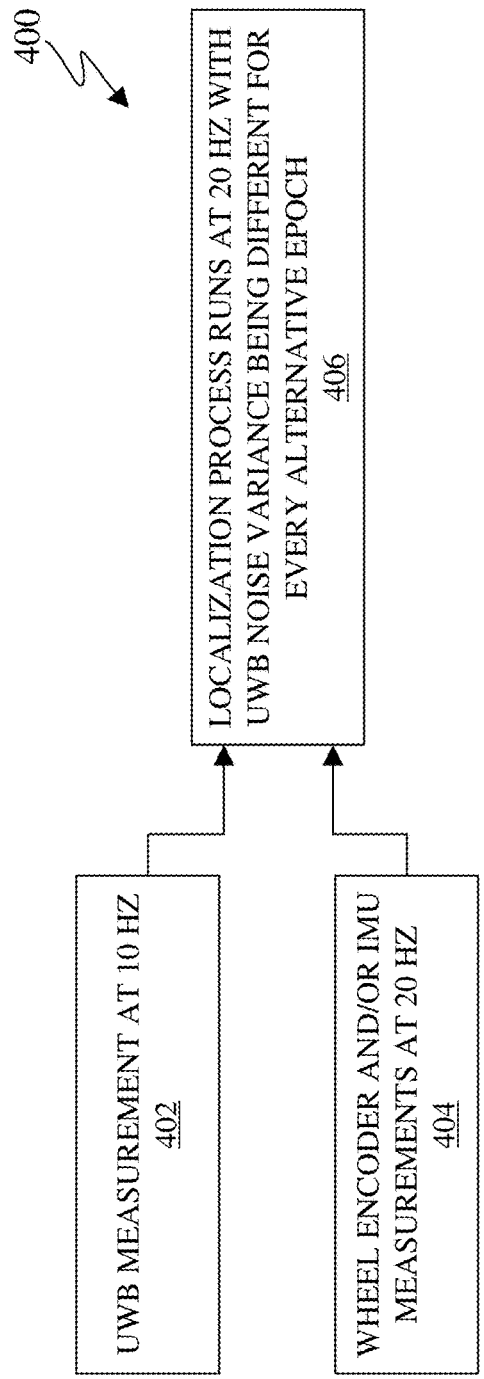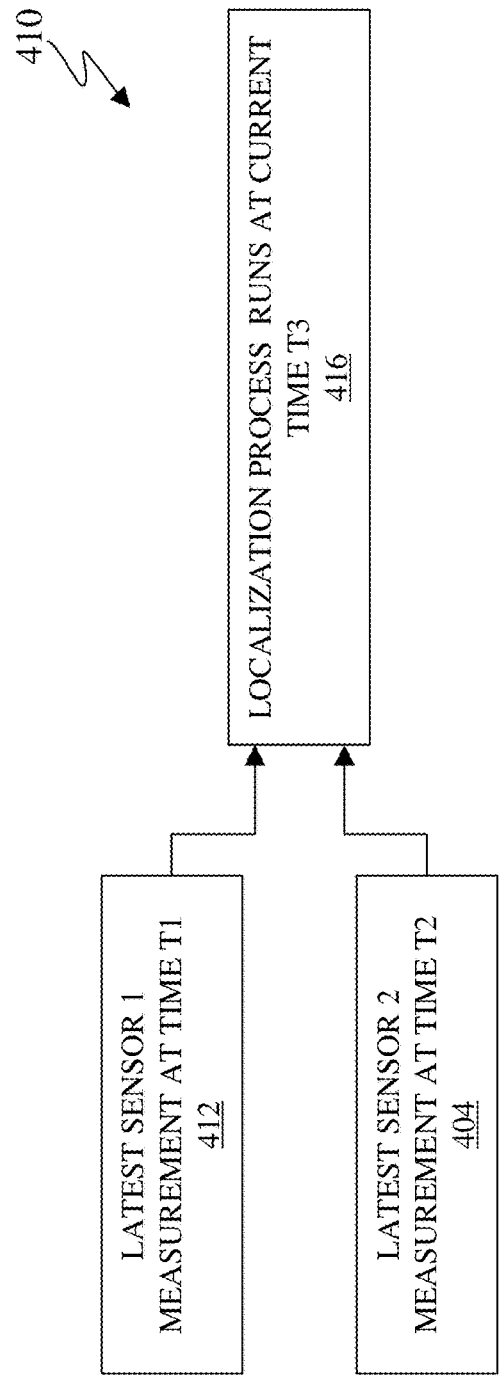
FIG. 4A
FIG. 4B

SENSOR FUSION FOR LOCALIZATION AND PATH PLANNING

CROSS-REFERENCE TO RELATED APPLICATION AND CLAIM OF PRIORITY

This application claims priority under 35 U.S.C. § 119(e) to U.S. Provisional Patent Application No. 62/892,762 filed on Aug. 28, 2019, U.S. Provisional Patent Application No. 62/938,509 filed on Nov. 21, 2019, U.S. Provisional Patent Application No. 62/941,126 filed on Nov. 27, 2019, and U.S. Provisional Patent Application No. 62/966,769 filed on Jan. 28, 2020. The above-identified provisional patent applications are hereby incorporated by reference in its entirety.

TECHNICAL FIELD

This disclosure relates generally to an autonomous robot and method of control of the autonomous robot. More specifically, this disclosure relates to mapping and localization of an autonomous lawn mower.

BACKGROUND

Autonomous robots that perform household functions such as floor cleaning, pool cleaning, and lawn cutting are now readily available consumer products. Autonomous robots can be programmed to mow lawn areas. A robotic lawn mower is an autonomous robot that is used to cut lawn grass. Care must be taken to keep such robots from mowing outside intended areas as well as avoiding permanent and dynamic obstacles within the area to be mowed.

SUMMARY

This disclosure provides sensor fusion for localization and path planning.

In one embodiment an electronic device is provided. The electronic device includes a processor operably connected to a first set of sensors and a second set of sensors. The first set of sensors are configured to generate motion information. The second set of sensors are configured to receive information from multiple anchors positioned at fixed locations throughout an area. The processor is configured to generate a path to drive the electronic device within the area. The processor is also configured to receive the motion information from the first set of sensors. The processor is additionally configured to generate ranging information based on the information that is received, via the second set of sensors, from the multiple anchors. While the electronic device is driven along the path, the processor is configured to identify a location and heading direction within the area of the electronic device based on the motion information. In addition, the processor is configured to modify the location and the heading direction of the electronic device based on the ranging information. The processor is also configured to control the electronic device to drive within the area according to the path, based on the location and the heading direction of the electronic device.

In another embodiment, a method for controlling an electronic device is provided. The method includes generating a path to drive the electronic device within an area. The method also includes receiving motion information from a first set of sensors. The method additionally includes generating ranging information based on information that is received, via a second set of sensors, from multiple anchors that are positioned at fixed locations throughout the area. While the electronic device is driven along the path, the method also includes identifying a location and heading direction within the area of the electronic device based on the motion information. The method further includes modifying the location and the heading direction of the electronic device based on the ranging information. Additionally, the method includes controlling the electronic device to drive within the area according to the path, based on the location and the heading direction of the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A and 4B illustrate example methods for sensor updating in accordance with an embodiment of this disclosure;

DETAILED DESCRIPTION

Figure 1:
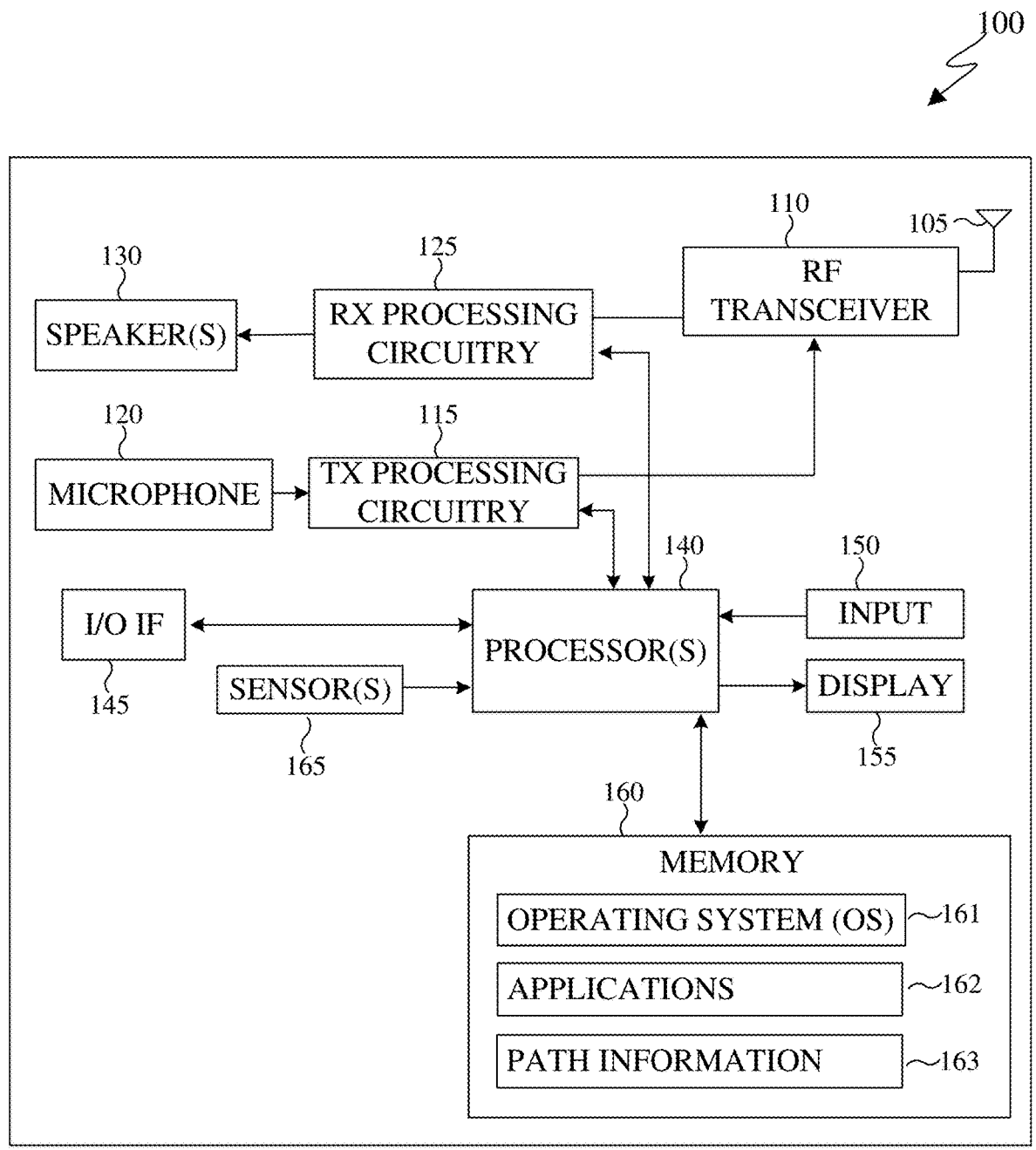
FIG. 1 illustrates an example electronic device in accordance with an embodiment of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of the present disclosure provide systems and methods for controlling an electronic device. In certain embodiments, an electronic device is an automatic lawn mower that traverses an area and trims the grass, a floor cleaner (such as a vacuum cleaner or a mop) that traverses an area to collect dirt and debris, or a pool cleaner that traverses an area to collect dirt and debris. The electronic device can perform coverage path planning by identifying a trajectory as the electronic device traverses through an area. It is noted that the area can be a yard which includes a lawn. For example, the lawn is the area of grass within the yard. The yard can also include areas that do not include grass, and which are to be avoided by the automatic lawn mower, such as a tree, flower beds, bodies of water, drop offs due to abrupt changes in elevation, and the like. The automatic lawn mower can identify a coverage path, which permits the electronic device to traverse the lawn in order to trim the grass of the lawn, while avoiding the areas of the yard that are not to be traversed.

According to embodiments of the present disclosure the electronic device performs path planning and then traverses the planned path, such that very little area is of the lawn is not traversed. According to embodiments of the present disclosure the electronic device also performs a coverage path planning which uses minimal battery. According to embodiments of the present disclosure the electronic device is able to distinguish between different types of boundaries and can navigate the boundaries accordingly. According to embodiments of the present disclosure the electronic device can also identify, and navigate around new obstacles, such as a pet that is lying in the pre-identified coverage path.

Embodiments of the present disclosure enable the electronic device to localize itself with the area. Localization includes both the X-Y coordinate location and the heading direction of the electronic device. In certain embodiments, localization and heading direction are identified using multiple sensors. Example sensors include, but not limited to, two way ranging systems (such as ultra-wide band (UWB) frequencies), global positioning system (GPS), wheel encoders, and inertial measurement units (IMUs). The data from the various sensors can be fused together for generated localization estimates. Additionally, data from different localization models can be used together to generate improved location estimates. In certain embodiments, anchors, such as a fixed infrastructure, can be played throughout the yard to improve the localization accuracy with two way ranging systems, such as the UWB two-way ranging. Embodiments of the present disclosure also include methods for modifying certain types of coverage path planning based on estimate of localization accuracy that is obtained by using the different localization formulations possible with multiple sensors.

Additionally, embodiments of the present disclosure describe generating a path plan that directs the electronic device to cover an increased area of the yard in a reduced time. Additionally, by reducing the time the electronic device travers the area, can effectively increase longevity of the anchor batteries. Embodiments of the present disclosure also describe methods to extend the longevity of anchor batteries in addition to reducing the operating time of the electronic device. For example, based on one or more triggering events, embodiments of the present disclosure include system and methods for placing anchors into power saving modes to increase the batteries of the anchors (if the anchors are powered by batteries, instead of receiving electricity directly from an electronical grid).

Each time the electronic device avoids dynamic obstacles (a new obstacle), it may not traverse a certain area. For example, when the electronic device is an automatic lawn mower, when the automatic lawn mower avoids a previously unknown obstacle, (such as when an animal or a human or a new flower garden is detected along the coverage path), the automatic lawn mower may leave some areas unmowed. As such, embodiments of the present disclosure provide systems and methods for mowing all the unmowed areas due to dynamic obstacles or path tracking failure at the end of the originally planned path. For example, the automatic lawn mower may use a finite horizon Markov Decision Process or a solution to the traveling salesman problem in order to re-plan paths to the unmowed areas.

Embodiments of the present disclosure also provide systems and methods for mowing the areas close to the boundary. In certain embodiments, different types of boundaries can be identified by the electronic device. Based on the type of boundary the electronic device can determine to traverse the boundary line itself or remaining within the boundary (and not crossing the boundary line).

Moreover, embodiments of the present disclosure provide system and methods for generating a planned path based on gathering information about the area itself, such as boundaries, and location of permanent obstacles. To generate a path that traverses the area, the electronic device first generates an initial map of the area. To generate the initial map of the area, the electronic device identifies the outside boundary as well as the locations of permanent obstacles that are within the boundary. The boundary of the area is the outside perimeter of the lawn (which prevents the electronic device from crossing into a separate property). Obstacles can include trees, bushes, decorative rocks, sculptures, fixtures, flower beds, bodies of water, and the like, which the electronic device is either unable to or directed to avoid traversing over. In certain embodiments, the electronic device can identify the boundary of the area without using a fence or sensors located along the boundary itself.

FIG. 1 illustrates an example electronic device 100 in accordance with an embodiment of this disclosure. In some embodiments, the electronic device 100 is an automatic lawn mower that traverses portion portions area, such as a yard, in order to trim the grass. In some embodiments, the electronic device 100 is an automatic vacuum cleaner, an automatic mop, or a pool cleaner that traverses an area and collects dust, dirt and/or debris. In other embodiments, the electronic device 100 is able to traverses an area while avoiding obstacles and performing specific functions As shown in FIG. 1, the electronic device 100 includes an antenna 105, a communication unit 110, transmit (TX) processing circuitry 115, a microphone 120, and receive (RX) processing circuitry 125. The communication unit 110 can include, for example, a radio frequency (RF) transceiver (such as a transfer capable of transmitting and receiving UWB frequencies), a BLUETOOTH transceiver, a WI-FI transceiver, a ZIGBEE transceiver, an infrared transceiver, and the like. The electronic device 100 also includes a speaker 130, a processor 140, an input/output (I/O) interface (IF) 145, an input 150, a display 155, a memory 160, and a sensor(s) 165. The memory 160 includes an operating system (OS) 161, one or more applications 162, and previously generated path information 163.

The communication unit 110 receives, from the antenna 105, an incoming RF signal transmitted from an access point (such as an anchor (described in FIG. 2A below), a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 110 down-converts the incoming RF signal to generate an intermediate frequency or baseband signal. The intermediate frequency or baseband signal is sent to the RX processing circuitry 125 that generates a processed baseband signal by filtering, decoding, and/or digitizing the baseband or intermediate frequency signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data from the processor 140. The outgoing baseband data can include web data, e-mail, or interactive video game data. The TX processing circuitry 115 encodes, multiplexes, and/or digitizes the outgoing baseband data to generate a processed baseband or intermediate frequency signal. The communication unit 110 receives the outgoing processed baseband or intermediate frequency signal from the TX processing circuitry 115 and up-converts the baseband or intermediate frequency signal to an RF signal that is transmitted via the antenna 105.

The processor 140 can include one or more processors or other processing devices. The processor 140 can execute instructions that are stored in a memory 160, such as the OS 161 in order to control the overall operation of the electronic device 100. For example, the processor 140 could control the reception of forward channel signals and the transmission of reverse channel signals by the communication unit 110, the RX processing circuitry 125, and the TX processing circuitry 115 in accordance with well-known principles. The processor 140 can include any suitable number(s) and type(s) of processors or other devices in any suitable arrangement. For example, in some embodiments, the processor 140 includes at least one microprocessor or microcontroller. Example types of processor 140 include microprocessors, microcontrollers, digital signal processors, field programmable gate arrays, application specific integrated circuits, and discrete circuitry.

The processor 140 is also capable of executing other processes and programs resident in the memory 160, such as operations that receive, store, and timely instruct by providing location information and the like. The processor 140 can move data into or out of the memory 160 as required by an executing process. In some embodiments, the processor 140 is configured to execute a plurality of applications 162 based on the OS 161 or in response to signals received from external source(s) or an operator. Example, applications 162 can include a location application, an object avoidance application, and the like. The processor 140 is also coupled to the I/O interface 145 that provides the electronic device 100 with the ability to connect to other devices, such as client devices 106-114. The I/O interface 145 is the communication path between these accessories and the processor 140.

The processor 140 is also coupled to the input 150 and the display 155. The operator of the electronic device 100 can use the input 150 to enter data or inputs into the electronic device 100. The input 150 can be a keyboard, touchscreen, mouse, track ball, voice input, buttons located on the external surface of the electronic device, or other device capable of acting as a user interface to allow a user in interact with electronic device 100. For example, the input 150 can include a wireless transmission from a user device, such as a laptop, a tablet, a remote controller, an appliance, one or more anchors, a desktop personal computer (PC) or any other electronic device. The input 150 can also be based on voice recognition processing based on a voice input. In another example, the input 150 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 150 can be associated with sensor(s) 165 and/or a camera by providing additional input to processor 140. In some embodiments, the sensor 165 includes one or more inertial measurement units (IMUs) (such as accelerometers, gyroscope, and magnetometer), motion sensors, optical sensors, cameras, pressure sensors, GPS, wheel encoders, altimeter, and the like. The input 150 can also include a control circuit. In the capacitive scheme, the input 150 can recognize touch or proximity.

The display 155 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 160 is coupled to the processor 140. Part of the memory 160 could include a RAM, and another part of the memory 160 could include a Flash memory or other ROM. The memory 160 can include persistent storage (not shown) that represents any structure(s) capable of storing and facilitating retrieval of information (such as data, program code, and/or other suitable information). The memory 160 can contain one or more components or devices supporting longer-term storage of data, such as a read only memory, hard drive, Flash memory, or optical disc.

In certain embodiments, the memory can also include the path information 163. For example, the path information 163 is the generated path plan of the electronic device. That is, the electronic device 100 using one or more of the sensors 165 and the UWB frequencies via the communication unit 110 can generate a map of the area, that indicates the external boundary (or parameter) of the area as well as internal obstacles. The obstacles and the external boundary of the area can be identified as permanent such that the obstacles and the external boundary do not change from one run time to the next run time.

The electronic device 100 further includes one or more sensors 165 that can meter a physical quantity to identify the location of the electronic device as well as nearby obstacles of the electronic device 100 and convert metered or detected information into an electrical signal. For example, the sensor 165 can include one or more buttons for touch input, a camera, a gesture sensor, an IMU sensors (such as a gyroscope or gyro sensor and an accelerometer), a wheel encoder, GPS, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 165 can further include control circuits for controlling any of the sensors included therein. Any of these sensor(s) 165 can be located within the electronic device 100.

Although FIG. 1 illustrates an example of electronic device, various changes can be made to FIG. 1. For example, various components in FIG. 1 could be combined, further subdivided, or omitted and additional components could be added according to particular needs. As a particular example, the processor 140 could be divided into multiple processors, such as one or more central processing units (CPUs). In addition, as with computing and communication, electronic devices and servers can come in a wide variety of configurations, and FIG. 1 does not limit this disclosure to any particular electronic device.

Figure 2A:
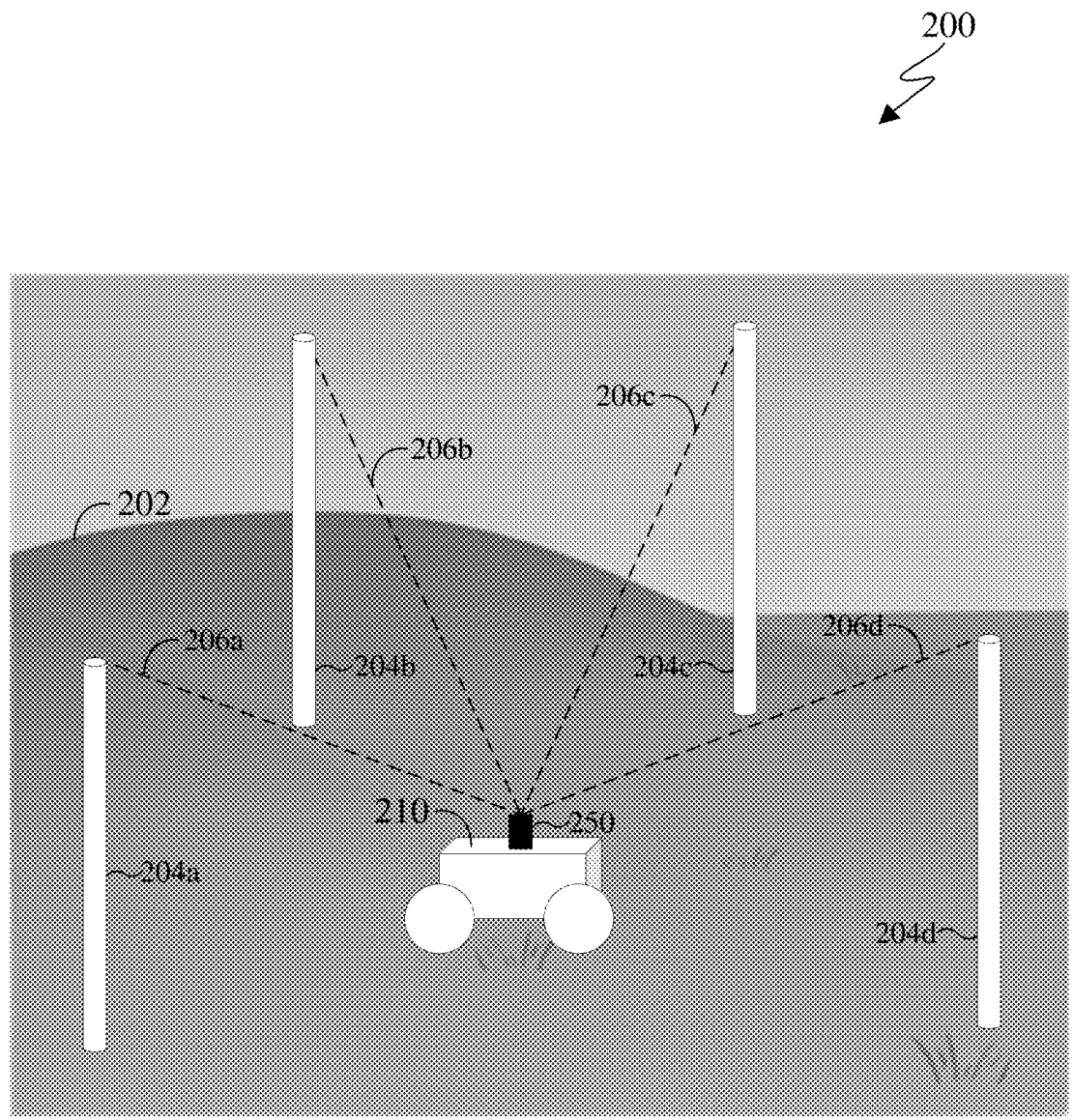
FIG. 2A illustrates an example environment including an electronic device and anchors in accordance with an embodiment of this disclosure.
Figure 2B:
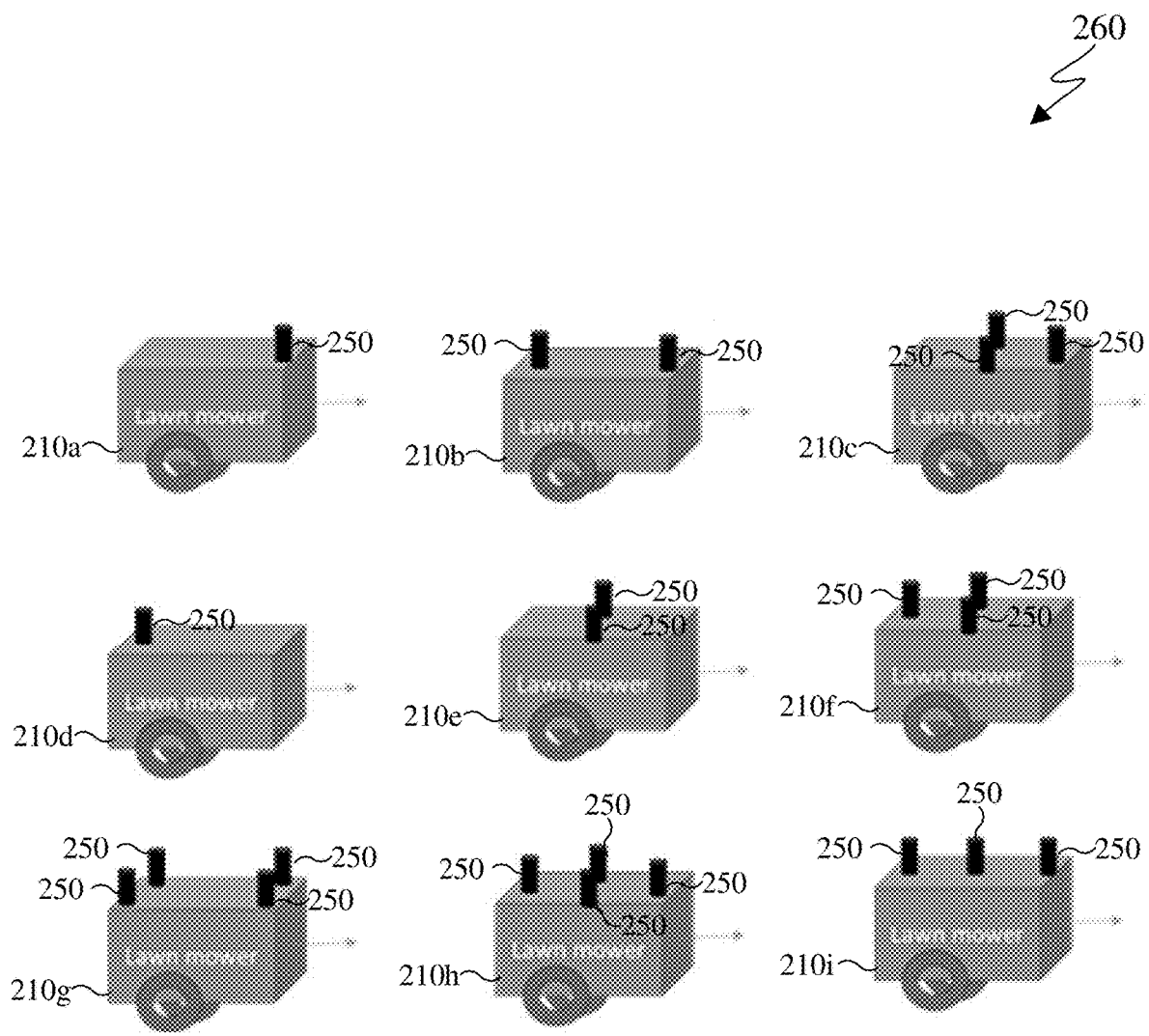
FIG. 2B illustrates example sensor placements on the electronic device in accordance with an embodiment of this disclosure.
Figure 2C:
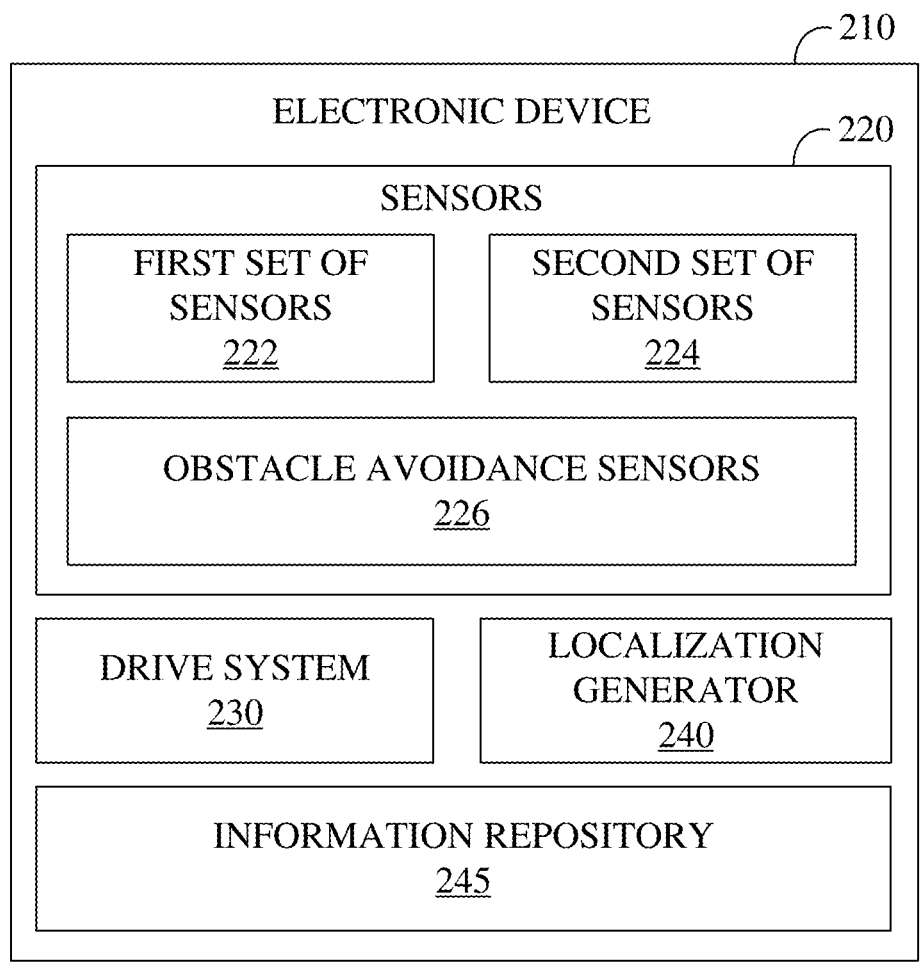
FIG. 2C illustrates an example block diagram of an electronic device in accordance with an embodiment of this disclosure.

FIG. 2A illustrates an example environment 200 in accordance with an embodiment of this disclosure. The environment 200 includes an electronic device 210. In certain embodiments, the electronic device 210 can represent the electronic device 100 of FIG. 1. In other embodiments, a portion of the components included in the electronic device 210 can be included in different devices, such as a remote server or multiple devices. FIG. 2B illustrates a diagram 260. in accordance with an embodiment of this disclosure. The diagram 260 illustrated example sensor placements on the electronic device 210. FIG. 2C illustrates an example block diagram of an electronic device 210 in accordance with an embodiment of this disclosure.

The environment 200 illustrates the electronic device 210 within a yard 202. The yard as illustrated is a field of grass. As illustrated, the electronic device 210 is an automatic lawn mower, which traverses the yard 202 while trimming the grass. The environment 200 includes anchor 204a, anchor 204b, anchor 204c, and anchor 204d (which are collectively referred to as anchors 204). Information 206a is transmitted between the electronic device 210 and the anchor 204a. Information 206b is transmitted between the electronic device 210 and the anchor 204b. Information 206c is transmitted between the electronic device 210 and the anchor 204c. Information 206d is transmitted between the electronic device 210 and the anchor 204d.

The electronic device 210 includes a tag 250. The tag 250 receives and transmits the information 206a, information 206b, information 206c, and information 206d (which are collectively referred to as information 206) between the anchors 204. In certain embodiments, the electronic device 210 uses the information 206 to generate ranging information from each anchor. For example, the electronic device 210 identifies its location within the yard 202 based on different distances that are identified via the information 206.

The information 206 can be two-way ranging using UWB ranging. UWB two way ranging systems include one or more anchors, such as the anchors 204 that are located at fixed positions within in the yard 202, and one or more tags, such as the tag 250 which is attached to the electronic device 210. The UWB ranging generates ranging information indicates the distance between each tag 250 and each of the anchors 204. Therefore, as the electronic device 210 moves throughout the yard 202, the information 206 is used to triangulate and locate the electronic device 210 within the yard. In certain embodiments, other ranging systems like those operating at 60 GHz or using Bluetooth or WiFi can be used.

The tag 250 can polls for ranging information from the anchors 204. The anchors 204 that receive the polling request, then transmit and provide ranging information to the tag 250. The electronic device 210 (or the tag 250) then uses the ranging information to identify its location within the yard 202.

The use of multiple tags 250 on the electronic device 210 can increase the heading estimates of the electronic device. For example, each tag can be used to identify its own location heading. Based on the environment, one or more anchors, and/or one or more tags can be blocked from receiving the information 206. As such, using multiple tags 250 and various locations on the electronic device 210, such as illustrated by the electronic devices 210a through 210i can increase the accuracy of the ranging information, since each tag 250 can generate its own ranging information to one or more of the anchors 204. The diagram 260 of FIG. 2B illustrates various quantities, and placement of the tag 250.

For example, the electronic device 210a includes a tag 250 located in the center front. The electronic device 210b includes tags 250 located in the center front and center rear. The electronic device 210c includes tags 250 located in a triangular shape and located towards the front. The electronic device 210d includes a tag 250 located in in the center rear. The electronic device 210e, is similar to the electronic device 210b, but the tags 250 are located in the center left and right. The electronic device 210f, is similar to the electronic device 210c, but the tags 250 are located in a triangular shape and located towards the front. The electronic device 210g includes tags 250 located near each corner. The electronic device 210h includes four tags 250 while the electronic device 210i includes three tags.

As described above, the electronic device 210 is similar to the electronic device 100 of FIG. 1. For example, the block diagram of FIG. 3 illustrates various components of the electronic device 210. The electronic device 210 can include sensor 220. The sensors 220 can be similar to the sensors 165 of FIG. 1. The electronic device 210 also includes a drive system 230, a localization generator 240, and an information repository 245.

The sensors 220 include a first set of sensors 222, a second set of sensors 224, and obstacle avoidance sensors 226. For example, the first set of sensors 222 can include one or more IMU's and one or more wheel encoders. The first set of sensors 222 are used to identify a location (localization) of the electronic device 210 within the area. IMU sensors measure the force, angular rate, orientation of the electronic device using one or more sensors such as an accelerometer, a gyroscope, and the like. Wheel encoders are a type of sensor that counts the number of times the motor has rotated. The output of a wheel encoder is used to identify the distance the electronic device 210 has traveled based on each rotation of the motor. It is noted that due to environmental issues, such as when the ground is wet, a wheel could spin freely and thereby provide an incorrect location. For example, if a wheel is freely spinning the measured distance traveled, based on the number of rotations, would differ than the actual distance traveled.

The second set of sensors 224 can include the tags 250 of FIGS. 2A and 2B. The second set of sensors 224 can be used to receive the information 206 from the multiple anchors 204 that are positioned at fixed locations throughout the area. The electronic device 210 can generate ranging information based on the information 206. Different sets of ranging information can be generated based on the number of tags, and the ability to communicate with the anchors. For example, the quantity of ranging information could correspond to the number of tags 250 on the electronic device 210.

The obstacle avoidance sensors 226 can include various sensors to identify the distance between the electronic device 210 and an object within the yard 202. The obstacle avoidance sensors 226 can include any number of LiDAR sensors, color cameras, ultrasonic sensors, and the like. For example, as the electronic device 210 is traversing the yard 202, a new obstacle, such as a toy, can be detected via one or more of the obstacle avoidance sensors 226. As such the electronic device 210 can be directed to avoid the object.

The drive system 230 can include one or more wheels, and motors, that are configured to propel and steer the electronic device 210 throughout the yard 202. For example, the drive system 230 can include a two or more wheels that when rotated by a motor or drive mechanism propel the electronic device through the yard 202. The motor can include (i) an electric motor supplied power from a battery, or fuel cell, (ii) an internal/external combustion engine powered by an onboard fuel source, (iii) a hydraulic/pneumatic motor powered by an above aforementioned power source, (iv) compressed air, or the like. One or more of the wheels swivel to aid navigation or adjustment of yaw of the electronic device 210. One or more of the wheels can be provided rotational power individually aid navigation or adjustment of yaw of the electronic device 210.

Figure 3A:
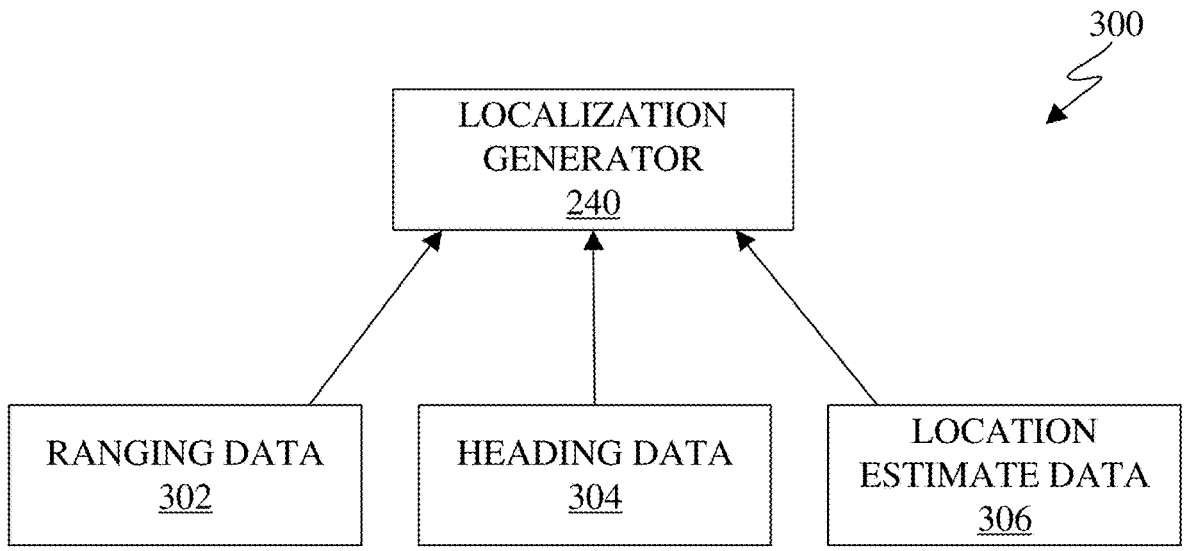
FIG. 3A illustrates an example method of obtaining information to identify a location of the electronic device in accordance with an embodiment of this disclosure.

The localization generator 240 uses the information from the first set of sensors 222 and the second set of sensors 224 to localize the electronic device 210 within the yard 202. The localization generator 240 can fuse the location information from the various sensors to identify the location of the electronic device 210 within the yard 202. FIG. 3A, below, describes the localization generator 240 in greater detail.

The information repository 245 represents any suitable structure(s) capable of storing and facilitating retrieval of information (such as data, program code, or other suitable information on a temporary or permanent basis). The information repository 245 can represent the memory 160 of FIG. 1. The information repository 245 can be RAM or any other suitable volatile or non-volatile storage device(s). The information repository 245 can be persistent storage and contain one or more components or devices supporting longer-term storage of data, such as a ROM, hard drive, Flash memory, or optical disc.

In certain embodiments the information repository 245 includes a generated path plan. The path plan can be generated during a training period of the electronic device 210. The path plan can include the boundary of the yard, and perinate objects (such as obstacle) that are located within the lawn and are to be avoided. The information repository 245 can also indicate the type of boundary. For example, a soft boundary can be a boundary between property lines, as such the electronic device 210 can traverse the boundary itself. In another example, a hard boundary is a boundary that the electronic device should not cross, such as a boundary between the lawn and a body of water. As such, upon detecting a hard boundary, the electronic device 210 stays within the yard a predefined distance from the boundary line.

Figure 7A:
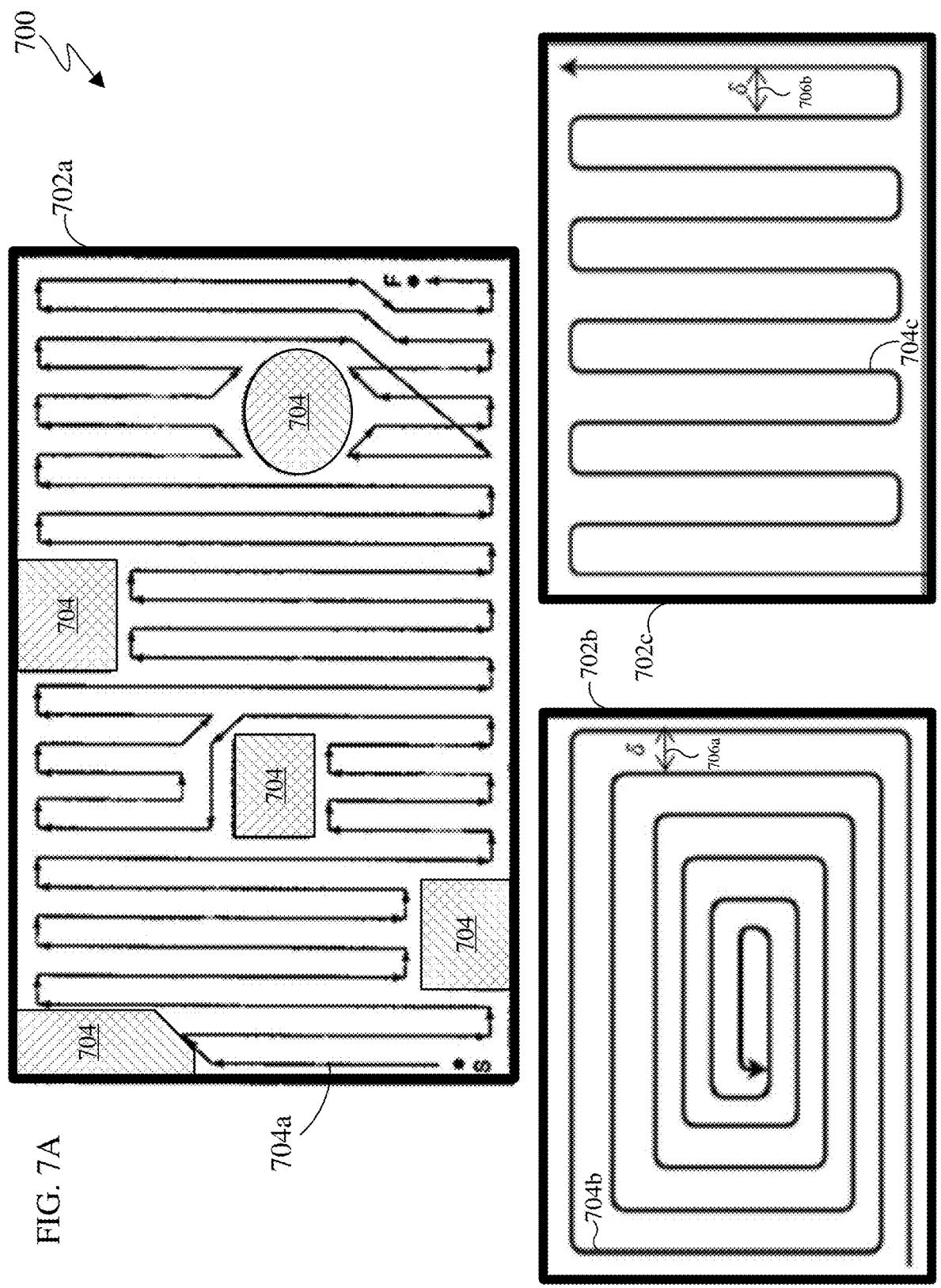
FIG. 7A illustrates example path plans in accordance with an embodiment of this disclosure.

Based on the localization generator 240 the information from the sensors 220, the drive system 230 can drive the electronic device along a path within an area. The path can include parallel lines that traverse the area. The pay can include a spiral. A spiral path can start at a center of the area and navigate outwards towards the parameter. Alternatively, a spiral path can start at the boundary of the area and navigate towards the center. FIG. 7A illustrates both a parallel and spiral path.

Although FIGS. 2A, 2B, and 2C illustrates the electronic device 210 and its environment, various changes can be made to FIGS. 2A, 2B, and 2C. For example, any other suitable arrangement of the components of the electronic device 210, any number of anchors 204, or any number of location of sensors could be used.

Figure 3B:
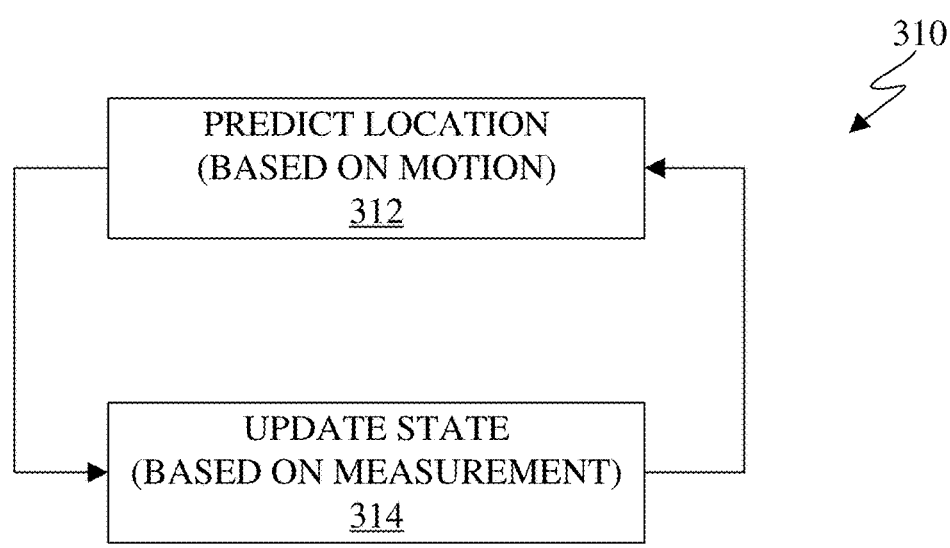
FIG. 3B illustrates an example method for identifying the location of the electronic device in accordance with an embodiment of this disclosure.
Figure 3C:
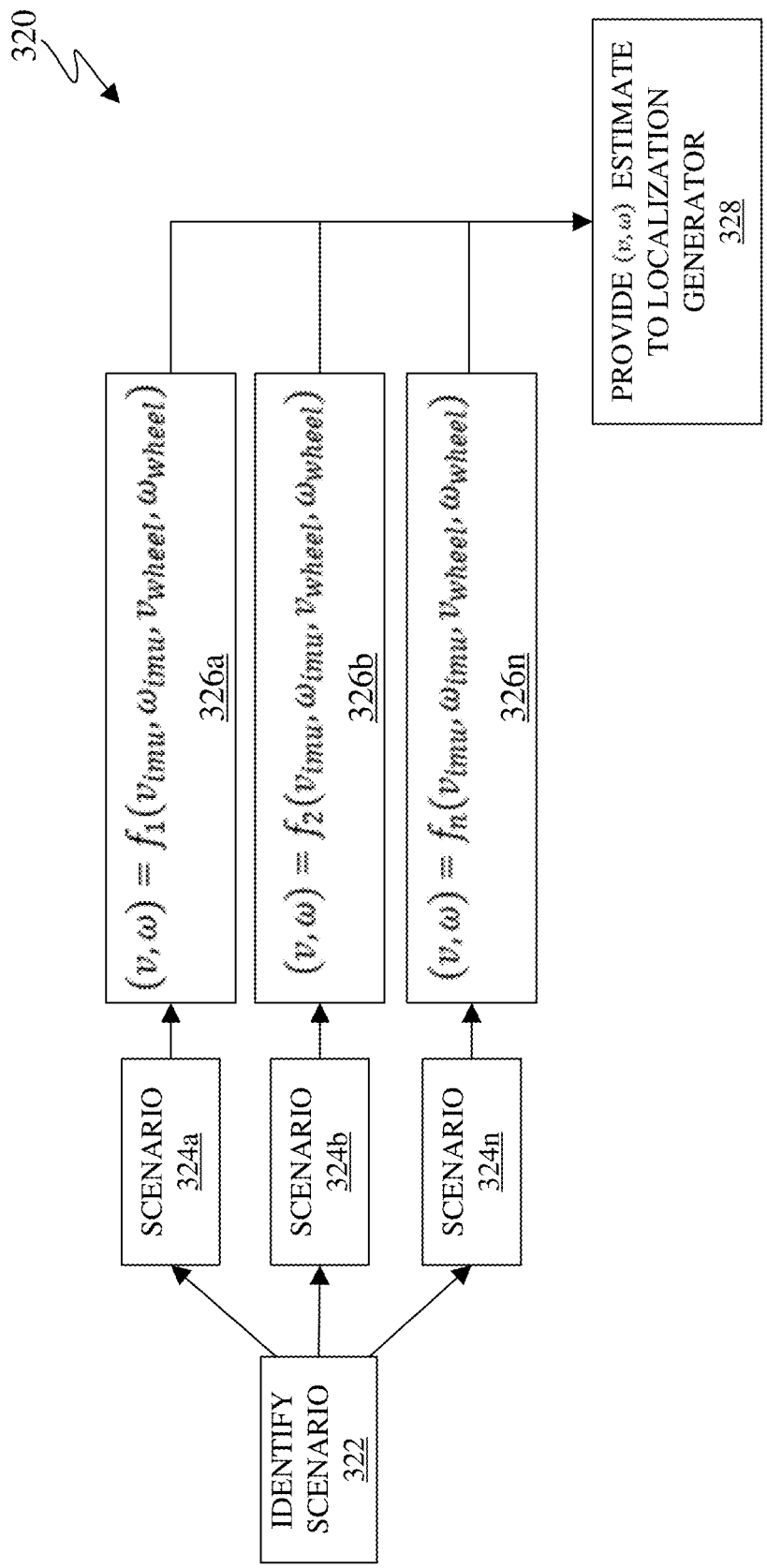
FIGS. 3C, 3D, and 3E illustrates example methods for fusing the sensor data to identify the location of the electronic device in accordance with an embodiment of this disclosure.
Figure 3D:
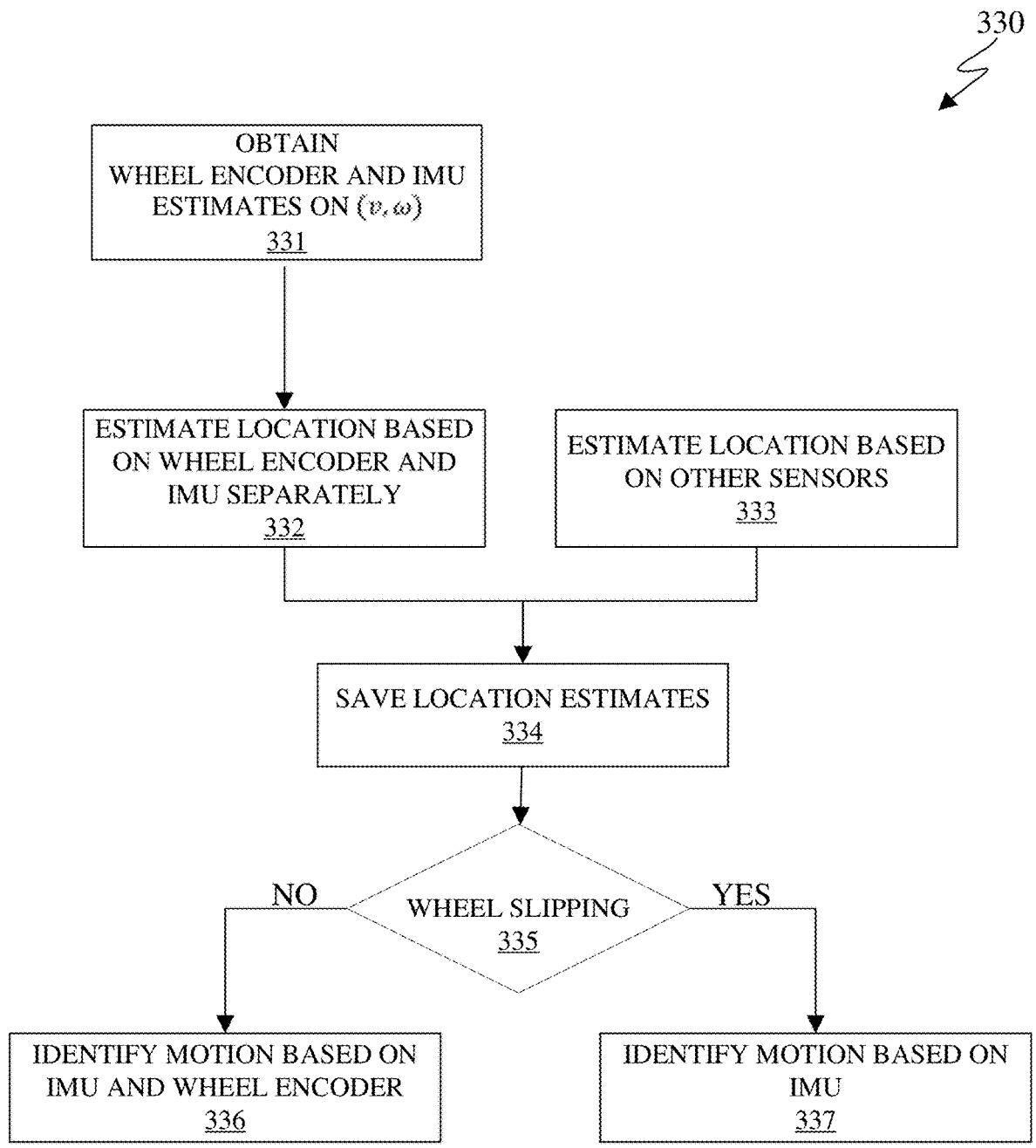
Figure 3E:
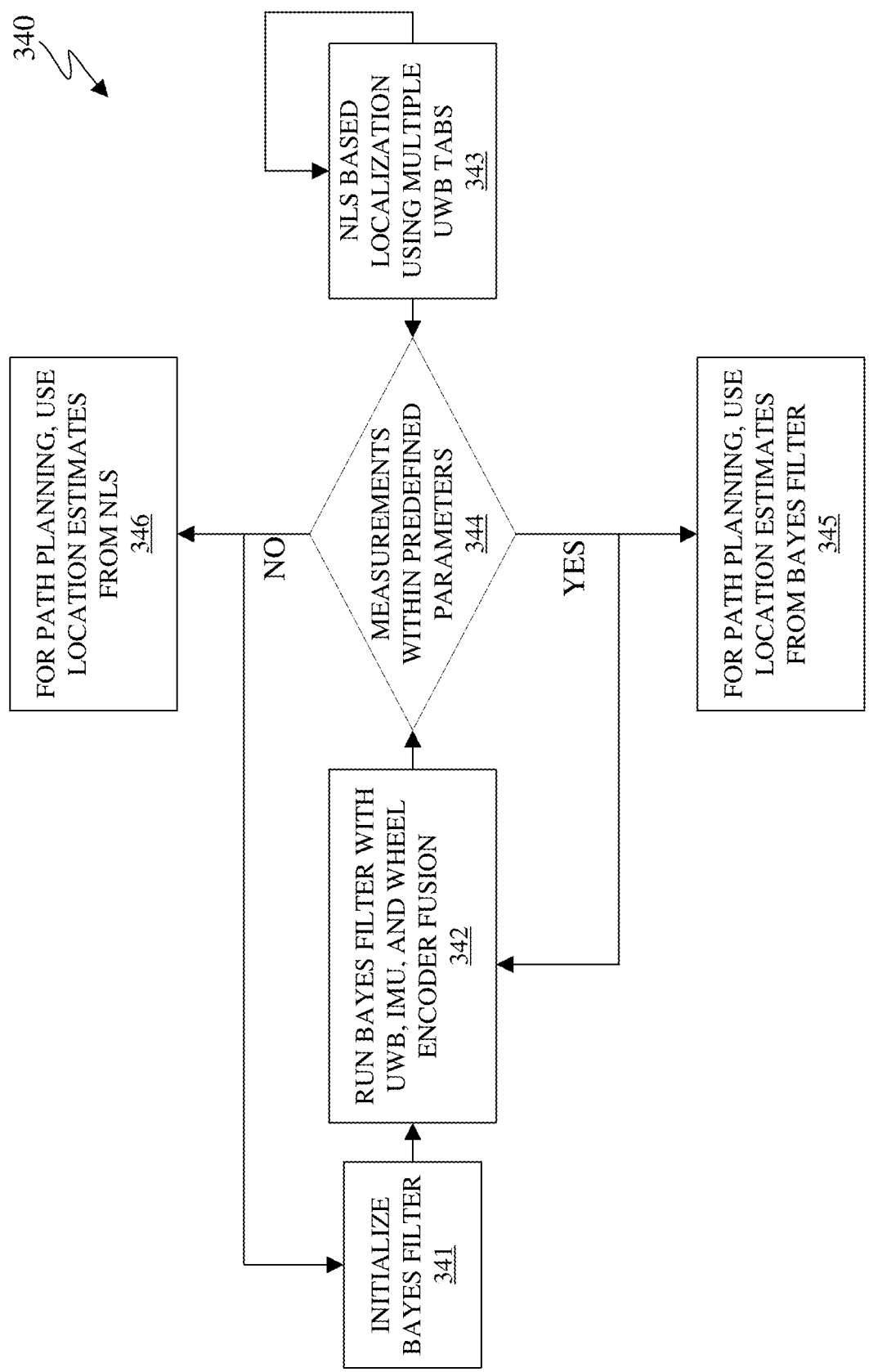

FIG. 3A illustrates an example method 300 of obtaining information to identify a location of the electronic device in accordance with an embodiment of this disclosure. FIG. 3B illustrates an example method 310 for identifying the location of the electronic device in accordance with an embodiment of this disclosure. FIGS. 3C, 3D, and 3E illustrates example methods 320, 330 and 340, respectively, for fusing the sensor data to identify the location of the electronic device in accordance with an embodiment of this disclosure. The methods 300, 310, 320, 330, and 340 can be performed by the electronic device 100 of FIG. 1 and localization generator of the electronic device 210 of FIG. 2C. For ease of explanation, methods 300, 310, 320, 330, and 340 are performed by the electronic device 210.

Embodiments of the present disclosure take into consideration that localization accuracy of the electronic device 210 can decrease due to bad weather conditions, wet lawn, or loss of data due to firmware imperfections these sensors. Additionally, UWB ranging may suffer in non-line of sight (NLOS) scenarios between anchors 204 and the tags 250, which can affect the accuracy of range estimates of the electronic device 210 to the anchors 204. Additionally, the first set of sensors 222 (like IMU or wheel encoders or GPS) which can aid localization have can also yield poor results, such as when one of the wheels is slipping due to a lawn that is wet. Therefore, according to embodiments of the present disclosure, the localization generator 240, of FIG. 2C fuses the results from the various sensors 220 together to generate accurate localization estimates with each sensor complementing the shortcomings of the other sensors. For example, in order to have accurate heading direction, which is crucial for path planning certain embodiments have multiple UWB tags 250 fixed on the electronic device 210, which could help offer robustness to the heading direction estimate, as discussed in FIG. 2B, above.

The method 300 of FIG. 3A illustrates the localization generator 240 of FIG. 2C receiving various inputs to identify the location of the electronic device 210. In certain embodiments, the localization generator 240 obtains heading direction via the first set of sensors. In certain embodiments, the localization generator 240 also obtains ranging information from one or more sensors via the second set of sensors. The ranging information indicate the location of the electronic device from one or more fixed locations in the area (such as the anchors 204). The localization generator 240 can also generate one or more location estimates from the first set of sensors 222, the second set of sensors 224 or the output of a previous localization process. Based on the heading direction, the ranging information, and the one or more location estimates, the localization generator 240 identifies the location and the heading of the electronic device 210.

When there are multiple sensors the information from the sensors can be divided to provide to the motion and/or the measurement model leading to different design ideologies and performance results. In some embodiments, wheel encoders can provide to linear velocity while IMU (such as a gyroscope) can provide angular velocity in the motion model. In other embodiments, wheel encoders can provide to angular velocity while an IMU (such as an accelerometer) can provide the linear velocity estimates in the measurement model.

The method 310 of FIG. 3B illustrates the localization generator 240 of FIG. 2C continually modifying the location of the electronic device within the area. For example, in step 312, the localization generator 240 predicts the location of the electronic device based on motion. For example, using one or more of the first set of sensors 222, such as gyroscopes, wheel encoders, accelerometers, the localization generator 240 predicts the location of the electronic device. The localization generator 240, in step 314, then updates the state or pose of the electronic device based on measurements via the ranging information that is obtained from the anchors. The updated state is then used in step 312 to further refine and predict a new location of the electronic device based on the motion as detected by the first set of sensors 222. The process continues as the electronic device moves throughout the area.

In certain embodiments, the localization generator 240 filters the results of the first and second set of sensors 222 and 224 to identify the location of the electronic device. For example, a Bayes filter can be used for tracking the electronic device. Syntax (1) describes the process of using the Bayes filter.

Syntax (1)
Bayes filter(bel($X_{t-1}$), $U_t$, $Z_t$)
for all $X_t$:
$\overline{bel}(X_t) = \int p(X_t|U_t, X_{t-1}) bel(X_{t-1}) dX_{t-1}$ $bel(X_t) = \eta p(Z_t|X_t) \overline{bel}(X_t)$ endfor
return bel($X_t$)

In Syntax (1) $X_t$ is the state (pose) of the electronic device at time t, $U_t$ are the controls (for instance odometry information), and $Z_t$ are measurements (for instance from GPS or UWB ranging systems). The electronic device 210 is in state X is given as bel(X). Conditional probability of event A given event B is denoted as p(A|B). Note that bel(X)=$\rho$($X_t$|$X_{t-1}$, $U_t$, $Z_t$).

Note that $\eta$ is a normalizing term to make bel($X_t$) as a valid probability distribution. In order to implement the Bayes filter of Syntax (1) (which could be done using popular Kalman filtering or the particle filtering approach), models can be used that drive knowledge of p($Z_t$|$X_t$), which comes from a measurement model, and $\rho$($X_t$|$U_t$, $X_{t-1}$), which comes from a state transition/motion model.

The information obtained from the multiple sensors along with known statistics in their error can be used to come up with knowledge of $\rho$($Z_t$|$X_t$) and $\rho$($X_t$|$U_t$,$X_{t-1}$). The following example is how the knowledge is derived.

In order to fuse the odometry information (from either wheel encoders or IMU or both) with GPS-RTK and/or UWB ranging the following models can be used. If the angular and linear speeds are available, the motion model, as described in Equation (1) can be used. In Equation (1), ($x_t$, $y_t$) denote X-Y coordinates of the electronic device and $\theta_t$ is the heading direction at time t with respect to anchor coordinate system. Linear and angular speeds are given by v' and $\omega$'.

$$\begin{bmatrix} x_{t+\Delta t} \\ y_{t+\Delta t} \\ \theta_{t+\Delta t} \end{bmatrix} = \begin{bmatrix} x_t \\ y_t \\ \theta_t \end{bmatrix} + \begin{bmatrix} v' \Delta t \sin(\theta_t + \omega' \Delta t / 2) \\ v' \Delta t \cos(\theta_t + \omega' \Delta t / 2) \\ \omega' \Delta t \end{bmatrix}, \quad \text{Equation (1)}$$

In certain embodiments, the electronic device 210 may not have access to accurate values of the linear and angular speed. The measured velocities are given as $$\begin{bmatrix} v \\ \omega \end{bmatrix} = \begin{bmatrix} v' \\ \omega' \end{bmatrix} + \begin{bmatrix} \epsilon_1 \\ \epsilon_2 \end{bmatrix},$$

where $\epsilon_1$, $\epsilon_2$ is noise in the measurement. The motion model maybe approximated as shown in Equation (2). As shown in Equation (2) N(0, $R_t$) is Gaussian noise with covariance $R_t$.

$$\begin{bmatrix} x_{t+\Delta t} \\ y_{t+\Delta t} \\ \theta_{t+\Delta t} \end{bmatrix} \approx \begin{bmatrix} x_t \\ y_t \\ \theta_t \end{bmatrix} + \begin{bmatrix} v \Delta t \sin(\theta_t + \omega \Delta t / 2) \\ v \Delta t \cos(\theta_t + \omega \Delta t / 2) \\ \omega \Delta t \end{bmatrix} + N(0, R_t) \quad \text{Equation (2)}$$

Another possible measurement model for fusing information from GPS and/or UWB ranging is described in Equation (3). where the vector $$\begin{bmatrix} x \\ y \\ \theta \end{bmatrix}$$

is the state of the electronic device, $$\begin{bmatrix} x_{a,1} & x_{a,2} & x_{a,3} & x_{a,4} \\ y_{a,1} & y_{a,2} & y_{a,3} & y_{a,4} \end{bmatrix}$$

are anchor locations (assuming there are 4 anchors but could be generalized to any number of anchors) with respect to the same coordinate system as $\theta$ and d is the relative placement of the multiple UWB tags on the electronic device.

$$r = \begin{bmatrix} r_{UWB} \\ r_{GPS} \end{bmatrix} = h\left( \begin{bmatrix} x \\ y \\ \theta \end{bmatrix}, d, \begin{bmatrix} x_{a,1} & x_{a,2} & x_{a,3} & x_{a,4} \\ y_{a,1} & y_{a,2} & y_{a,3} & y_{a,4} \end{bmatrix}, T \right) + N(0, Q_t), \quad \text{Equation (3)}$$

It is noted that N(0, $Q_t$) is Gaussian noise with known covariance $Q_t$. Also, T is a known transformation matrix from global world coordinate system to a local coordinate system (used for estimating the electronic device pose). The function h( ) maps the state and other meta information on anchor and tag placement to the measurements. For UWB ranging measurements $r_{UWB}$, the function computes the true distance of the tags from anchors given electronic device state. For GPS measurements $r_{GPS}$, the function gives output as just the state itself.

In certain embodiments, when the electronic device 210 is positioned at location (x, y), with two tags positioned as follows. A pose for the electronic device is described based on vector $$\begin{bmatrix} x \\ y \\ \theta \end{bmatrix},$$

where $\theta$ is based on the distance between the first tag to the electronic device (denoted as $d_1$) and the distance between the second tag to the electronic device (denoted as $d_2$). The location of tag 1 can be expressed as (x+$d_1$ cos $\theta$, y+$d_1$ cos $\theta$) while the location of tag 2 can be expressed as (x-$d_2$ cos $\theta$, y-$d_2$ cos $\theta$).

According to embodiments of the present disclosure multiple localization processes can run in parallel. By running multiple localization processes in parallel generates the multiple location estimate data 306. The multiple location estimate data 306 can be combined for localization of the electronic device 210.

For example, the ranging information from a first tag 250, the ranging information from a second tag 250, and the GPS signal can be combined to generate a single estimate denoted as p($Z_t$|$X_t$). Similarly, the information from the wheel encoders and IMU can generate an estimate $p(X_t|X_{t-1}, U_t)$. In this example, $X_t$ is the state and defined by vector $$\begin{bmatrix} x \\ y \\ \theta \end{bmatrix},$$

and $U_2$ is defined by the vector $$\begin{bmatrix} v \\ \omega \end{bmatrix}.$$

These estimates can then be combined for localization.

Equation (4) includes multiple equations that describe a process for sensor fusion that employs extended Kalman filter and fuses information from K UWB tags listening to P anchors, any sensor or any other source that directly gives location estimates as measurements (for instance GPS-RTK), and odometer information in terms of linear or angular speed is given as follows. Extended Kalman filter is used only for exemplary purpose and the embodiment may be extended to use of particle filters or any other filter like Unscented Kalman filter as well. Denote S as the size of the state space. In the following example, S=3 but in general the state space could be of any dimension other than 3.

Equation (4)

$$\text{Lawn\_mower\_localization}\left(\sum_{t-1}, \begin{bmatrix} \mu_{x,t-1} \\ \mu_{y,t-1} \\ \mu_{\theta,t-1} \end{bmatrix}, v_t, \right.$$
$$\left. \omega_t, r, d, \begin{bmatrix} x_{a,1} & x_{a,2} & \cdots & x_{a,P} \\ y_{a,1} & y_{a,2} & & y_{a,P} \end{bmatrix}, T, [\sigma_1^2 \ \cdots \ \sigma_{PK+S}^2] \right)$$

$$G_t = \begin{bmatrix} 1 & 0 & -v_t \Delta t \sin\left(\mu_{\theta,t} + \frac{\omega_t \Delta t}{2}\right) \\ 0 & 1 & v_t \Delta t \cos\left(\mu_{\theta,t} + \frac{\omega_t \Delta t}{2}\right) \\ 0 & 0 & 1 \end{bmatrix}$$

$$V_t = \begin{bmatrix} \Delta t \cos\left(\mu_{\theta,t} + \frac{\omega_t \Delta t}{2}\right) & -\frac{v_t \Delta t^2 \sin\left(\mu_{\theta,t} + \frac{\omega_t \Delta t}{2}\right)}{2} \\ \Delta t \sin\left(\mu_{\theta,t} + \frac{\omega_t \Delta t}{2}\right) & \frac{v_t \Delta t^2 \cos\left(\mu_{\theta,t} + \frac{\omega_t \Delta t}{2}\right)}{2} \\ 0 & \Delta t \end{bmatrix}$$

$$M_t = \begin{bmatrix} \alpha_1 v_t^2 + \alpha_2 \omega_t^2 & 0 \\ 0 & \alpha_3 v_t^2 + \alpha_4 \omega_t^2 \end{bmatrix},$$

where $\alpha_1, \alpha_2, \alpha_3, \alpha_4$ are parameters which may depend on choice of wheel encoder or IMU or fusion, the surface and electronic device wheels.

$$H_t = \begin{bmatrix} \frac{\partial f_{1,1}}{\partial x} & \frac{\partial f_{1,1}}{\partial y} & \frac{\partial f_{1,1}}{\partial \theta} \\ & \vdots & \\ \frac{\partial f_{1,P}}{\partial x} & \frac{\partial f_{1,P}}{\partial y} & \frac{\partial f_{1,P}}{\partial \theta} \\ \frac{\partial f_{2,1}}{\partial x} & \frac{\partial f_{2,1}}{\partial y} & \frac{\partial f_{2,1}}{\partial \theta} \\ & \vdots & \\ \frac{\partial f_{K,P}}{\partial x} & \frac{\partial f_{K,P}}{\partial y} & \frac{\partial f_{K,P}}{\partial \theta} \\ & I_S & \end{bmatrix}$$

is $(PK+S) \times 1$ matrix with $f_{i,j}$ indicating Euclidean distance of tag i from anchor as a function of the electronic device pose estimate $$\begin{bmatrix} \mu_{x,t-1} \\ \mu_{y,t-1} \\ \mu_{\theta,t-1} \end{bmatrix}$$

and anchor locations. $1_S$ is identity matrix of size $S \times S$.

$$\begin{bmatrix} \mu_x \\ \mu_y \\ \mu_\theta \end{bmatrix} = \begin{bmatrix} \mu_{x,t-1} \\ \mu_{y,t-1} \\ \mu_{\theta,t-1} \end{bmatrix} + \begin{bmatrix} v_t \Delta t \sin(\theta_t + \omega_t \Delta t/2) \\ v_t \Delta t \cos(\theta_t + \omega_t \Delta t/2) \\ \omega_t \Delta t \end{bmatrix}$$

$$\sum = G_t \Sigma_{t-1} G_t^T + V_t M_t V_t^T$$

$$Q_t = \text{diag}([\sigma_1^2 \ \cdots \ \sigma_{PK+S}^2]),$$

where first PK terms correspond to measurement noise for UWB tag 1 from the K anchors followed by UWB tag 2 from the K anchors and so on. The last S terms is from variance in GPS measurement noise or from any other sensor or any other source that directly gives location estimates as measurements.

$$K_t = \sum H_t^T \left( H_t \sum H_t^T + Q_t \right)^{-1}$$

$$\begin{bmatrix} \mu_{x,t} \\ \mu_{y,t} \\ \mu_{\theta,t} \end{bmatrix} = \begin{bmatrix} \mu_x \\ \mu_y \\ \mu_\theta \end{bmatrix} + K_t \left( r - h \left( \begin{bmatrix} \mu_x \\ \mu_y \\ \mu_\theta \end{bmatrix}, d, \begin{bmatrix} x_{a,1} & x_{a,2} & \cdots & x_{a,P} \\ y_{a,1} & y_{a,2} & & y_{a,P} \end{bmatrix}, T \right) \right),$$

wherein $K_t$ is the Kalman gain and the difference term that follows is called the innovation term.

$\Sigma_t = (I - K_t H_t) \Sigma$, where I is an identity matrix return $\Sigma_t$, $$\begin{bmatrix} \mu_{x,t} \\ \mu_{y,t} \\ \mu_{\theta,t} \end{bmatrix}$$

In certain embodiments, the parameters that may need on the fly tuning are $\sigma_i^2$ and $\alpha_i^2$. Tuning $\alpha_i^2$ is related to how the information from wheel encoders and IMU are fused together to give linear and angular speed estimates to the localization process. The tuning of $\sigma_i^2$ is related to knowing the quality of range measurement obtained by a tag from each of its sensors. Quality could be quantized by line of sight (LOS) or NLOS scenarios, although not limited thereto. It is also possible that some sensors are unavailable on the electronic device 210. For instance, some sensors may, unintentionally, stop providing inputs to the localization process due to hardware or firmware failure. As such, it may be desirable to switch to an alternative variant of the localization process in that case.

Additionally, there are alternative formulations for when the odometry information for deriving the motion model is not accessible. For example, there can be other filter based formulations wherein the motion model does not incorporate inputs from odometry like v, ω but instead uses alternative motion dynamic models which do not depend on knowledge of v, ω. For another example, there can be non-filtering based approaches as well for localization process. For instance, it is possible to have non-linear least squares (NLS) or in general non-linear optimization formulations for solving the localization problem using UWB two way ranging only. For instance, one formulation of the optimization is described in Equation (5)

$$\min_{X, \beta_i} \sum_i \beta_i \ell(r_i - q(X_{a,i} - X)) \qquad \text{Equation (5)}$$

As shown in Equation (5), the summation is over the anchor indices and $X_{a,i}$ indicates the anchor locations. X denotes the location of the UWB tag that are to be localized. Here, function q(A) computes the distance of vector A from the origin and $r_i$ are the ranging measurements from different anchors to the tag. The loss function $\ell$ (.) can be just a square operation or it could be any other function. Optimization problem can be solved using standard NLS optimizers like Levenberg Marquardt. The location estimates to multiple tags on the electronic device can give a heading direction for the electronic device.

In certain embodiments, multiple sensors drive the motion model and the measurement model. The IMU and/or the wheel encoders can both drive the motion model. That is, the linear and angular speed information can be made available to the localization process through measurements done using either or both these sensors. In other embodiments, multiple sensors drive the measurement model—one or multiple UWB two way ranging tags and/or GPS-RTK. This redundancy in providing inputs to the motion and measurement model through the sensors can be used to complement the weakness of each sensor adaptively. For example, wheel encoders are often more accurate for linear motion while IMUs are more accurate for rotational motion.

Before velocity estimates v, co are provided to the localization generator 240, it is be possible to first combine the estimates $v_{wheel}$, $\omega_{wheel}$ and $v_{imu}$, $\omega_{imu}$ to identify the type of motion with high confidence. The type of motion can be moving in a straight line versus rotating. This combining operation can change the noise covariance $R_t$ in the motion model. The information from the two sensors IMU and wheel encoders can be fused so as to have a small noise covariance.

For example, the method 320 of FIG. 3C illustrates an example of how velocity estimated by the wheel encoders and the IMU can be fused together for localization. In step 322, the localization generator 240 identifies a scenario. The method 320 describes three scenarios, (scenarios 324a, scenarios 324b, through scenarios 324n), however more or less scenarios can be included in the method 320.

The scenario 324a indicates that the electronic device 210 is moving in a straight line. Based on the scenario 324a, the function 326a could use the wheel encoder based velocities in the motion model.

The scenario 324b indicates that the electronic device is rotating. Based on the scenario 324b, the function 326b could use IMU based velocities in the motion model.

The scenario 324n indicates that the electronic is both rotating and translating. Based on the scenario 324n, the function 326n can take the linear combination of the linear and angular velocity estimates based on both the IMU and wheel encoder. Additionally, more weight can be assigned to the IMU when more rotation occurs. Similarly, more weight can be assigned to the wheel encoders when more translation occurs.

Depending on the identified scenario the corresponding function is used in the localization process by the localization generator 240. For example, when the identified scenario is scenario 324a, the linear and angular velocities (v, ω) of the function 326a is provided to the localization generator 240. In another example, when the identified scenario is scenario 324b, the linear and angular velocities (v, ω) of the function 326b is provided to the localization generator 240.

The method 330 of FIG. 3D describes identifying an event that indicates that motion data based on IMU (and not wheel encoder) is used for the motion model. In step 331, the electronic device 210 the wheel encoder and IMU motion data are used to generate a single location estimate of the linear and angular velocities. In step 332, the electronic device 210 uses a one-step motion model to generate location estimates of the wheel encoder and IMU separately. In step 333, the electronic device 210 obtains additional motion information, via other sensors such as ranging information (via UWB) and/or GPS.

In step 334 the location estimates of the wheel encoder (of step 332), the location estimates of the IMU (of step 332), the location estimate based on both the IMU and wheel encoder (of step 331), and the location estimates from the other sensors (of step 333) are stored in the information repository 245 of FIG. 2C. The electronic device 210, in step 335, determines whether a wheel is slipping. For example, if the pose estimates from the wheel encoder overshoots (indicates that the electronic device 210 is further than the other location estimates) the other sensors by a preset threshold over a number of frames, then the electronic device declares that the wheels are slipping. The number of frames is the number of estimates that are presented to the decision of step 335. For example, a single estimate may not include enough information to determine whether a wheel is slipping.

If the electronic device 210 determines that the wheel is not slipping, then in step 336 the electronic device 210 performs the localization using both the wheel encoder and IMU estimates. If the electronic device determines that that the wheel is slipping, then in step 337 the electronic device uses performs localization using IMU based motion instead of incorporating the wheel encoder. That is, in step 337, the electronic device 210 provides linear and angular velocity estimates to the motion model using the motion data form the IMU sensor(s) only.

The method 340 describes using multiple localization processes in parallel and using a combination of different sensors. The method 340 uses a single process in default but in response to a triggering event, the localization process will use another process to perform the localization of the electronic device. For example, to improve the accuracy of the localization process, the method 340 describes using multiple localization processes implemented along with a selection criterion for which process to choose when. For example, the method 340 describes how to use NLS and filter-based approaches together. Since NLS based localization (step 343) is memoryless and depends only on the current ranging measurements between the anchors 204 and the tags 250, it can start giving reasonable localization output as soon as the mower and sensors are powered up. In contrast the filter-based approach, such as those in steps 341 and 342 usually take some time to initialize. Therefore, the localization process could use NLS based output for better initialization of the filter followed by using the filter in long run. It is noted that sometimes IMU and/or wheel encoders may result in wrong readings due to interaction with environment, in such cases the filter can give a wrong heading or X-Y location predictions. When the IMU and/or wheel encoders provide wrong heading or X-Y location predictions, the NLS can be used as a backup to reinitialize the filter-based localization algorithm.

In step 341, the electronic device 210 initializes the Bays filter based localization process. In step 342, the electronic device 210 runs the Bays filter based localization process with UWB (ranging information), IMU, and wheel encoder fusion. The Bays filter based localization process is described above with respect to Equation (1). In step 343, the electronic device performs NLS based localization process for multiple UWB tags. The NLS based localization process for multiple UWB tags is described above with respect to Equation (5). It is noted that the step 342 and 343 can be performed at or near the same time. this enables the decision of step 344 to compare the results of step 342 with the results of step 343.

In step 344, the electronic device compares the results of steps 342 and 343 to a set of parameters. For example, the electronic device determines whether (i) the heading estimates (from the steps 342 and 343) are within predefined degrees, (ii) the location estimates (from the steps 342 and 343) are within a predefined distance, or (iii) the time <T (from the steps 342 and 343).

When the heading estimates are within predefined distance, location estimates within the predefined distance, or time <T the electronic device, at step 345 performs the path planning using the location estimates from the byes filter of step 342. It is noted that the results of step 344 are provided to the step 342 and used for subsequent iterations of the Bayes filter of step 342.

When of the heading estimates are not within predefined distance, the location estimates are not within the predefined distance, and time >T the electronic device 210, at step 346 performs the path planning using the location estimates from the step 343. 342. It is noted that the when the path planning uses the location estimates from the step 343, the Bayes filter of Step 341 is re-initialized.

Although FIGS. 3A, 3B, 3C, 3D, and 3E illustrates example methods, various changes may be made to FIGS. 3A, 3B, 3C, 3D, and 3E. For example, while shown as a series of steps, various steps in FIGS. 3A, 3B, 3C, 3D, and 3E could overlap, occur in parallel, or occur any number of times.

FIGS. 4A and 4B illustrate example methods for sensor updating in accordance with an embodiment of this disclosure. In particular, FIG. 4A illustrates the method 400 for adaptive noise variance of UWB for different epochs of the localization process described in FIGS. 3A through 3E. FIG. 4B illustrates the method 410 for adaptive noise variance for sensors of the of the localization process described in FIGS. 3A through 3E based on the timing information.

Embodiments of the present disclosure take into consideration that all sensor inputs are not available simultaneously as well as the update rate from different sensors may be different. As such, different localization processes can be performed based on the update rate of the sensors and how the information from different sensors is associated for each epoch of the localization processes. For example, the method 400 of FIG. 4A illustrates that the update rate of the UWB ranging is done at 10 Hz (step 402) while update rate of the IMU and/or wheel encoders is at 20Hz (step 404). If the wheel encoders and IMU enable reliable relative motion prediction, then running the localization process at 20 Hz can be desirable (step 406). Since fresh UWB measurements are available at every alternate epoch, the noise variance can be adapted for each of the alternate epoch of the localization process.

For another example, the method 410 of FIG. 4B illustrates that the time of sensor updates can be different. For example, the latest sensor 1 measurement can be at time T1 (step 412) while the latest sensor 2 measurement can be at time T2 (step 414). As a result the localization process can run at current time T3 (step 416). If the difference between the time T3 and T1 is greater than T (where T is a predetermined value), then a high noise variation for sensor 1 can be used. Alternatively, if the difference between the time T3 and T1 is less than T, then a small noise variance for sensor 1 can be used. Additionally, if the difference between T3 and T2 is greater than T' (where T' is a predetermined value), then a high noise variance for sensor 1 is used. Alternatively, if the difference between the time T3 and T2 is less than T', then a small noise variance for sensor 1 can be used.

Although FIGS. 4A and 4B illustrates example methods, various changes may be made to FIGS. 4A and 4B. For example, while shown as a series of steps, various steps in FIGS. 4A and 4B could overlap, occur in parallel, or occur any number of times.

Figure 5A:
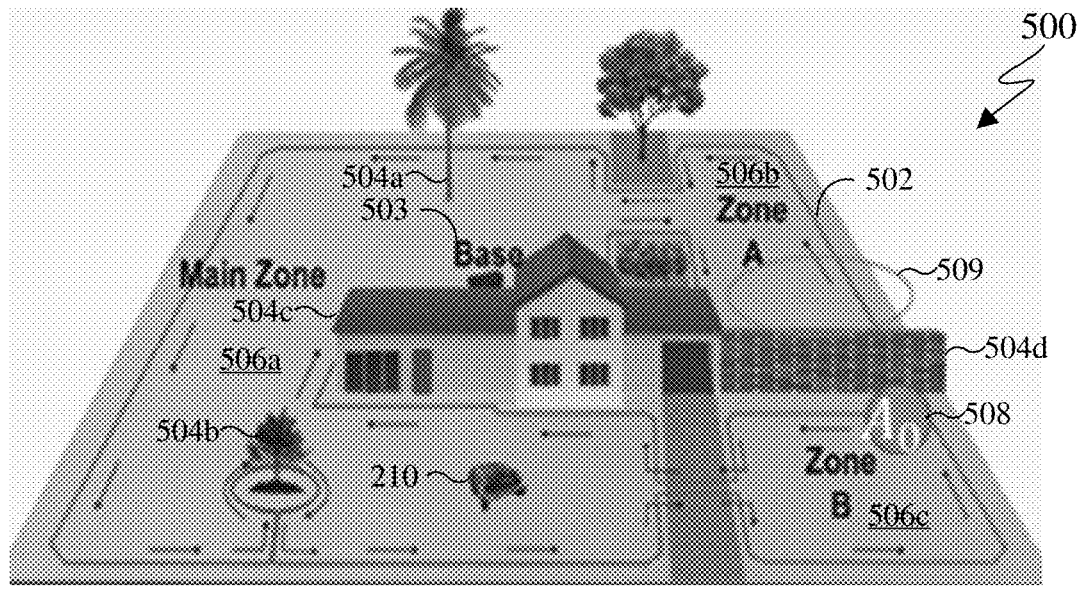
FIG. 5A illustrates an example diagram of an electronic device within an area in accordance with an embodiment of this disclosure.
Figure 5B:
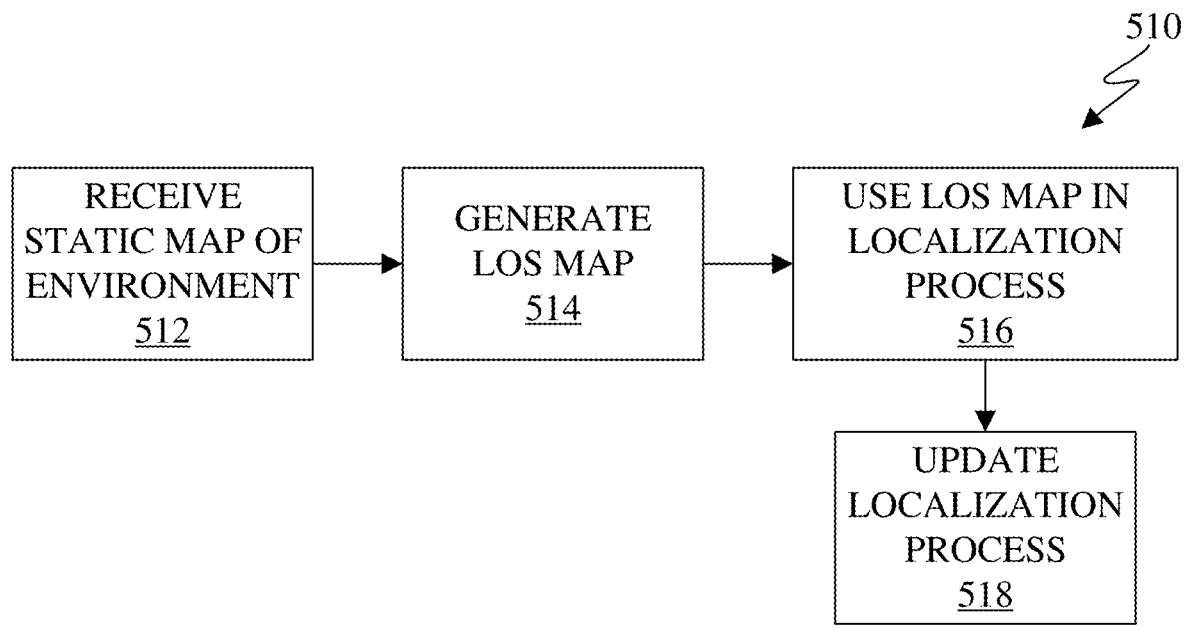
FIGS. 5B and 5C, illustrate example methods for selecting noise variance in accordance with an embodiment of this disclosure.
Figure 5C:
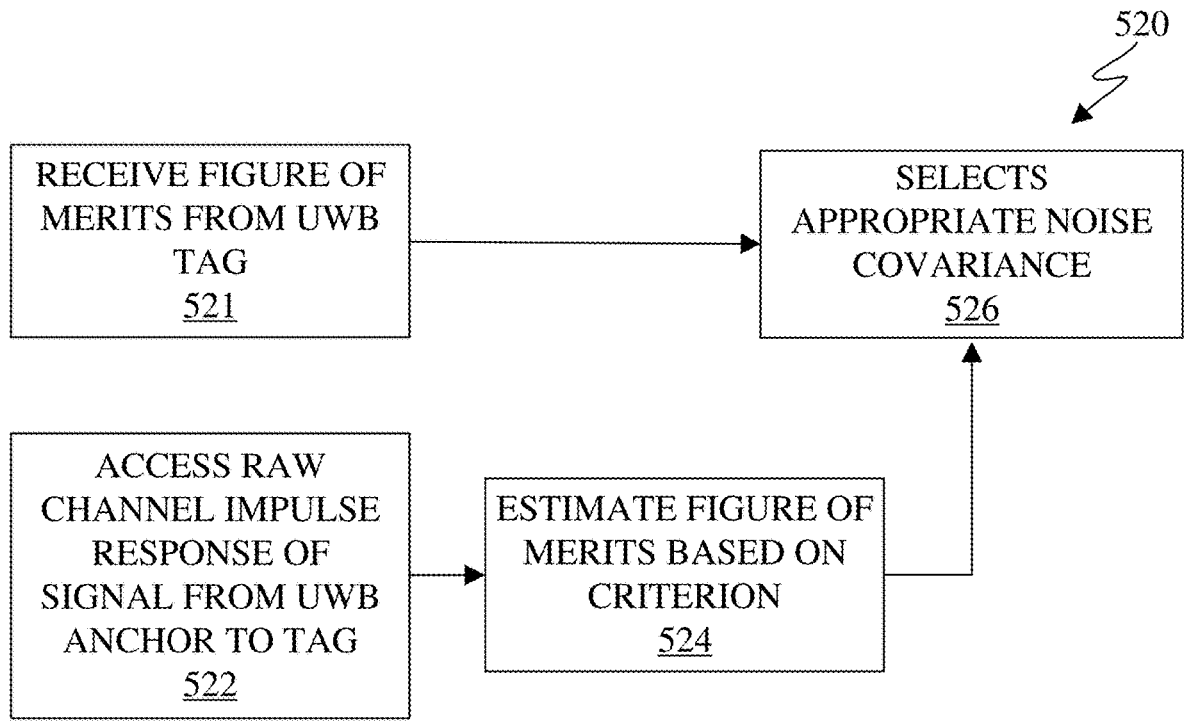
Figure 5D:
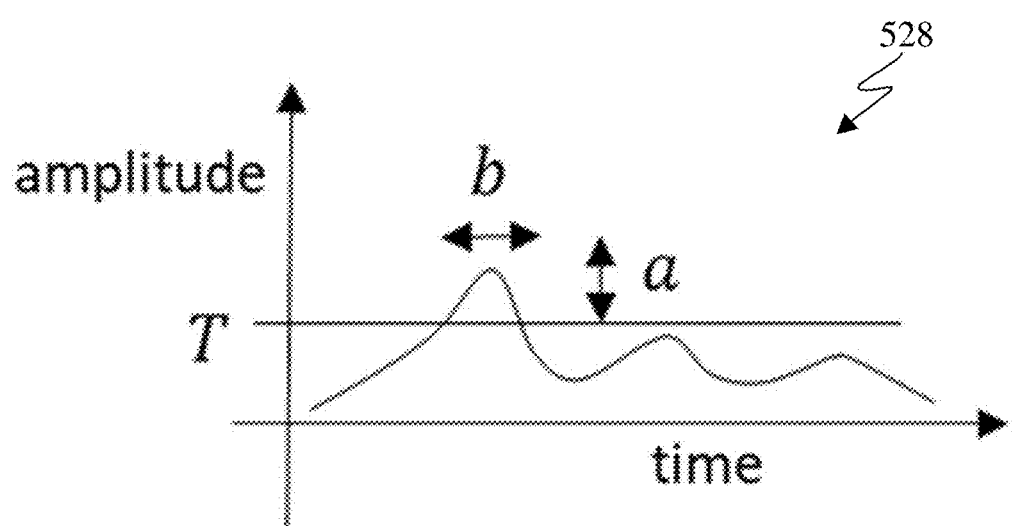
FIG. 5D illustrates an example graph for selecting noise variance in accordance with an embodiment of this disclosure.
Figure 5E:
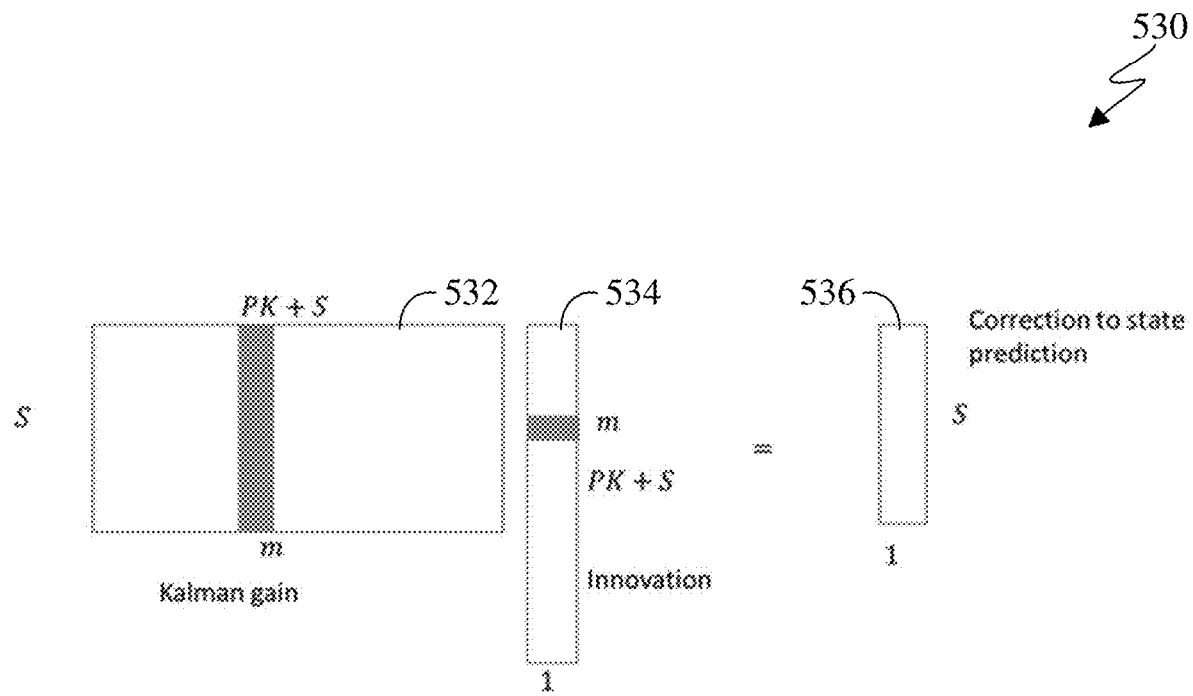
FIG. 5E illustrates an example of partial measurement loss in accordance with an embodiment of this disclosure.
Figure 5F:
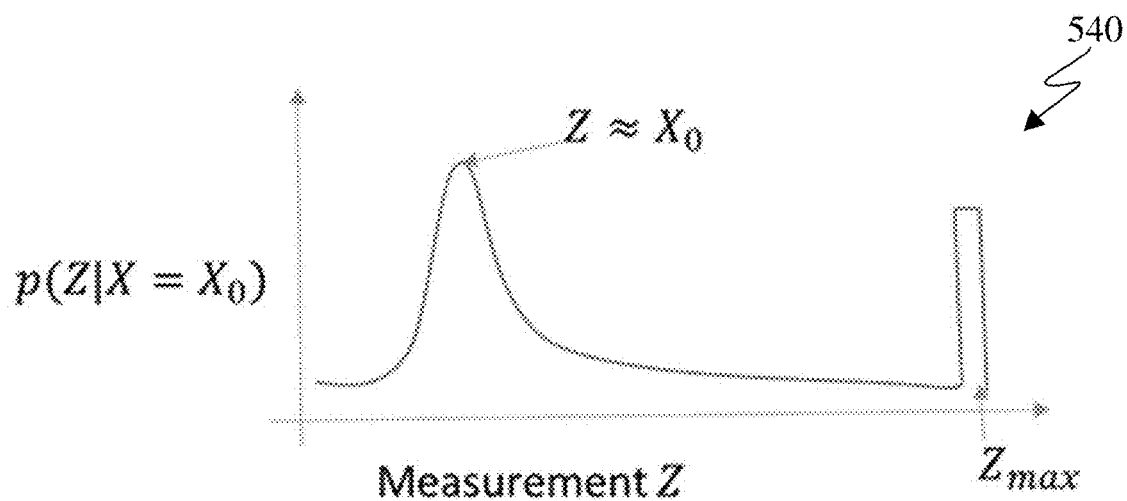
FIG. 5F illustrates a graph for accounting of partial measurement loss in accordance with an embodiment of this disclosure.

FIGS. 5A, 5B, 5C, 5D, 5E, and 5F illustrate example methods for selecting noise variance based on LOS or NLOS. FIG. 5A illustrates an example diagram 500 of an electronic device within an area in accordance with an embodiment of this disclosure. FIGS. 5B, and 5C illustrate example methods 510 and 520 for selecting noise variance in accordance with an embodiment of this disclosure. FIG. 5D illustrates an example graph 528 for selecting noise variance in accordance with an embodiment of this disclosure. FIG. 5E illustrates an example 530 of partial measurement loss in accordance with an embodiment of this disclosure. FIG. 5F illustrates a graph 540 for accounting of partial measurement loss in accordance with an embodiment of this disclosure. In particular, the graph 540 describes accounting for partial measurement losses by modifying the measurement model. The methods 510 and 520 can be performed by the electronic device 100 of FIG. 1 and localization generator of the electronic device 210 of FIG. 2C. For ease of explanation, methods 510 and 520 are performed by the electronic device 210.

The diagram 500 of FIG. 5A illustrates a yard with three different lawns, distinguished by zones, such as a main zone 506a, zone A 506b, and zone B 506c, which the electronic device 210 traverses. The yard also includes permanent obstacles such as the tree 504a, the tree 504b, the house 504c, and the fence 504d. In this example, the fence 504d separates the zone A 506b from the zone B 506c. A base 503, which is located within the main zone 506a, can be a charging base which charges the electronic device 210, when the electronic device 210 is not traversing the yard 502. The base 503 can also protect the electronic device 210 from the elements (rain snow, hail, and the like) when the electronic device 210 is not traversing the yard 502. An anchor 508, which is located in the zone B 506c can be similar to the anchors 204 of FIG. 2A. Due to the fence 504d, electronic device 210 may be unable to receive ranging information from the anchor 508 while in the area 509. That is, due to the height of the fence 504d, the electronic device 210 may have NLOS with the anchor 508, and therefore be unable to obtain ranging information from the anchor 508.

According to embodiments of the present disclosure, it is possible to identify regions wherein the UWB ranging estimates from certain anchors are likely not accurate by observing a static map of the environment, such as the area 509. For example, the electronic device 210 can first identify such regions with a knowledge of the anchor placements. To identify such regions, a line can be traced from the anchor locations to any point on the map and identifying if at least one obstacle intersects this line. The information of the line of sight (LOS)/NLOS conditions for every anchor to each possible pose of the electronic device within the lawn is fed as an input to the localization process dented as $LOS_{map}$. The localization process choses appropriate $\sigma_i^2$ values for each tag-anchor ranging measurement by selecting noise variance in UWB ranging estimates either as $\sigma_{LOS}^2$ or $\sigma_{NLOS}^2$ depending on whether the estimated electronic device location has LOS or NLOS links to the anchors based on $LOS_{map}$.

The method 510 of FIG. 5B describes the process generating the static map of the environment to identify both LOS and NLOS areas and then using the LOS and NLOS areas of the static map to improve the localization process described with respect to FIGS. 3A through 3E above. In step 512, the electronic device receives a static map of the environment. The static map can be similar to the yard 202 of FIG. 2A, which shows the location of the base 503, various obstacles (such as the tree 504a, the tree 504b, the house 504c, and the fence 504d), and the anchors (such as anchors 204 of FIG. 2A and anchor 508 of FIG. 5A).

In step 514, the electronic device 210 generates a LOS map. In certain embodiments, the LOS map is generated by performing a Ray tracing process. The generated LOS map includes a list of all locations on the map with corresponding LOS anchors. That is, the generated LOS map indicates the regions with a LOS to an anchor and regions with NLOS to an anchor (such as the area 509 of FIG. 5A).

In step 516, the electronic device 210 uses the generated LOS map in the localization process, which is described above in FIGS. 3A through 3E. In step 518, the electronic device 210 updates the localization process based on the generated LOS map. For example, if the previous state is $X_t$ then based on the LOS map it is possible to select an appropriate $\sigma_i^2$ to each anchor for the next step update of the localization process.

It is noted that the method 510 is based on a static map, which includes obstacles that do not significantly change over time, such as a structure, tree, fence, and the like. however it is possible that a dynamic object, such as a human walking in the yard could block the LOS between the electronic device 210 and an anchor (such as the anchor 204 of FIG. 2A and the anchor 508 of FIG. 5A). Therefore, due to a dynamic blocking, due to a dynamic object, the $\sigma_i^2$ as identified in the method 510 may not be accurate in practice. In such cases, the electronic device 210 performs on the fly figure tuning of the noise based on figure of merit that the UWB tag reports. It is noted that not all tags (such as the tags 250) need to include the feature of identify a dynamic blocking.

In certain embodiments, to generate accurate localization results from UWB ranging, it may be desirable to have LOS coverage of at least K (for instance K=4) anchors for UWB ranging based localization results. Therefore, the process below describes the steps to maximizing the area covered by K LOS anchors in the lawn. Using a static map, generated in the method 510, the electronic device 210 can identify potential locations of additional anchors to maximize the LOS coverage for the electronic device 210 as it traverses through the yard. First, an anchor 1 is placed to at a location which increases the LOS in the map. Second, anchor 2 is placed to overall the LOS coverage of anchor 1 within a minimum distance between anchor 1 and anchor 2. It is noted that when there are multiple candidate locations, the electronic device 210 selects the location that has largest distance to Anchor 1. The electronic device sets iAnchor to 3. Third, the electronic devices places Anchor iAnchor to increase overlap with LOS coverage of Anchors 1 to iAnchor−1 with a minimum distance D between any two anchors. If there are multiple candidates, pick the one that has largest minimum of all pairwise distances between anchors. Set iAnchor=iAnchor+1. The third step is repeated until iAnchor=K+1. Fourth, the electronic device record all locations in map m covered by at least K anchors in set Φ in the information repository 245 of FIG. 2C. Fifth, when N≥iAnchor, place Anchor iAnchor to maximize the new area which can be added to Φ. If there is no new area that can be added to Φ by addition of one anchor, pick the location for the anchor which has the maximum LOS coverage area. Set iAnchor=iAnchor+1. The fifth step is repeated, as necessary.

The method 520 of FIG. 5C describes the process of using the raw channel impulse response of UWB signals to estimate if the signal is LOS or NLOS in real time. In step 521, the electronic device receives a figure of merits from the UWB tags. For example, the UWB tags report the figure of merit to the processor (such as the processor 140) of the electronic device 210. In step 522, the electronic device 210 also accesses the raw channel impulse response of a signal from the UWB anchor to the tag. In step 524, the electronic device 210 estimates the figure of merits based on a criterion. In step 526, the electronic device 210 selects an appropriate noise covariance from either the received figure of merits of step 521 or the estimated figure of merits of the step 524. That is, the localization process selects an appropriate noise covariance for LOS or NLOS based on the figure of merits.

The graph 528 of FIG. 5D describes selecting noise variance. In particular, if the amplitude of the first peak (which less than T) is a +T and the total time for which the signal stays above T is b, and if $$\frac{a}{b}$$

is greater than T', then the electronic device 210 declares the link as LOS. Otherwise the link is NLOS.

In certain embodiments, the localization process also addresses partial or total measurement loss from certain sensors. FIG. 5E can be used for the localization process driven by Kalman filters or their variants to addresses partial or total measurement loss from certain sensors. For other filtering paradigms like particle filters, it can be possible to modify the measurement model to account for partial measurement losses by setting a very large measurement value $Z_{max}$ in such scenarios. This is equivalent to having a non-zero probability for having an arbitrary large noise variance that results in the measurement loss in such formulations.

The example 530 of FIG. 5D illustrates addressing a partial measurement loss for a Kalman filter based localization process. The example 530 includes a Kalman Gain block 532 is, an innovation block 534, and a correction block 536. The term m is the innovation that is missing due to measurement loss. The electronic device deletes the mth column in the Kalman Gain block 532 and the mth row in the innovation block 534 for the particular iteration of the Kalman filter (or variants) to generate the correction block 536.

Although FIGS. 5A through 5F illustrates example methods, various changes may be made to FIGS. 5A through 5F. For example, while shown as a series of steps, various steps in any of the methods of FIGS. 5B and 5C could overlap, occur in parallel, or occur any number of times.

FIGS. 6A, 6B, 6C, 6D, 6E, and 6F describe the process of the electronic device 210 planning a path within an area. The area can be in indoor area (such as an area used by an autonomous vacuum cleaner or an autonomous mop), an outdoor area (such as an area used by an autonomous lawn mower), or a pool (such as an area used by an automatic pool cleaner). To plan a path within the area, the electronic device 210 identifies a path that enables the electronic device 210 to move over all of the desired points within a given area. FIG. 7A illustrates example paths within various areas. That is the electronic device 210, first generates a path to traverse the area within a border while avoiding known obstacles. However, if there is an unplanned (not previously known) obstacle in the environment, then the electronic device 210 deviates from its path leaving some area that is not traversed. In addition to known deviations due to a previously unknown obstacle, there could also be unknown areas that were not traversed due to localization errors. As such FIGS. 6A, 6B, 6C, 6D, 6E, and 6F describe the process of the electronic device 210 planning a path within an area and traversing around previously unknown obstacles and attempting to traverse the previously missed areas at a later time.

Figure 6A:
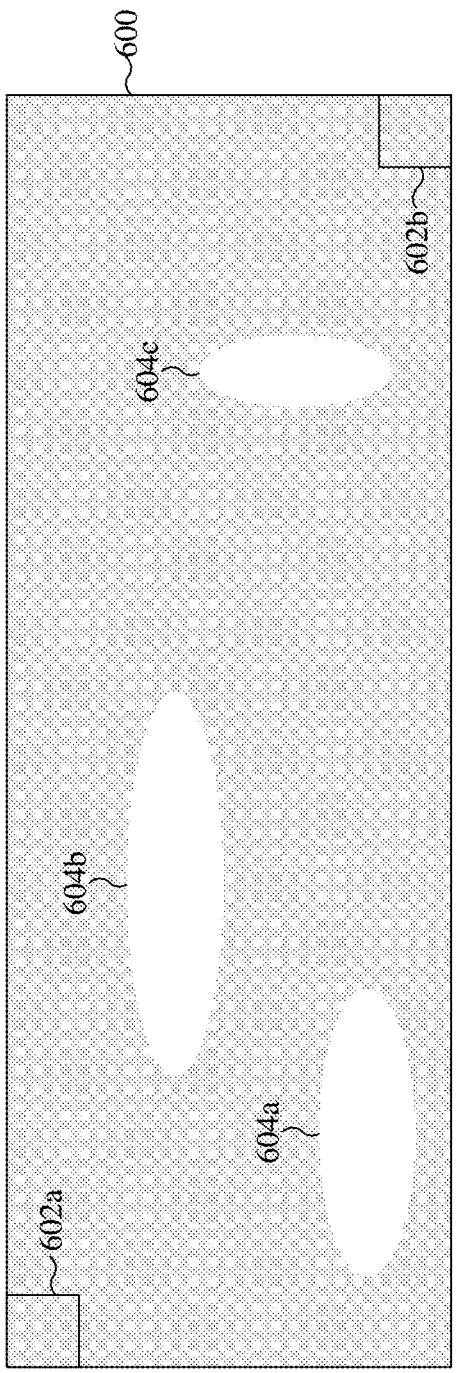
FIG. 6A illustrates an example area with obstacles in accordance with an embodiment of this disclosure.
Figure 6B:
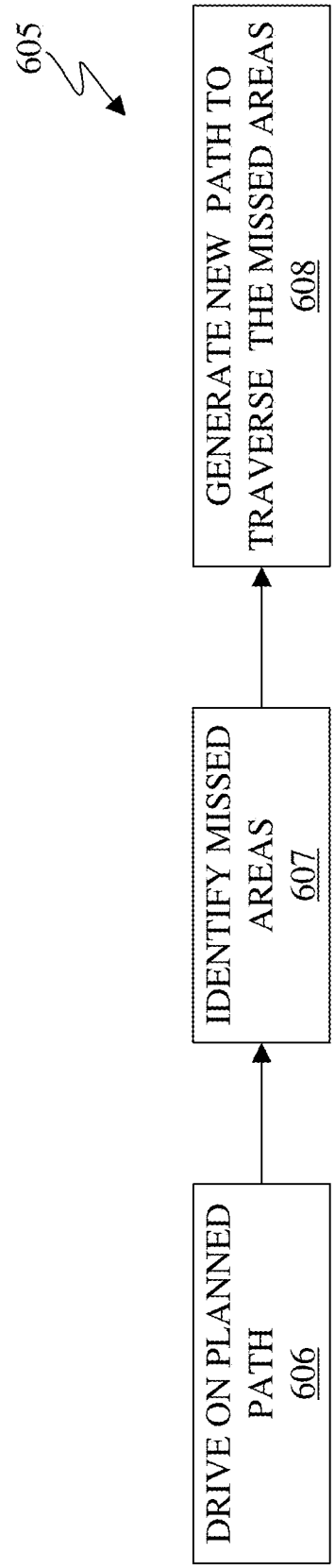
FIGS. 6B and 6C illustrate example methods for traversing the area in accordance with an embodiment of this disclosure.
Figure 6C:
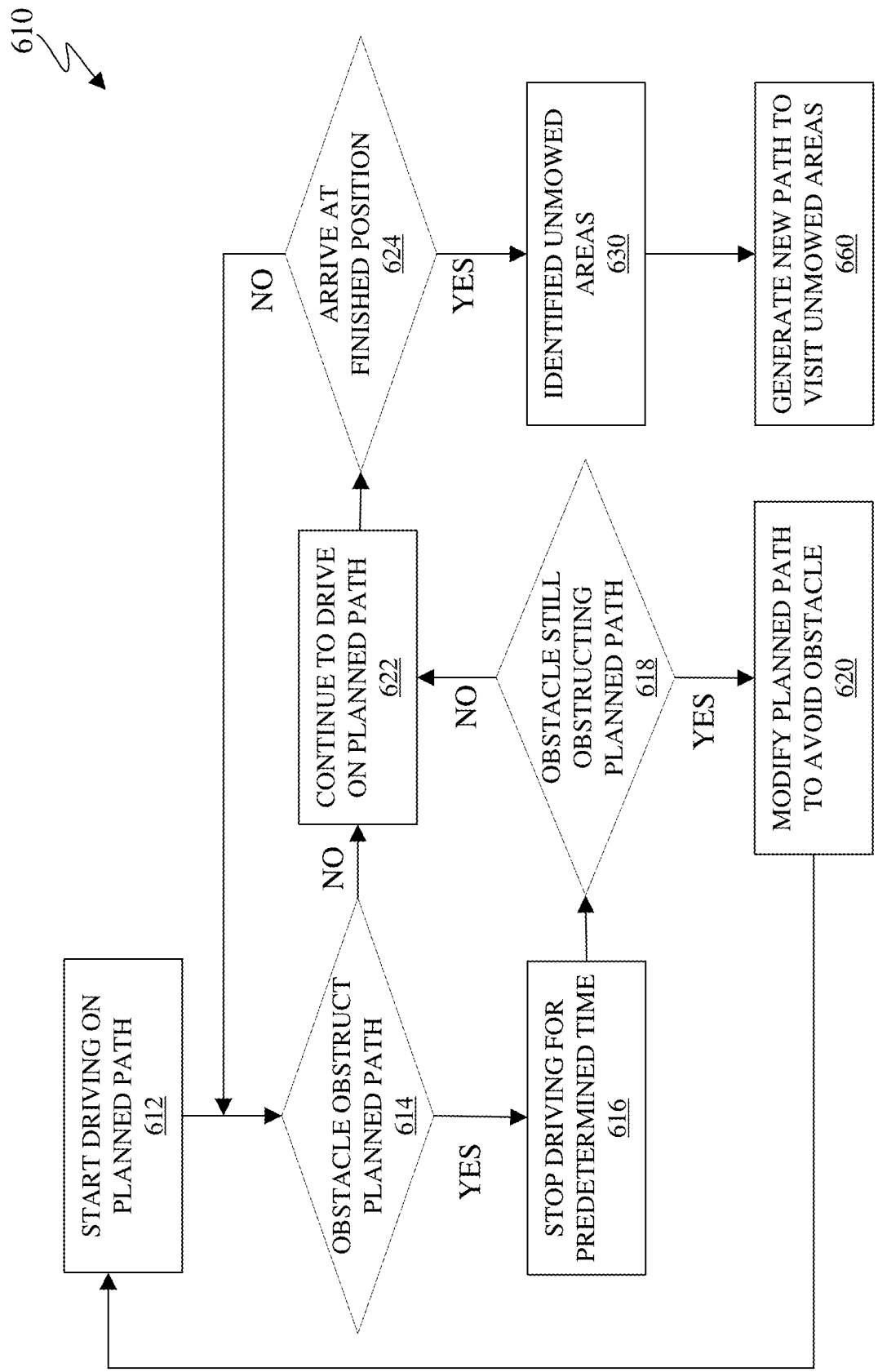
Figure 6D:
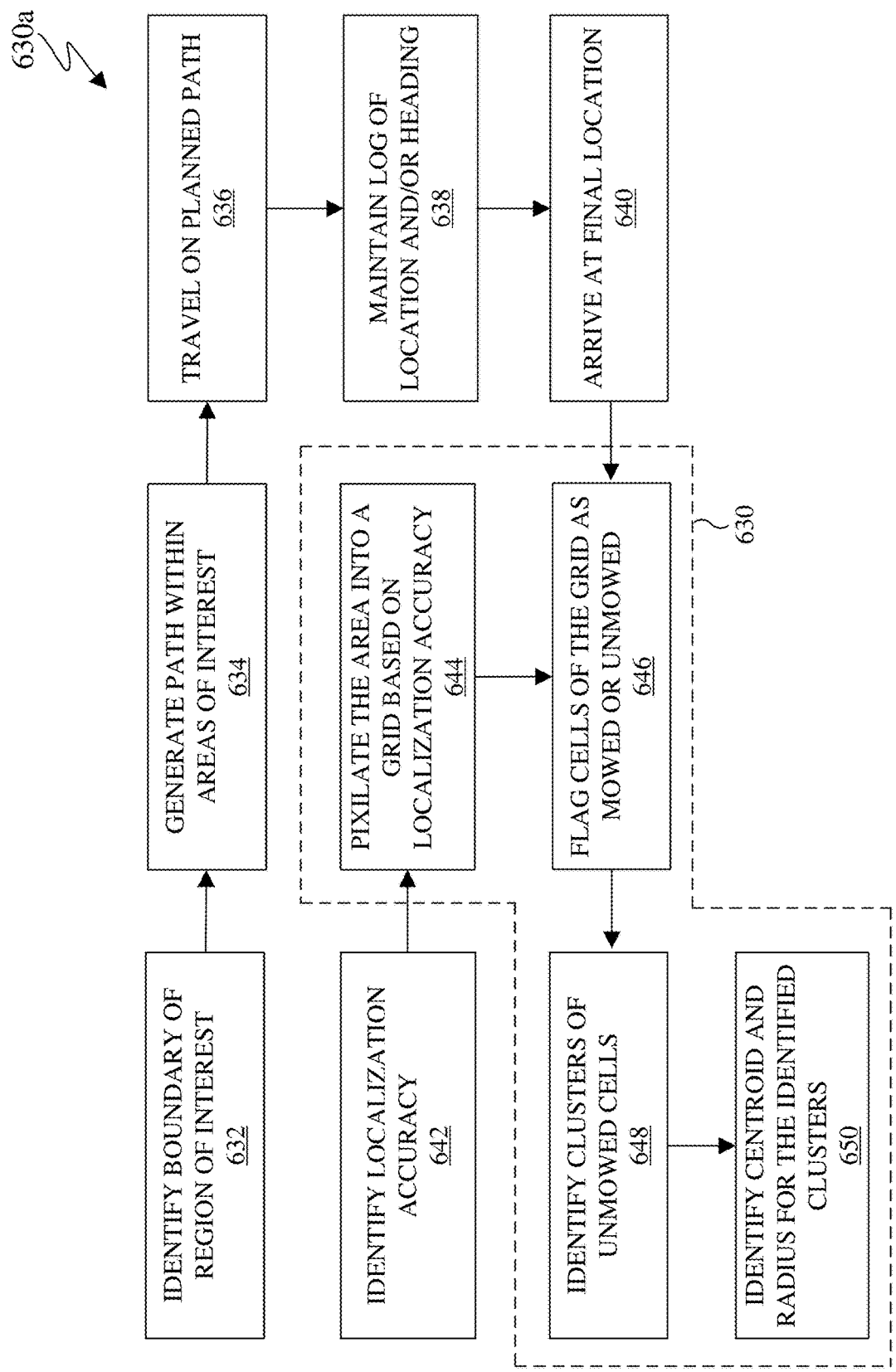
FIG. 6D illustrates an example method for identifying unmowed regions in accordance with an embodiment of this disclosure.
Figure 6E:
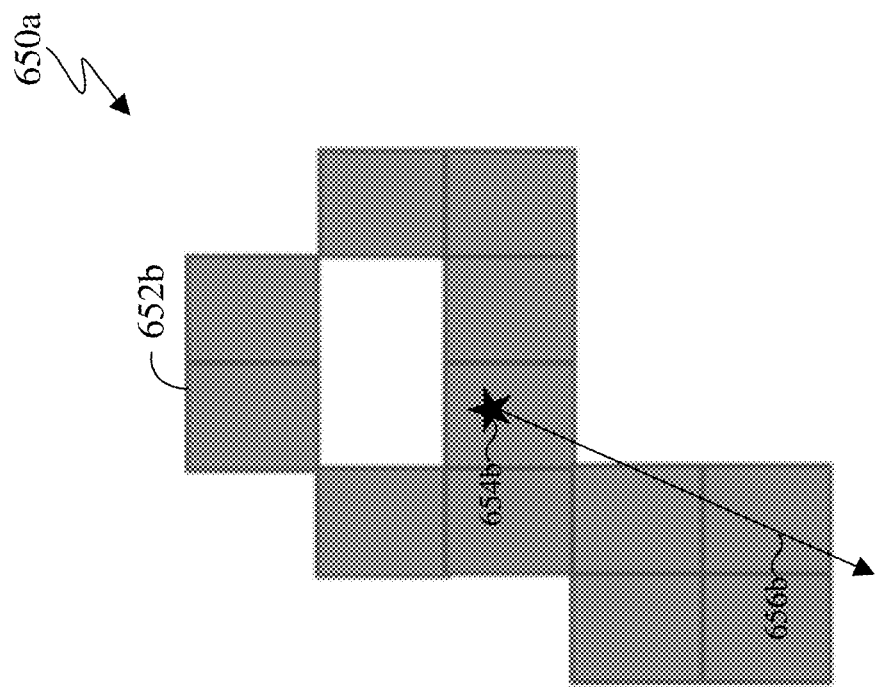
FIG. 6E illustrates an example unmowed area according to the method of FIG. 6D in accordance with an embodiment of this disclosure.
Figure 6E:
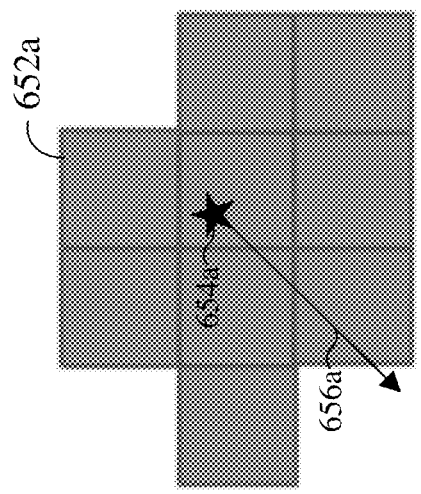
Figure 6F:
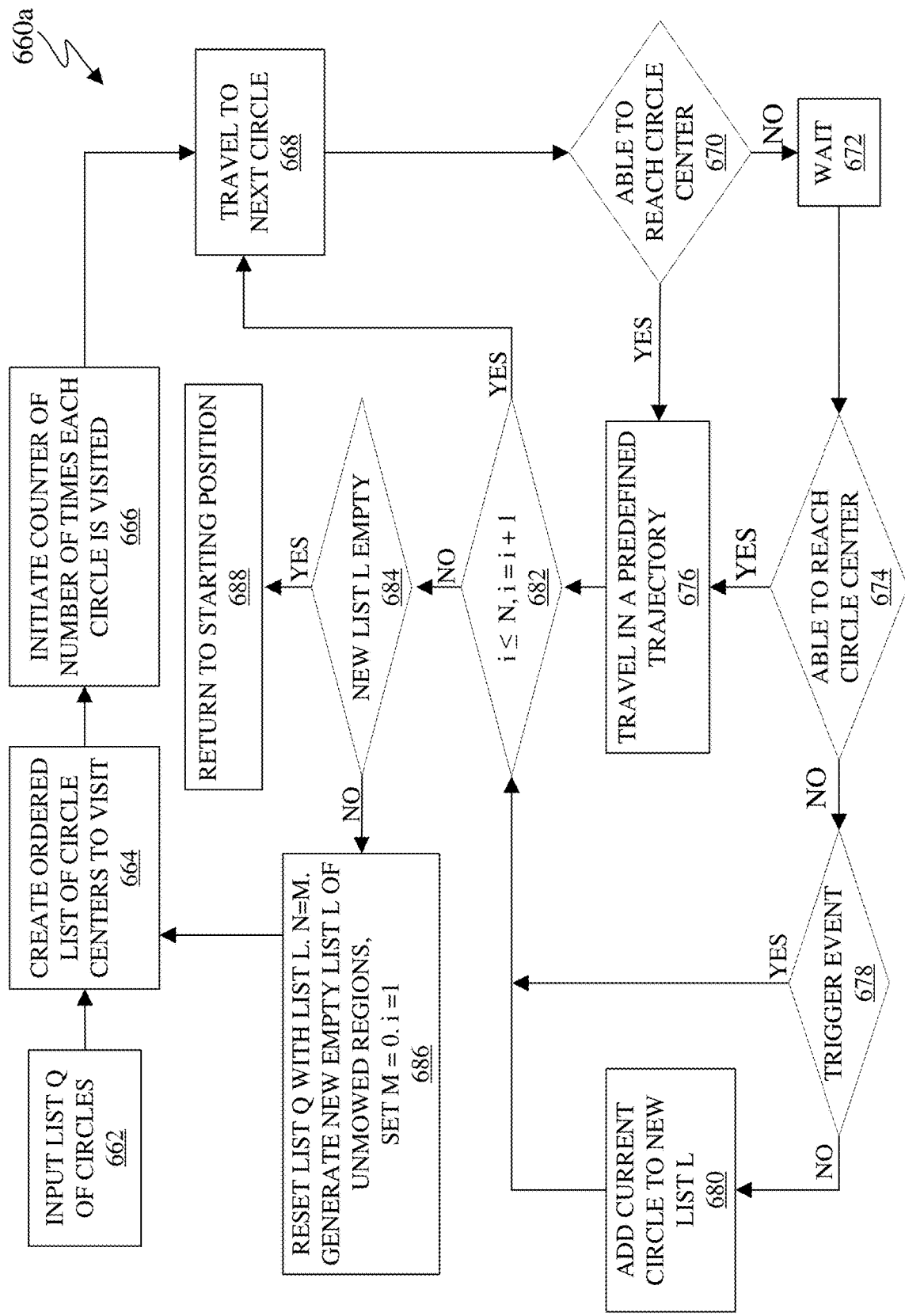
FIG. 6F illustrates an example method to travel the unmowed locations in accordance with an embodiment of this disclosure.

FIG. 6A illustrates an example area 600 with obstacles in accordance with an embodiment of this disclosure. FIGS. 6B and 6C illustrate example methods 605 and 610 for traversing the area in accordance with an embodiment of this disclosure. FIG. 6D illustrates an example method 630a for identifying unmowed regions in accordance with an embodiment of this disclosure. It is noted that the method 630a could be included in the method 610 of FIG. 6C. FIG. 6E illustrates an example unmowed area according to the method of FIG. 6D in accordance with an embodiment of this disclosure. FIG. 6F illustrates an example method 660a to travel the unmowed locations in accordance with an embodiment of this disclosure. It is noted that the method 660a could be included in the method 610 of FIG. 6C. The methods 605, 610, 630a, and 660a can be performed by the electronic device 100 of FIG. 1 and localization generator of the electronic device 210 of FIG. 2C. For ease of explanation, methods 605, 610, 630a, and 660a are performed by the electronic device 210.

The area 600 of FIG. 6A illustrates an example lawn with multiple permanent obstacles. The area 600 can be a yard such as the diagram 500 of FIG. 5A, or an area that is inside a building such as a home or office complex. The electronic device 210 is able to traverse the area 600 from a start position 602a to an end position 602b while traversing as much of the area as possible. After the electronic device travels throughout the area 600 and arrives at the end position 602b, the electronic device 210 can identify patches that were not traversed, such as the unmowed areas 604a, 604b. and 604c, before returning to the docking/home station (such as the base 503 of FIG. 5A. The unmowed areas 604a, 604b. and 604c can be caused by a localization error which causes the electronic device to miss traversing a certain portion of the area 600. Additionally, the unmowed areas 604a, 604b. and 604c can be caused by a dynamic obstacle, such as a toy that was left in the area 600, an animal (such as a pet or livestock) or human that is located in the area 600. The dynamic obstacle can be an object that is detected by the obstacle avoidance sensors 226 of the FIG. 2C. That is, the dynamic obstacle is an object that is not located in a in the area 600 during the training phase of the area 600 such as a structure, tree, or shrubbery.

According to embodiments of the present disclosure, the electronic device 210 identifies the shortest possible path (the minimum path length) to go from the current electronic device position (end position 602b) to the start position 602a while visiting all the unmowed areas 604a, 604b. and 604c. That is, after the electronic device 210 arrives at the end position 602b and identifies the unmowed areas 604a, 604b. and 604c. Then, the electronic device 210 identifies and travels the shortest path between its current location and its docking/home location while visiting each of the identified unmowed areas 604a, 604b. and 604c. It is noted, that the location and shape of the unmowed areas can differ from one another as illustrated) in FIG. 6A. Additionally, even after the electronic device 210 visits an unmowed area, there is a possibility that the dynamic obstacle still persists making it not possible to mow (traverse) the unmowed regions even after another attempt. By generating an efficient path strategy, the mowing time can be reduced which can increase the battery life of the electronic device and the anchors 204.

The method 605 of FIG. 6B illustrates a high-level method that the electronic device operates while performing path coverage to identify and revisit any missed areas. In step 606, the electronic device 210 drives on a planned path. That is, the electronic device 210 traverses the area 600 from the start location 602 to the end position 602b and avoids any known obstacles. After the electronic device finishes its planned path and arrives at the finish position, such as the end position 602b, the electronic device 210 identifies missed areas (step 607). The missed area are locations that the electronic device did not cover while it traversed the area 600. In step 608, the electronic device generates a new path to traverse the missed areas. That is, the electronic device 210 re-plans a path the visit and traverse the identified missed areas.

The method 610 of FIG. 6C provides detailed description of the method 605 of FIG. 6B. The electronic device 210 starts to travel on a planned path. However, while traveling on its planned path the electronic device 210 may encounter a dynamic obstacle. If the dynamic obstacle persists for more than a time threshold, then the electronic device 210 re-plans its path to go around the obstacle. The electronic device 210 keeps a track of its location all the time it navigates. After reaching the finishing position, it computes an estimate of the unmowed regions in the lawn using the Method 630a of FIG. 6D. For instance, the electronic device 210 can identify, based on its historical location, a number of discounted unmowed regions, such as the region as illustrated in FIG. 6E.

In certain embodiments, while the electronic device 210 avoids dynamic obstacles, it may flag an unmowed region as potentially permanent obstacle or temporary based on other sensors. For instance, a camera image may show the obstacle is a human, in which it is likely to move away in some time. If a camera image shows a heavy object placed on the lawn, like furniture the chances of it moving are less. Thus, the output of method 630a could also be circle centers with corresponding radius and an associated quality indicator Q, which indicates how likely is the obstacle to move away.

In step 612, the electronic device 210 starts to travel on a planned path. For example, the electronic device 210 starts from the start position 602a and traverses the area 600 in parallel lines or a spiral, while avoiding known obstacles. In step 614, the electronic device 210 determines whether an unknown obstacle (such as a dynamic obstacle) is blocking its path. When the electronic device 210 determines that an unknown obstacle is blocking its path, the electronic device 210 continues to traverse the area 600 on its originally planned path, in step 622. Alternatively, when the electronic device 210 determines that an unknown obstacle is blocking its path, in step 616, the electronic device 210 waits for a predetermined period of time. Upon the expiration of the period of time the electronic device determines in step 618 whether the obstacle is still obstructing the path. For example, if the obstacle is an animal, the electronic device may spook the animal causing it to move off of the original path. If the object did not move, in step 620, the electronic device 210 modifies the originally planned path the avoid the obstacle. That is, the electronic device 210 modifies the original planed path to account for the new obstacle. As such, avoiding the obstacle creates a missed area. If the object moved, then in step 622, the electronic device 210 continues to traverse the area 600 on its originally planned path.

In step 624, the electronic device 210 determines whether it is at the finished position such as the end position 602b of FIG. 6A, based on its current location. When the electronic device 210 is not at the finish position, returning to step 614, the electronic device 210 determines whether an obstacle is blocking the planned path which is preventing the electronic device 210 from moving forward. Alternatively, upon determining that the electronic device 210 is at the finish position, in step 630 the electronic device 210 identifies the unmowed areas (the areas that were missed due to a dynamic obstacle or poor localization). For example, based on the localization process, the electronic device 210 identifies portions of the area 600 that were missed, such as the unmowed areas 604a, 604b, and 604c. The method 630a of FIG. 6D describes the process of identifying the areas that were missed due to a dynamic obstacle or poor localization. In step 660, the electronic device 210 generates a new path to visit the unmowed areas (the areas that were missed due to a dynamic obstacle or poor localization). The method 660a of FIG. 6F describes the process of generating the new path.

The method 630a of FIG. 6D describes the process of identifying the missed areas of the step 630 of FIG. 6C. In step 632, the electronic device 210 identifies the boundary of a region of interest, which could be the perimeter of the area 600 of FIG. 6A. In step 634, the electronic device 210 generates a path within the area of interest. The generated path could be parallel lines or a spiral. The generated path avoids known obstacles. In step 636, the electronic device 210 travels on the planned path, similarly to the step 612 of FIG. 6C. While traveling on the planned path, the electronic device 210 maintains a log of its location and/or heading. The maintained log could be for all time epochs between the start of its run until arriving at the end location at step 640.

Within the step 630, the electronic device 210 pixilates the map of the area into a grid, to identify cells (or pixels) of the grid that were traversed and cells that were not traversed. It is noted that the grid size can be fixed or vary based on the localization accuracy. When the grid size is variable, the electronic device 210 identifies the accuracy of the localization process (step 642). For example, the localization process can indicate localization accuracy based on the quality of inputs it receives from the different sensors. Then in step 644, the electronic devise pixilates the area into a grid of dimension D, which is based on the size of the grid is based on the accuracy of the localization process of step 642. For example, if the if the localization accuracy is high then the grid size may be small and if the localization accuracy is poor then the grid size can be larger. The grid size is variable as it can change from one run to the next run based on the localization accuracy. Alternatively, when the grid size is fixed, the step 642 is omitted from the method 630a. As such in step 644 the size of each grid is fixed to a predetermined size.

In step 646, based on the pixilated map, the electronic device 210 flags each cell based on its location. The cells can be flagged as traversed (the electronic device 210 traveled over this cell and therefore the cell corresponds to an area that is mowed). The cells can be flagged as not traversed (the electronic device 210 did not travel over this cell, or partially traveled over the cell, and therefore the cell corresponds to an area that is missed or not mowed).

In step 648, the electronic device clusters the cells that touch each other into an unmowed region. In step 650, the electronic device identifies the centroid and radius of each cluster. For example, FIG. 6E illustrates a cluster 652a and a cluster 652b. The clusters 652a and 652b are made up of multiple cells indicating locations that the electronic device 210 did not travel or partially traveled over. The electronic device 210 is able to identify the centroid 654a of the cluster 652a and the centroid 654b of the cluster 652b. Based on the position of the centroid within a cluster, the electronic device 210 also identifies the radius which is the distance from the centroid to the outside perimeter of the cluster. The radius 656a is the distance from the centroid 654a to the outside of the cluster 652a. Similarly, the radius 656b is the distance from the centroid 654b to the outside of the cluster 652b.

The method 660a of FIG. 6F describes the process of generating a new path to visit the unmowed areas of the step 660 of FIG. 6C. In step 662, the electronic device 210 receives an input list of missed areas. The input list can include a list of Q circles that were not traversed or partially traversed by the electronic device. The list can be generated by the method 630a of FIG. 6D, and each circle within the list corresponds to a cluster of cells that were identified and corresponds to a missed area.

In step 664 the electronic device 210 creates or generates a list of circle centers to re-visit. In certain embodiments, the electronic device 210 uses a solution to the Traveling Salesman Problem (TSP) to create an ordered list of circle centers to visit from its current location to its home location (such as the starting position 602a or the docking/home location). In step 666, the docking/home location initiates a counter of the number of times each circle is visited. In certain embodiments the electronic device 210 initiates a counter of the number of times each circle is visited to $n_i=0$, where I is the index of the circle center from 1 to N. It is noted that i=1. The electronic device 210 also initiates a new empty list L of unmowed regions, set M=0.

In step 668, the electronic device 210 travels to a circle. In certain embodiments, the circle could be the shortest distance from its current location. In step 670, the electronic device 210 determines whether it can reach the center of the circle, as indicated by the radius and centroid which were identified in step 650 of FIG. 6C. If the electronic device is able to reach the center of the circle, then in step 676, the electronic device 210 travels in a predefined trajectory. For example, the electronic device can travel from the center of the circle in a spiral that increases in size until it reaches the outer perimeter of the circle, such that the circle is fully traversed (and mowed).

Alternatively, if in step 670, the electronic device 210 determines that it is unable to reach the center of the circle, then in step 672, the electronic device 210 waits for a predetermined period of time. After the period of time expires, the electronic device 210 in step 674 determines whether it can reach the center of the circle, as indicated by the radius and centroid which were identified in step 650 of FIG. 6C. If the electronic device is able to reach the center of the circle, then in step 676, the electronic device 210 travels in a predefined trajectory. For example, the electronic device can travel from the center of the circle in a spiral that increases in size until it reaches the outer perimeter of the circle, such that the circle is fully traversed (and mowed).

If in step 674, the electronic device 210 determines that it is unable to reach the center of the circle, then in step 678 the electronic device 210 determines whether a triggering event occurs. For example, the electronic device 210 sets a counter $n_i = n_i + 1$. If the value of $n_i$ is greater than a threshold, the electronic device 210 determines that the triggering event occurs. For another example, if the battery life is less than a threshold, then the electronic device 210 determines that the triggering event occurs. It is noted that other triggering events can be detected, such as the time of day. For instance, when the current reaches a predefined time, such as 6:00 PM, could cause the triggering event to be detected.

After determining that a triggering event (of step 678) did not occur, when the electronic device 210 in step 680, includes the current circle to a new list L. The electronic device 210 also initializes the visit counter ni, and increases the value of M (which was set to zero in step 666) by one.

After the electronic device 210 travels in a predefined trajectory within the circle (step 676), the triggering event occurs (step 678), or after the current circle is added to a new list L (step 680), the electronic device 210 in step 682, determines whether the variable i is less than or equal to n. The variables i and n were set in step 666. When the variable i is less than or equal to n, then the variable i is increased by 1, and the method returns to step 668, and the electronic device 210 travels to the next circle. Alternatively, if the variable i is greater than n, the electronic device 210, in step 684, determines whether the new list L (which was created in step 680) is empty. If the new list L is empty, in step 688, the electronic device 210 travels to the home position, such as the start position 602a. Alternatively, if the new list L is not empty, the electronic device 210, in step 686, resets the list Q with the list L, such that N is set to M. The electronic device then initiates a new empty list L of unmowed regions and sets the value of M to zero and the value of i to 1. After performing step 686, the electronic device 210 returns to step 664 to generates a new list of circle centers to re-visit. This list is based on the circles that were identified in the method 630a but not previously visited in step 676.

FIG. 6F describes using a TSP to come up with the initial order of the list of unmowed areas. In other embodiments, a finite time Markov decision process (MDP) or any other process can be used to come up with a strategy to visit the unmowed regions instead of an process that solves traveling salesman problem (TSP) to come up with an initial order of the list of unmowed areas. In certain embodiments, if the visit count is larger, it implies that in spite of several visits to the unmowed region the region is still unreachable. In this case, the electronic device 210 waits longer as per T (n) to check if the obstacle moves away this time. Note that T (n) need not necessarily be an increasing function of n and maybe a constant.

In certain embodiments, a variation to the method 660a can be as follows. If a visit to a circle is obstructed, instead of appending the circle to the list of unmowed circles, the electronic device 210 may create a new list of unvisited circles at the end of attempting to visit each circle in original list. Then one may re-optimize the order in which to visit the unmowed circles in the new list using TSP or MDP or any other algorithm and follow the order in the next attempt to visit these circles.

The following is an example of MDP formulation to solve the problem of identifying the order in which to visit the unmowed regions. Let the time be denoted by k. State of the system be denoted by $(x_k, U_k)$. In the context of a lawn mower, state variable $x_k$ can represent location of the electronic device 210 in terms of its X-Y coordinates on the lawn. State variable $U_k$ can represent a list of unmowed regions in space (for instance, circle centers as an outcome of method 630a of FIG. 6C. At time 0, the electronic device 210 is at some location $x_0$ with N unmowed regions in space denoted by a list $U_0$. The electronic device 210 has to attempt to visit all unmowed regions in a finite horizon MDP formulation, such that after N time steps (equal to the number of unmowed regions in space). Action $u_k \in U_k$ at time k is decision to visit a particular unmowed region in space ($u_k$ represents the next location to visit). The dynamics of the system are $x_{k+1} = u_k$ and $U_{k+1} = U_k \setminus \{u_k\}$. The cost of making action $u_k$ while in state $x_k$ is given by $g(x_k, u_k, w_k)$ where $w_k$ is a random variable capturing randomness in the environment (for instance, in spite of taking a decision to visit region $u_k$ the electronic device 210 may not be able to reach there or may have to deal with other uncertainties before reaching the position). An example g(.) is given as follows. $g(x_k, u_k, w_k) = \|u_k - x_k\|_2$, which is the Euclidean distance between the starting and ending position for that time step (note that no randomness $w_k$ is involved in this modeling methodology). If every unmowed region is associated with a previous visit count (Such as in FIG. 6F), then the function g(.) could be a function of the visit count as well. For instance, if n is the visit count for $u_k$ then $g(x_k, u_k, w_k) = (\|u_k - x_k\|_2)^2$. The function could also be a function of quality $Q_k$ associated with an action $u_k$, which indicates how likely is it that the unmowed region k will likely still be obstructed and unavailable for mowing. For instance, $g(x_k, u_k, w_k) = (\|u_k - k_k\|_2)^{Q_k}$, which indicates the less likely an unmowed region will be available for mowing, the higher the cost of visiting this unmowed region for another mowing attempt. Equation (5) and Equation (6), below describes the final cost $g_N(x_N)$ may represent the cost to go back to home position or the docking station from the last visited unmowed region in space. The operator E indicates expectation over the randomness in the model given by $w_i$. Note that the optimization variables are $u_0, \ldots, u_{N-1}$ which indicate the order in which we visit the N unmowed regions in space.

$$J(x_0) = W_{w_0, w_1, \ldots, w_{N-1}} \left[ g_N(x_N) + \sum_{k=0}^{N-1} g_k(x_k, u_k, w_k) \right], \quad \text{Equation (5)}$$

-continued $$J^*(x_0) = \min_{u_0,\ldots,u_{N-1}} J(x_0),\quad \text{Equation (6)}$$

Equation (7), below, describes a finite horizon MDP formulation modified based on this disclosure. The solution to this problem can be given using backward induction. It is noted that the one step state dynamics is denoted by $f_k(x_k, u_k, w_k) = x_{k+1}$.

$\forall x_0, J^*(x_o) \equiv J_o(x_o)$ is computed as below. Equation (7)

(a) $J_N(x_n) = g_n(x_n)$ terminal cost.

Pick $x_n$ which has the smallest terminal cost (b) For $k = 0, 1, \ldots, N-1$ $$J_k(x_k) = \min_{u_k \in U_k} E_{w_k}\left[\overbrace{g_k(x_k, u_k, w_k)}^{\text{one step cost}} + \overbrace{J_{k+1}(f_k(x_k, u_k, w_k))}^{\text{Future value}}\right]$$

Although FIGS. 6A through 6F illustrate example methods and diagrams, various changes may be made to FIGS. 6A through 6F. For example, while shown as a series of steps, various steps in any of the methods of FIGS. 6B, 6C, 6D, and 6F could overlap, occur in parallel, or occur any number of times.

FIG. 7A illustrates example path plans 700 in accordance with an embodiment of this disclosure. The area 702a illustrates various obstacles 704 that the electronic device 210 navigated around. The obstacles can be dynamic obstacles or known obstacles. As illustrated the electronic device 210 starts at location S and travels a path 704a throughout the area 702a, until it reaches the location F. It is noted that the electronic device 210 does not revisit any of the obstacles 704 after reaching the location F. The area 702b illustrates the electronic device 210 navigating in a spiral along path 704b. That is, the electronic device 210 first traverse the parameter of the area 702b and then in a spiral motion travels towards the center. The area 702c illustrates the electronic device 210 navigating along parallel lines along the path 704b. It is noted that the distance between the lines of the path 704b is denoted by the distance δ706a and the distance between the lines of the path 704c is denoted by the distance δ706b.

In certain embodiments, when whenever localization accuracy is bad, it may be desirable to have smaller value of δ. It is noted that the larger the value of δ, the more power savings is offered as the distances between two paths is greater, resulting in less paths needed to cover the area. Embodiments of the present disclosure, enable the electronic device to automatically change the distance δ such as shown in FIGS. 7B and 7C, or manually changed by an outside source, such as a user in order to ensure the electronic device 210 does not miss areas, as described in FIGS. 8A and 8B, below.

Figure 7B:
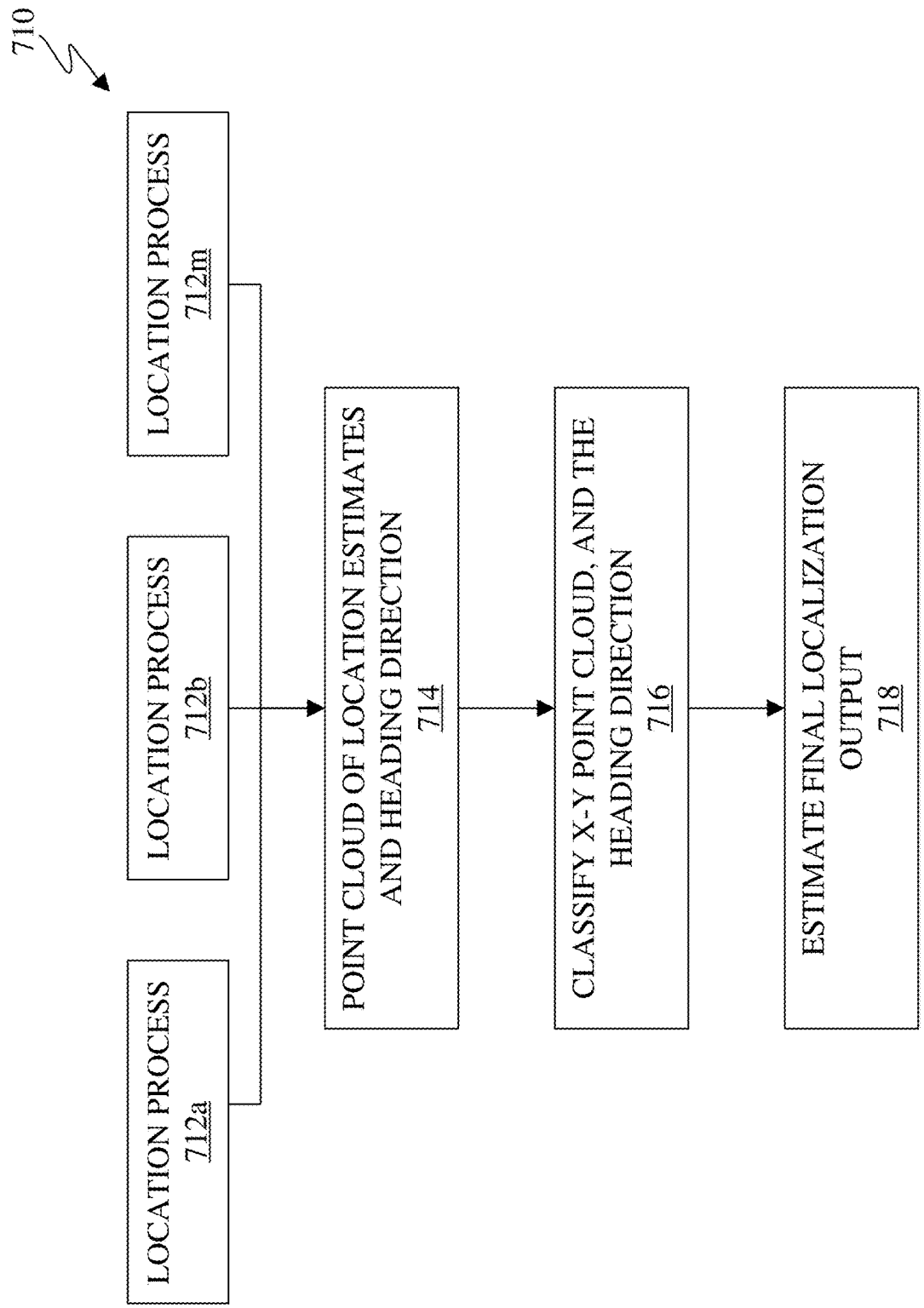
FIGS. 7B and 7C illustrate example methods for identifying localization accuracy in accordance with an embodiment of this disclosure.
Figure 7C:
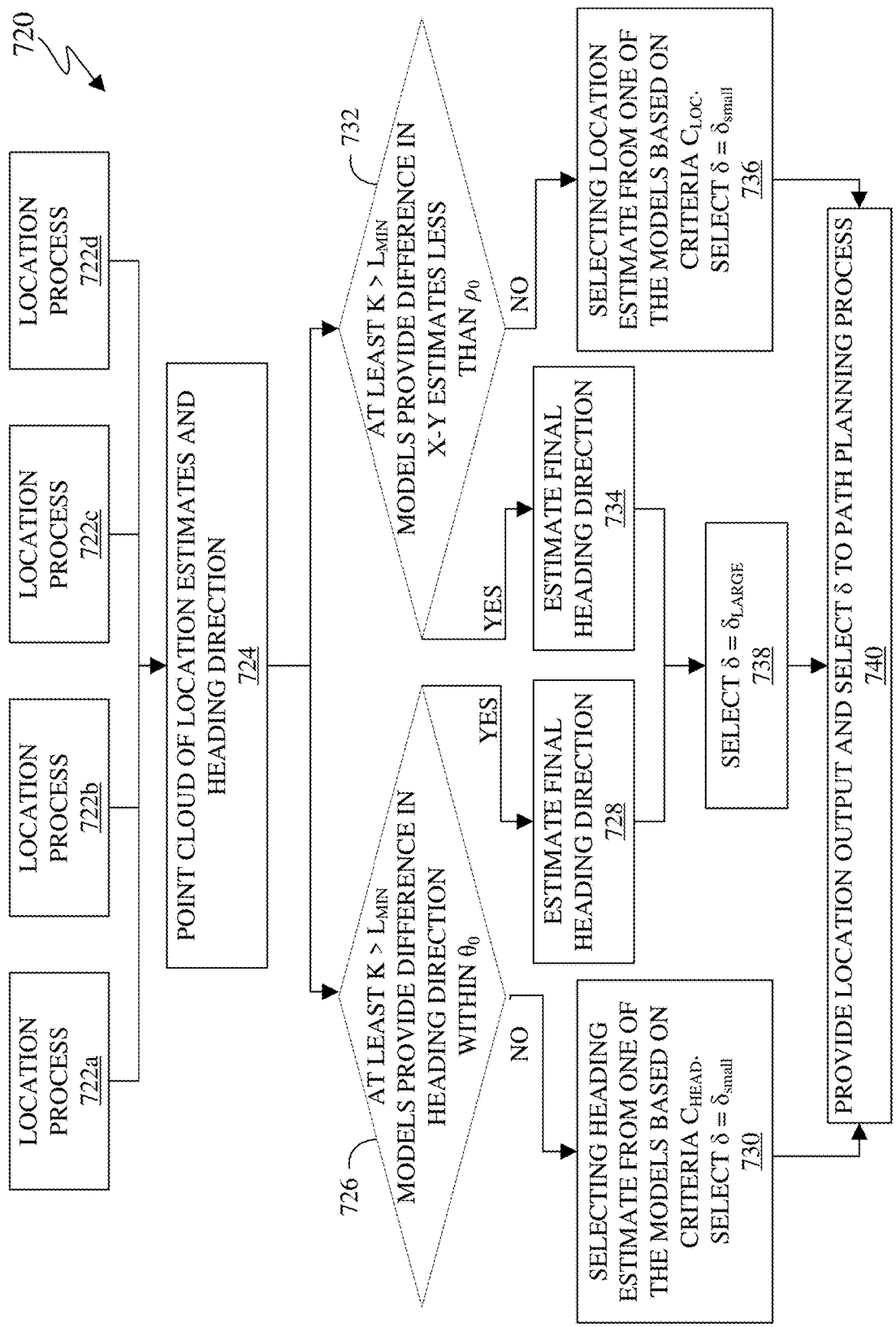

FIGS. 7B and 7C illustrate example methods 710 and 720 for identifying localization accuracy in accordance with an embodiment of this disclosure. The methods 710 and 720 can be performed by the electronic device 100 of FIG. 1 and localization generator of the electronic device 210 of FIG. 2C. For ease of explanation, methods 710 and 720 are performed by the electronic device 210.

The methods 710 and 720 describe using an adaptive δ based on the localization accuracy estimated by the electronic device 210. In certain embodiments, the electronic device 210 sets a smaller value for δ, resulting in the denser paths, if the localization accuracy is bad, and set a larger value for δ, resulting in sparser paths if the localization accuracy is good. It is noted that having just two possible values of δ is just given as an example and there can be multiple states in which δ can be quantized.

The method 710 of FIG. 7B illustrates how the localization accuracy is identified which is used to select of value for δ. As illustrated, the electronic device 210 performs three separate localization processes (localization process 712a, localization process 712b, and localization process 712m), such the localization processes described above. More or less localization processes can be performed. In step 714, the electronic device 210 performs a point cloud location estimates and heading direction from the localization process 712a, localization process 712b, and localization process 712m. In step 716, the electronic device 210 classifies the X-Y point cloud as good or bad. Also, in step 716, the electronic device 210 classifies the heading direction as good or bad. The electronic device 210 classifies the point cloud as good if both X-Y and heading point cloud is good. In step 718, the electronic device estimates a final localization output. For example, the electronic device 210 estimates the final localization output based on the different models and uses the output for the path planning process with a selected of value for δ which is based on whether the point cloud is classified as good or bad (step 716).

The method 720 of FIG. 7C is a more detailed example of the method 710 of FIG. 7B. As illustrated, the electronic device 210 performs four separate localization processes (localization process 722a, localization process 722b, localization process 722c, and localization process 722d), such the localization processes described above. The localization process 722a can be based on UWB ranging with K tags and a wheel encoder. The localization process 722b can be based on UWB ranging with K tags and IMU. The localization process 722c can be based on UWB ranging with K tags. The localization process 722d can be based on UWB ranging with K tags, IMU, and wheel encoders.

In step 724, the electronic device 210 performs a point cloud location estimates and heading direction from the localization process 722a, localization process 722b, and localization process 722c, and localization process 722d. In step 726, the electronic device 210 determines whether $k > L_{min}$ models provide difference in heading direction with $\theta_o$. If the models are not within $\theta_o$, then in step 728, the electronic device 210 identifies the final estimate of the heading direction as a mean of the k heading directions. Then, in step 738 the electronic device 210 selects a large value for δ. Alternatively, if the models are within $\theta_o$, then electronic device 210 determines that K not greater than $L_{min}$, then in step 730, the electronic device selects a heading estimate from one of the models according to a criterion $C_{head}$ and selects a small value for δ. The electronic device also, in step 732 determines whether at least $K > L_{min}$ models provide difference in X-Y estimates less than a threshold distance. If the models are within the threshold distance, then in step 734, the electronic device 210 identifies the final estimate of the X-Y location as a mean of the K locations. Then, in step 738 the electronic device 210 selects a large value for δ. Alternatively, if the models are larger than the threshold distance, then electronic device 210 selects the location estimates from one of the models according to a criterion $C_{Loc}$ and selects a small value for δ.

The following are example criterion for choosing the localization process. (1) select the process used in previous time step of the localization process. (2) select a process based on a model wherein the smallest mean of diagonal entries in $Q_r$. (3) select a process based on a model wherein the smallest mean of diagonal entries in Rt. (4) select a process based on a model wherein the smallest mean of diagonal entries in $Q_t$ and the smallest mean of diagonal entries in $R_t$. (5) select any process with all available sensors. (6) select a process that uses a selected subset of sensors.

Although FIGS. 7A through 7C illustrate example methods and diagrams, various changes may be made to FIGS. 7A through 7C. For example, while shown as a series of steps, various steps in any of the methods of FIGS. 7B and 7C could overlap, occur in parallel, or occur any number of times.

Figure 8A:
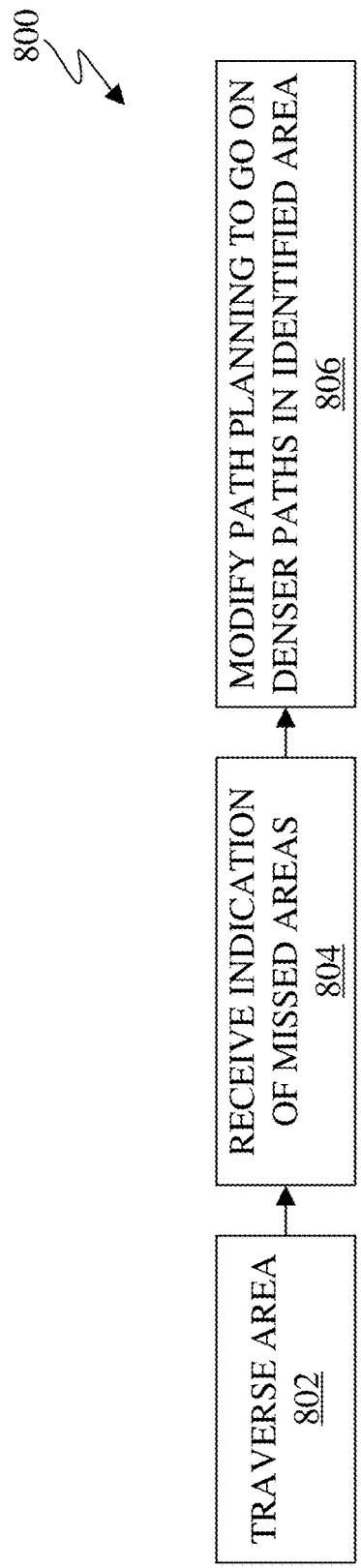
FIG. 8A illustrates an example method for user assistance for modifying a path in accordance with an embodiment of this disclosure.
Figure 8B:
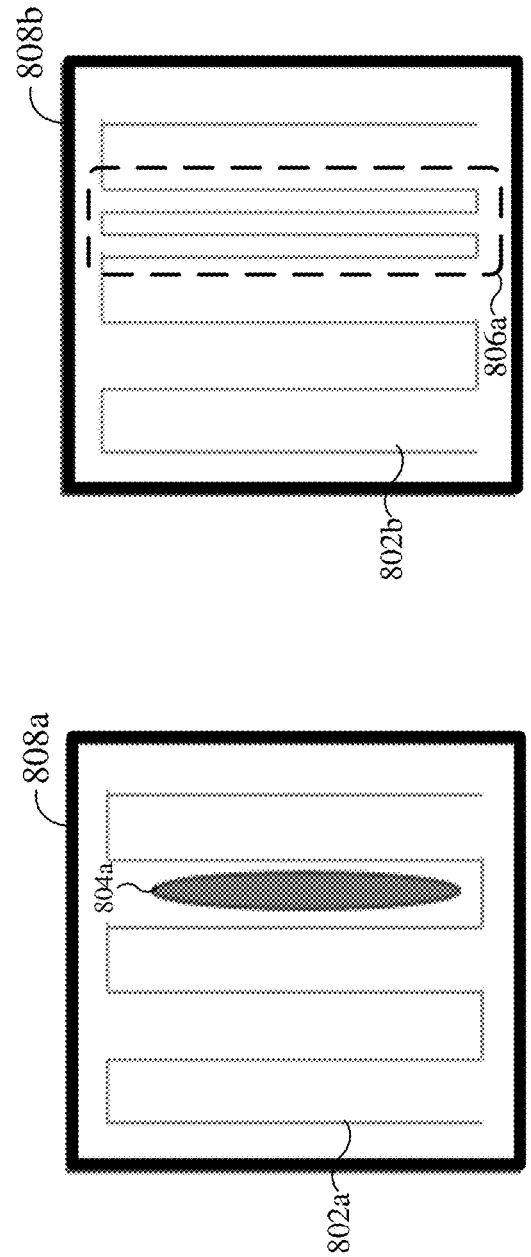
FIG. 8B illustrates an example modified path plan based on the method of FIG. 8A in accordance with an embodiment of this disclosure.

For example, FIGS. 8A and 8B describe the process of changing the density of the paths. In particular, the FIG. 8A illustrates the method 800 for user assistance for modifying a path in accordance with an embodiment of this disclosure. The method 800 can be performed by the electronic device 100 of FIG. 1 and localization generator of the electronic device 210 of FIG. 2C. For ease of explanation, method 800 is performed by the electronic device 210. FIG. 8B illustrates an example modified path plan based on the method 800 of FIG. 8A in accordance with an embodiment of this disclosure.

It is possible that in certain regions of the lawn the localization error could be large enough such that there is unmowed regions which the electronic device 210 is unaware of. As such, an outside source, can instruct the electronic device 210 to reduce the value of δ in a certain area in order to increase the density of the paths. In certain embodiments, the outside source could be a human, that through a user interface modifies the value of δ. In other embodiments, the outside source could be a camera or other sensors on the electronic device 210 which can identify unmowed regions.

For example, in step 802, the electronic device 210 traverses the area. The electronic device can be an automatic lawn mower, which traverses a yard and trims the grass of the lawn. After the electronic device 210 finishes traversing the lawn, in step 804, a human or a sensor on the electronic device 210 can inspect the lawn to identify any unmowed regions. For example, as shown in the lawn 808a, the electronic device 210 travels along the path 802a. The area 804a is the unmowed region which can be identified by a user or the electronic device 210 itself.

Thereafter, in step 806, the electronic device 210 modifies its path to include a denser path in the designated area due to localization accuracy loss in the designated areas. For instance, if there is unmowed region near location $(x_0, y_0)$ then the electronic device 210 may perform an extra spiral or an extra back and forth motion in such areas to cover the unmowed region. For instance, as shown in the lawn 808b, the electronic device 210 travels along the path 802b. The path 802b is modified version of the path 802a since the path 802b includes an extra pass as indicated in the area 806a.

Although FIGS. 8A and 8B illustrate example methods and diagrams, various changes may be made to FIGS. 8A and 8B. For example, while shown as a series of steps, various steps in any of the method of FIG. 8B could overlap, occur in parallel, or occur any number of times.

Figure 9A:
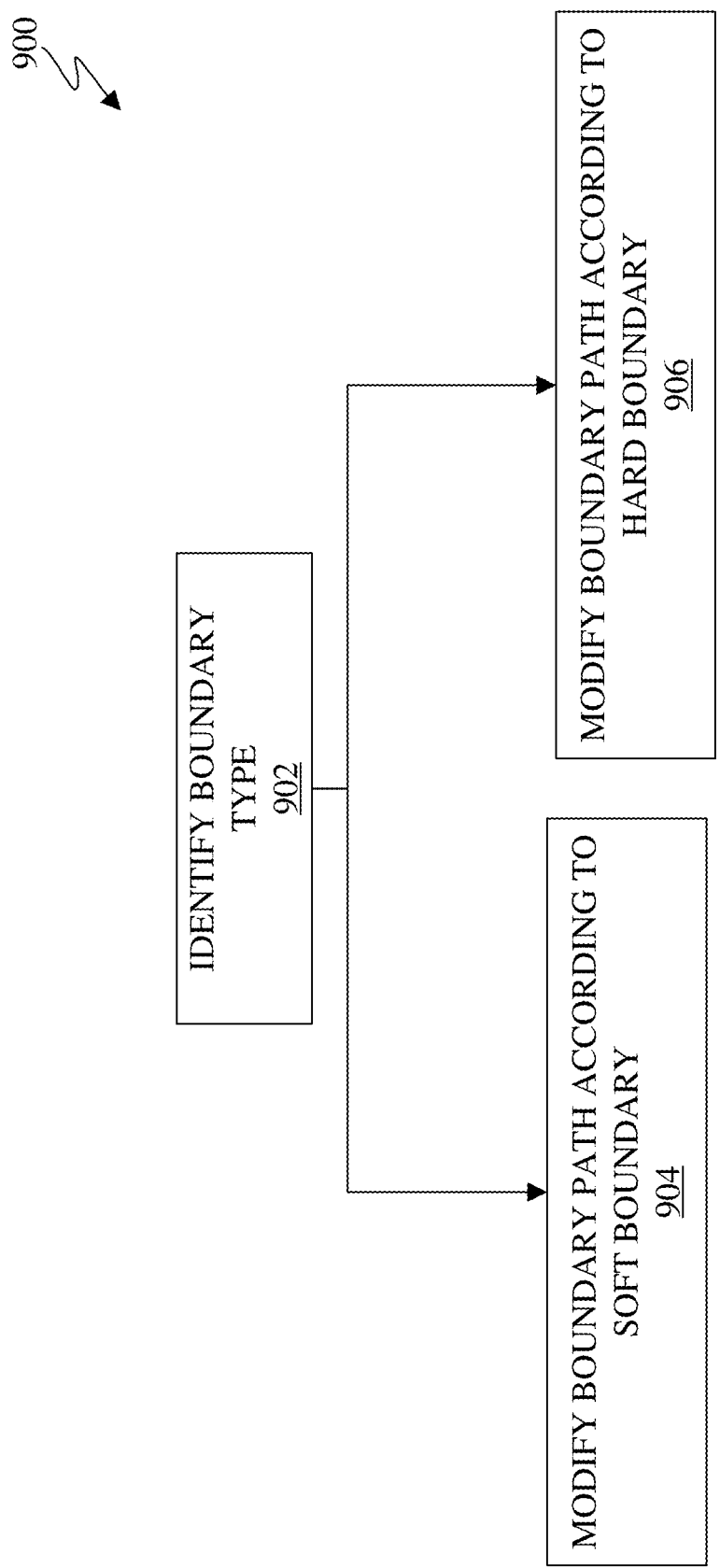
FIG. 9A illustrates an example method for path planning based on boundary type in accordance with an embodiment of this disclosure.
Figure 9B:
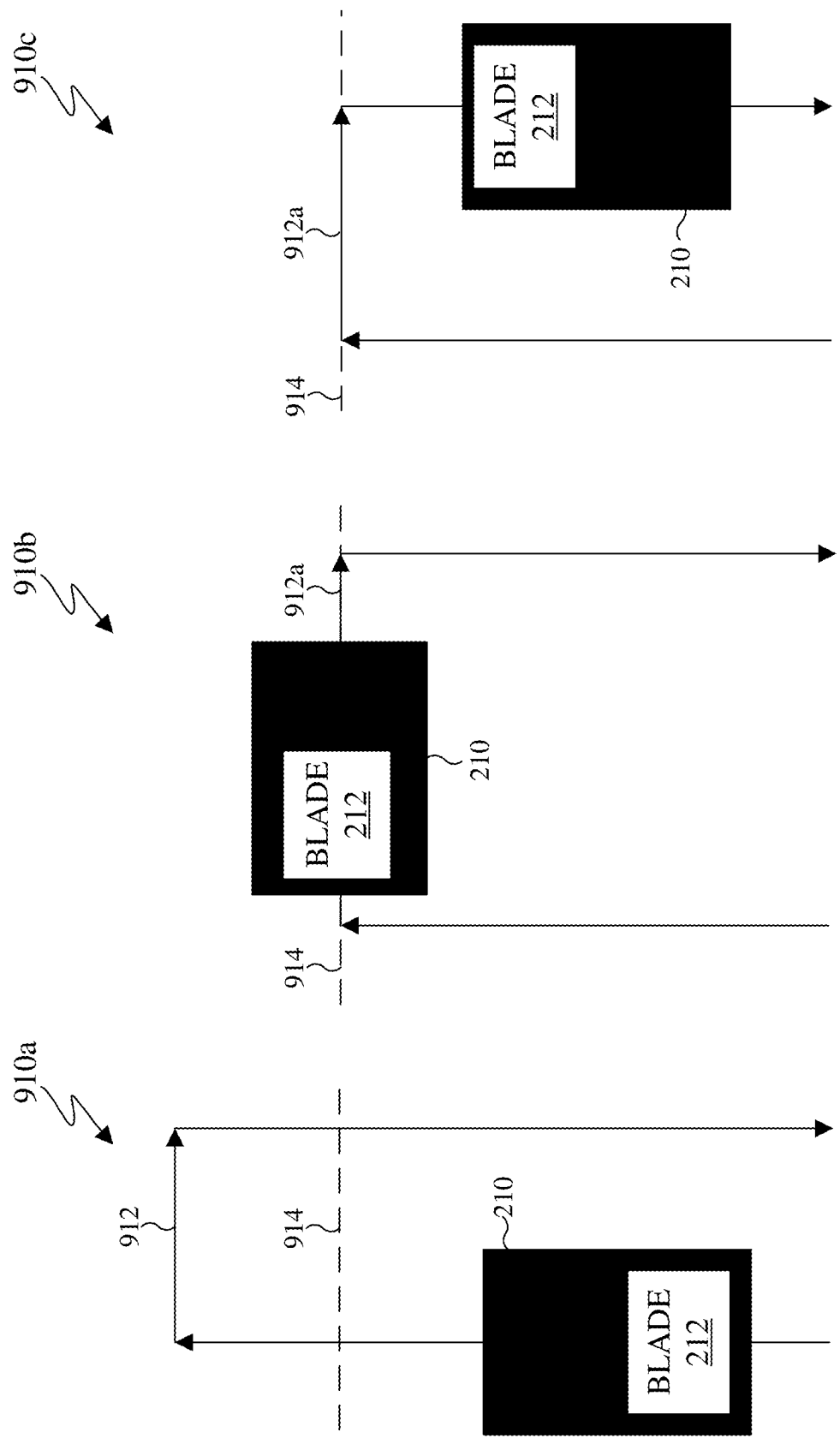
FIG. 9B illustrates an example path based on a soft boundary in accordance with an embodiment of this disclosure.
Figure 9C:
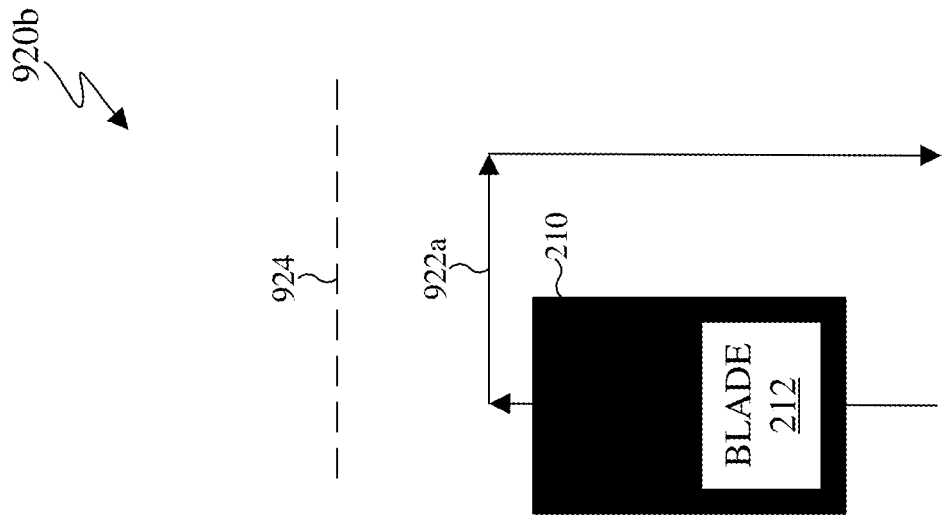
FIG. 9C illustrates an example path based on a hard boundary in accordance with an embodiment of this disclosure.
Figure 9C:
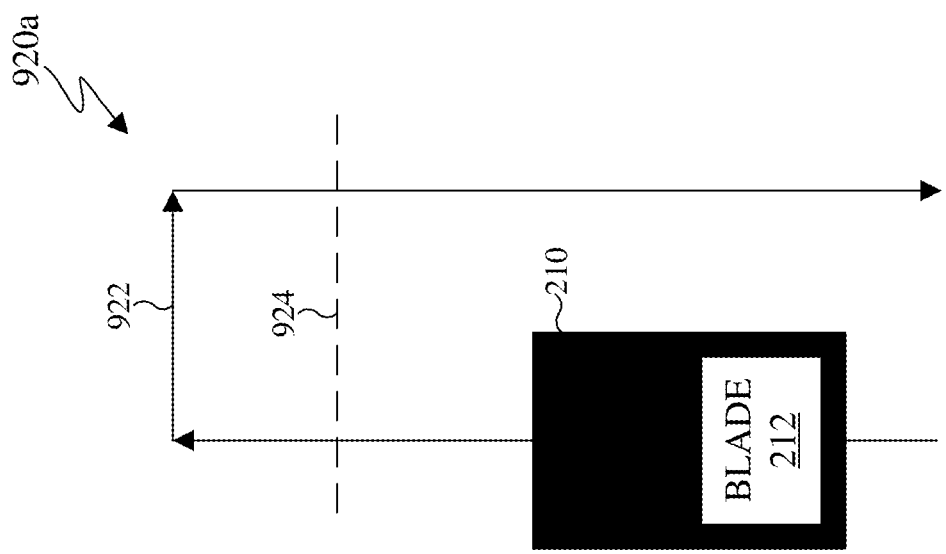

FIGS. 9A, 9B, and 9C describe the process of path planning along the border (or parameter) of the lawn. FIG. 9A illustrates an example method 900 for path planning based on boundary type in accordance with an embodiment of this disclosure. FIG. 9B illustrates an example path based on a soft boundary in accordance with an embodiment of this disclosure. FIG. 9C illustrates an example path based on a hard boundary in accordance with an embodiment of this disclosure. The method 900 can be performed by the electronic device 100 of FIG. 1 and localization generator of the electronic device 210 of FIG. 2C. For ease of explanation, method 900 is performed by the electronic device 210.

For example, when the electronic device 210 is an automatic lawn mower, owing to the dimensions of the electronic device 210 and the placement of the blade, it may not be possible to completely mow the grass close to the boundaries. Moreover, some boundaries could be adjacent properties that include grass to be cut (such as a neighbor), such that no harm occurs if the electronic device 210 crosses the boundary. Alternatively, some boundaries could be a flower bed, a body of water (such as a pool, river, lake, and the like) which if the electronic device 210 cross, could cause harm to landscape or the electronic device 210 itself. Therefore, embodiments of the present disclosure provide system and methods for distinguishing between boundary types.

In step 902, the electronic device 210 identifies the boundary type. In certain embodiments, a sensor like camera on the electronic device 210 can identify some boundaries as hard, which indicates that the electronic device 210 cannot go outside these boundaries. For instance, if a camera detects a fence or water outside the lawn area, it declares corresponding boundary patches as strict. However, there could also be loose boundaries. For instance, outside the lawn space, it could just be flat land or soil or pavement. If a sensor like camera is able to identify this, then it marks these regions as loose boundaries in space. In this case, the electronic device 210 may plan its path to go outside the boundary so it mows the regions close to the boundary of the lawn efficiently. Other sensors like ultrasonic could also help identify hard boundaries, for instance is there is a wall right next to the boundary. The hard and soft boundaries may be indicated by the user on a graphical user interface as well. A computer vision process (such as object recognition) can be used to identify soft or hard boundaries based on camera images. FIGS. 9B and 9C illustrates an of planned paths with hard and soft boundaries.

In step 904, when the electronic device 210 identifies a soft boundary, then the electronic device 210 does not have to explicitly perform more complicated motion patterns to mow areas close to the boundaries. For example, the electronic device 210 can traverse along the boundary line. In step 906, when the electronic device 210 identifies that a hard boundary, then the electronic device 210 has to explicitly perform more complicated motion patterns to mow areas near the boundaries. For example, the electronic device 210 can traverse within the lawn near the boundary line.

FIG. 9B illustrates the electronic device 210 traversing along a path and encounters a soft boundary. The electronic device 210 includes a blade 212, which is used to trim the grass. It is noted that the blade 212 could be a suction port for sucking up dirt and debris. The FIG. 9B illustrates three different time instances, that of time 910a, 910b, and 910c. First at time 910a, the electronic device 210 is traveling along the path 912 and detects a boundary 914 which crosses the path 922. Then at time 910b, the electronic device 210 identifies that the boundary 914 is a soft boundary. Upon identifying that the boundary 914 is a soft boundary, the electronic device 210 modifies the path 912 to path 912a and then travels along the boundary. Finally, at time 910c, the electronic device 210 continues on the return path.

FIG. 9C illustrates the electronic device 210 traversing along a path and encounters a hard boundary. The electronic device 210 includes a blade 212, which is used to trim the grass. It is noted that the blade 212 could be a suction port for sucking up dirt and debris. The FIG. 9C illustrates two different time instances, that of time 920*a* and time 920*b*. First at time 920*a*, the electronic device 210 is traveling along the path 922 and detects a boundary 924 which crosses the path 922. Then at time 920*b*, the electronic device 210 identifies that the boundary 924 is a hard boundary. Upon identifying that the boundary 924 is a hard boundary, the electronic device 210 modifies the path 922 to path 922*a*. The path 922*a* remains a predefined distance inside the lawn from the boundary 924.

Although FIGS. 9A, 9B, and 9C illustrate example methods and diagrams, various changes may be made to FIGS. 9A, 9B, and 9C. For example, while shown as a series of steps, various steps in any of the method of FIG. 9A could overlap, occur in parallel, or occur any number of times.

Figure 10A:
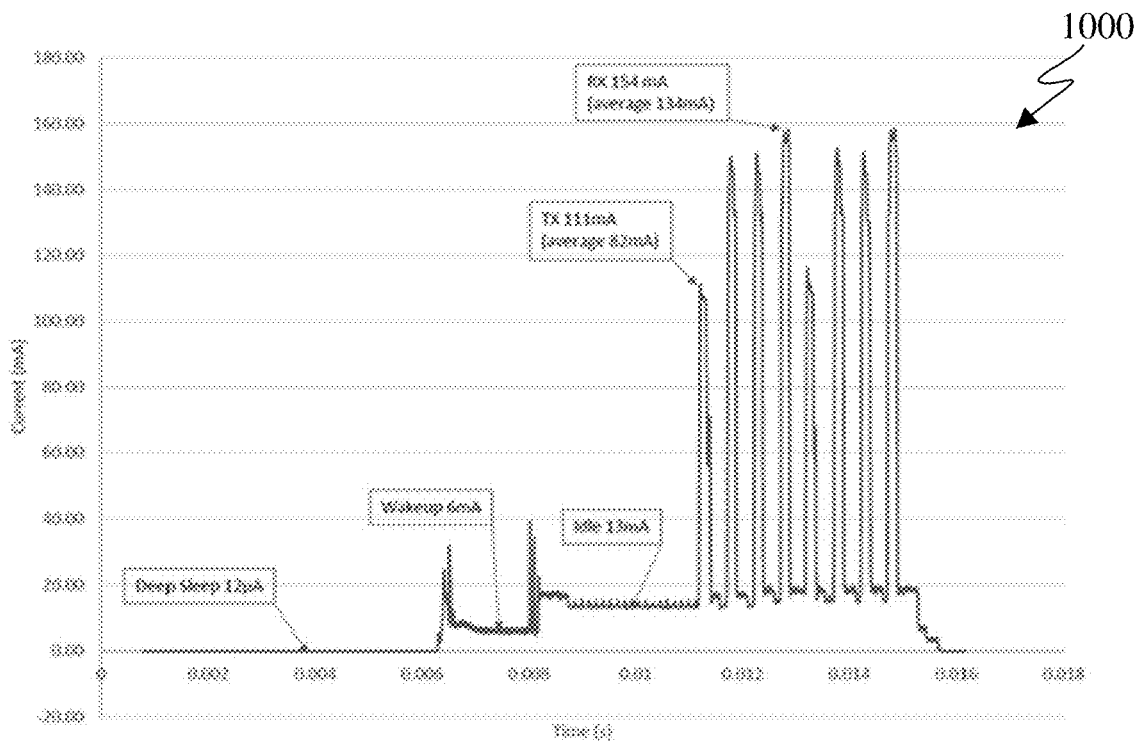
FIG. 10A illustrates an example power consumption graph in accordance with an embodiment of this disclosure.
Figure 10B:
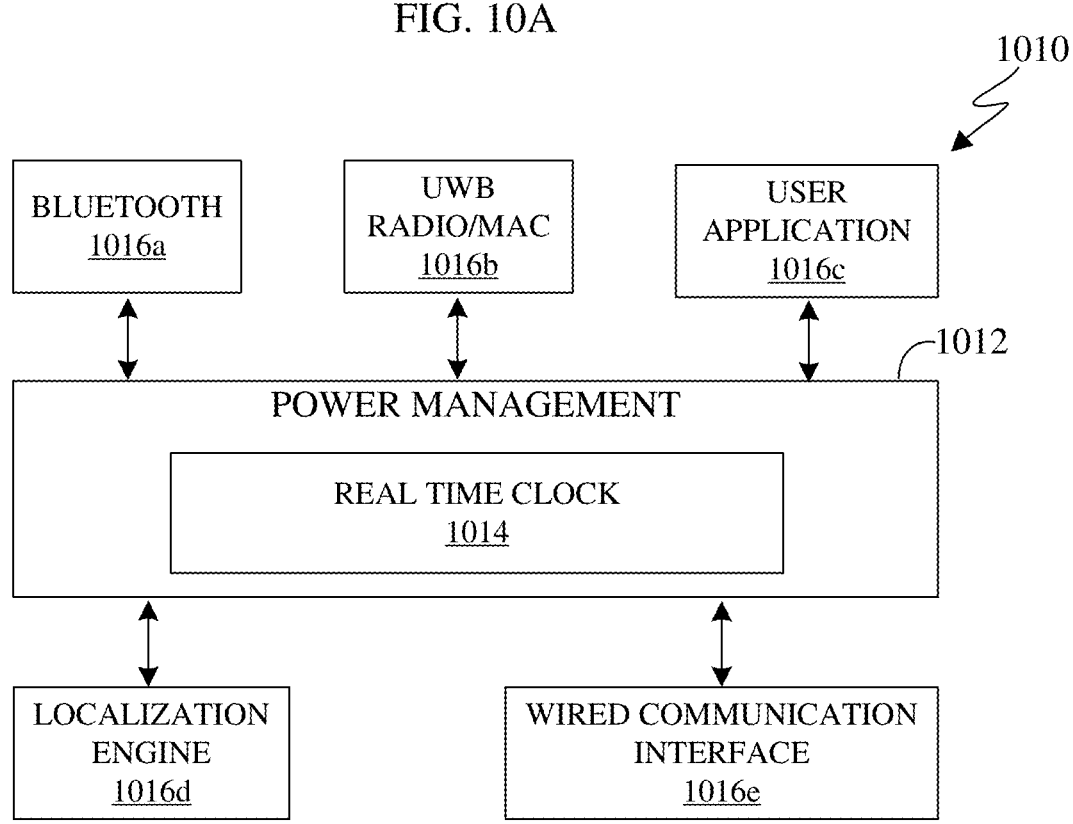
FIG. 10B illustrates an example block diagram of components of a sensor in accordance with an embodiment of this disclosure.
Figure 10C:
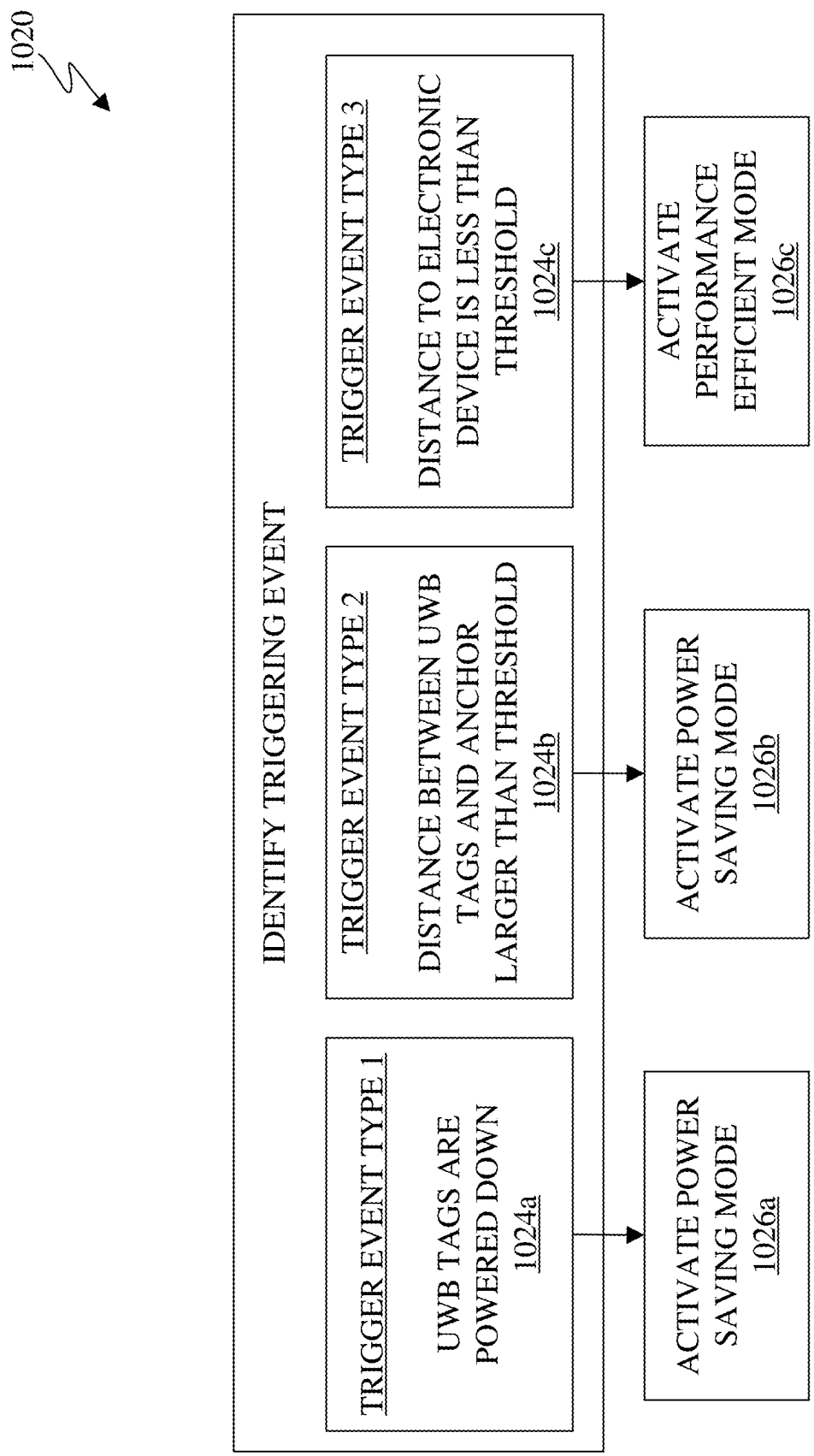
FIG. 10C illustrates an example method for power saving triggering events in accordance with an embodiment of this disclosure.

FIGS. 10A, 10B, and 10C describe power efficient coverage path planning in accordance with an embodiment of this disclosure. In particular, FIG. 10A illustrates an example power consumption graph 1000 in accordance with an embodiment of this disclosure. FIG. 10B illustrates an example block diagram 1010 of components of a sensor in accordance with an embodiment of this disclosure. FIG. 10C illustrates an example method 1020 for power saving triggering events in accordance with an embodiment of this disclosure. The method 1020 can be performed by the electronic device 100 of FIG. 1 and localization generator of the electronic device 210 of FIG. 2C. For ease of explanation, method 1020 is performed by the electronic device 210.

In certain embodiments the electronic device 210 modifies the duty cycle of sensors used for localization, to the performs power efficient coverage path planning. For example, some off-the-shelf ultra-wideband (UWB) two way ranging sensors have battery life that lasts for a day if it is operating all day. If such UWB transceivers are used for localization of electronic devices for coverage path planning tasks, the battery life is not convenient since the batteries would have to change the batteries every day. Therefore, embodiments of the present disclosure provide a power saving mode for the UWB anchors which are used for localization.

FIG. 10A illustrates a graph 1000 which describes a typical power consumption of a sensor participating in two way ranging system as a tag/anchor. As illustrated in this example, the power consumption is significantly smaller in deep sleep mode as compared an idle period or actively transmitted or receiving information.

The block diagram 1010 of FIG. 10B describes the power management system 1012 of the electronic device 210. The power management system 1012 communicates with various functions/sensors such as a Bluetooth transceiver (other radio control to configure the device manually handling communication interfaces like SPI (serial port interfaces) or running any other user specific applications) 1016*a*, a UWB radio UWB radio and MAC control 1016*b* (i.e. controlling whether to activate the UWB transceiver for two way ranging protocol), a user application 1016*c*, a localization engine 1016*d* (similar to the localization generator 240 of FIG. 2), a wired/wireless communication interface 1016*e*. When in deep sleep mode a real time clock (RTC) 1014 in the power management system 1012 may instruct to the functions/sensors 1016*a* through 1016*e* to switch off. RTC 1014 is always ON but a deep sleep mode can result in significant power savings since the functions/sensors 1016*a* through 1016*e* are powered down. In wake-up mode, all the functionalities 1016*a* through 1016*e* can be active. In certain embodiments, in a power saving mode, the RTC 1014 enables a periodic deep sleep mode of the functions/sensors 1016*a* through 1016*e* followed by a wake-up time.

In certain embodiments, the electronic device 210 can instruct one or more of the anchors to enter a power savings mode, which intentionally introduces measurement losses, in order to increase the battery life of the anchors 204, since the localization process, described above, can handle information loss. For example. when the electronic device 210 is located on the opposite side of the yard than a portion of the anchors, the electronic device 210 can transmit a message to the near anchors to instruct the far anchors to enter a power savings mode. In another embodiment, when the electronic device 210 is located on the opposite side of the yard than a portion of the anchors, the electronic device 210 can transmit a message to those anchors instructing those anchors to enter a power savings mode.

FIG. 10C illustrates the method 1020 that describes triggering the power saving mode for an anchor based on some criterion C. It is noted that the power saving can be obtained by changing the duty cycle of the sensors as indicated in FIG. 10B.

The electronic device 210 can identify one or more triggering events/criteria, such as the triggering event 1024*a*, the triggering event 1024*b*, and the triggering event 1024*c*. The triggering event 1024*a* can be when the UWB tags are powered down and the electronic device 210 is not actively mowing the lawn. The triggering event 1024*b* can be when the distance between the tag(s) and the anchor(s) are larger than a threshold. The triggering event 1024*c* can be when the distance between the electronic device 210 and an anchor is less than a threshold.

When the electronic device 210 identifies the triggering event 1024*a*, then the electronic device 210 can instruct anchor A to enter a power savings made 1 and notify the other anchors to go into power savings mode 1026*a*. During the power savings mode 1026*a*, the RTC 1014 enables deep sleep mode of a predefined time followed by a wakeup command in a cycle.

When the electronic device 210 identifies the triggering event 1024*b*, then the electronic device 210 can instruct anchor A to notify other anchors to go into power savings mode 1026*b*. During the power savings mode 1026*b*, the RTC 1014 enables deep sleep mode of a mode of a predefined time followed by a wakeup command in a cycle. It is noted that the predefined times can differ between the power savings mode 1026*a* and the power savings mode 1026*b*.

When the electronic device 210 identifies the triggering event 1024*c*, then the electronic device 210 can instruct anchor A to go into a performance efficient mode 1026*c* and notify the other anchors to also go into the performance efficient mode 1026*c*. During the performance efficient mode 1026*c*, the RTC 1014 enables deep sleep for a predefined time that is larger than the predefined time of the power savings mode 1026*a* and the power savings mode 1026*b*, followed by a wakeup command in a cycle It is noted that in some embodiments, the triggering events can be identified by the anchors themselves. For example, in response to the anchor A detecting the triggering event 1024*a*, the anchor A notifies the other anchors to enter the power saving mode 1026*a* and also goes into a power saving mode 1026*a*. For another example, in response to the anchor A detecting the triggering event 1024*b*, the anchor A notifies certain other anchors to go into a power saving mode 1026*b*. For yet another example, in response to anchor A detecting the triggering event 1024*c*, the anchor A goes into the performance efficient mode 1026 and notifies the other anchors to also go into the performance efficient mode 1026*c* as well.

The criterion C can be based on the distance the anchor is from the electronic device 210. For example, the electronic device 210 can identify the distance between the tags 250 and the anchors 204. The electronic device 210 can then determine that the distance to one or more of the anchors is beyond a threshold distance. Upon determining that the distance from the electronic device 210 to one or more of the anchors is beyond a threshold distance, the electronic device can transmit to any of the anchors 204 a message indicating that a certain anchor is to enter a power savings mode.

For another example, the criterion C can be based on whether the electronic device 210 (or in general all electronic devices with registered tags on the UWB TWR network) is powered down or if the electronic device 210 is powered up but the electronic device 210 does not perform a predefined function (such as mowing), then all anchors can be in power saving mode For yet another example, the criterion C can be based a schedule. For example, if the electronic device 210 is scheduled to mow the lawn every day at a certain time and finish mowing by a certain time. any other time outside that window the anchors automatically go in deep sleep mode.

Although FIGS. 10A, 10B, and 10C illustrate example methods and diagrams, various changes may be made to FIGS. 10A, 10B, and 10C. For example, while shown as a series of steps, various steps in any of the method of FIG. 10C could overlap, occur in parallel, or occur any number of times.

Figures 11A, 11B:
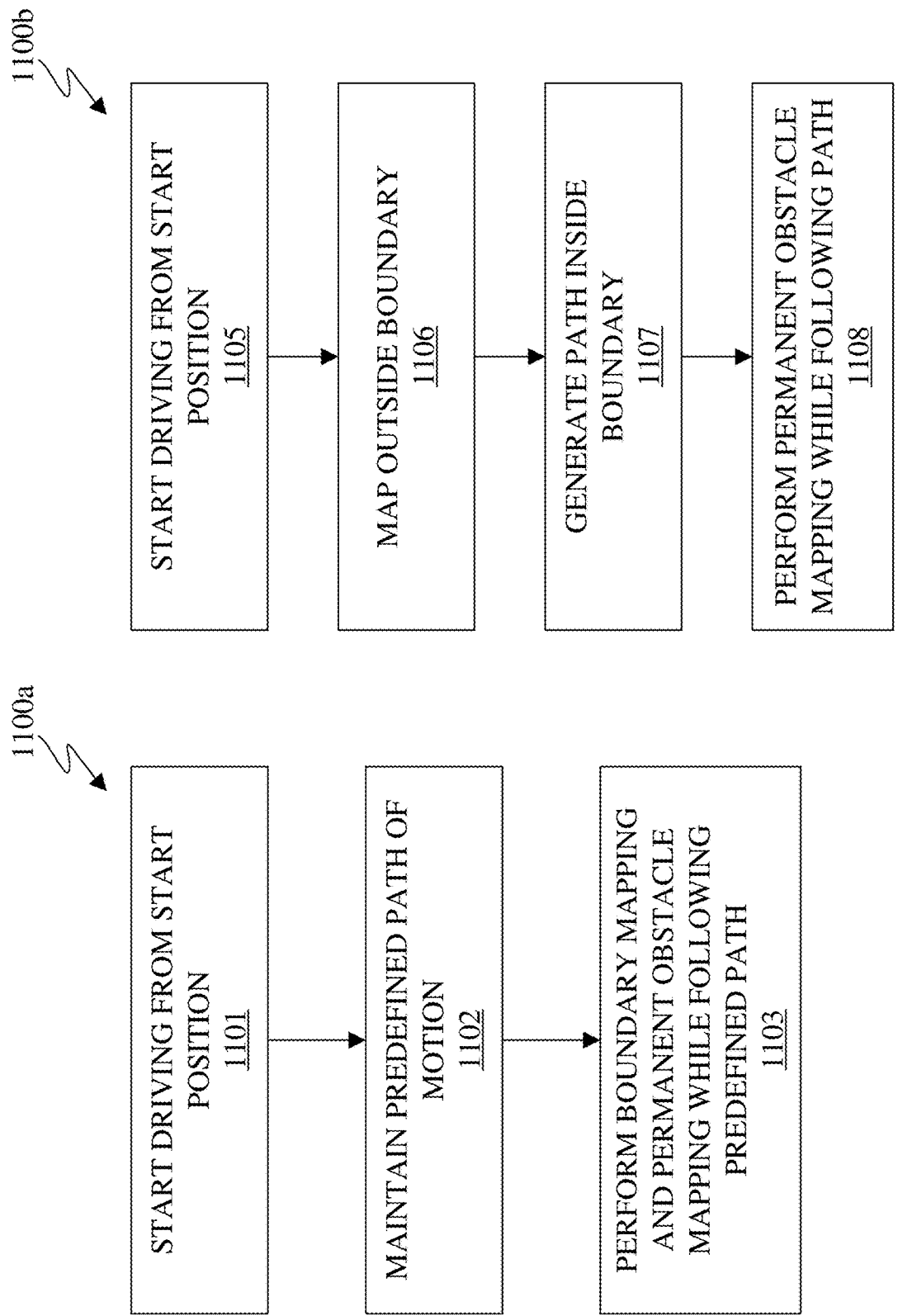
FIGS. 11A and 11B illustrate example methods for mapping an area in accordance with an embodiment of this disclosure.
Figure 11C:
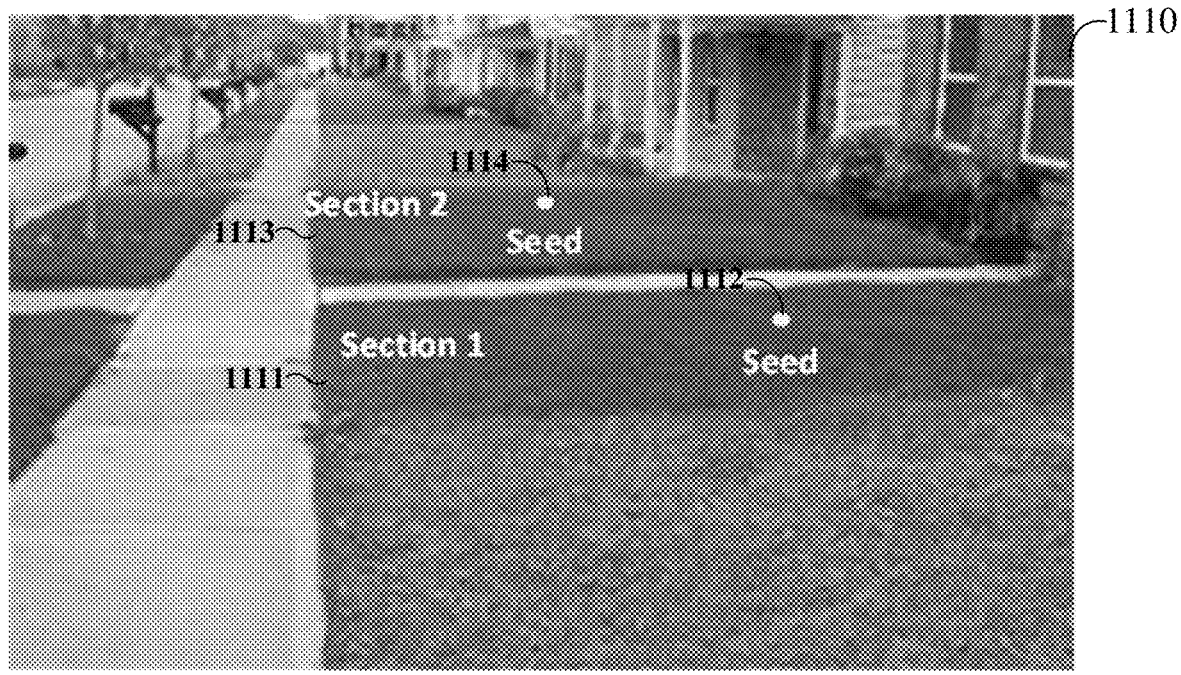
FIG. 11C illustrates an example of an area with multiple sections with a seed point in accordance with an embodiment of this disclosure.
Figure 11D:
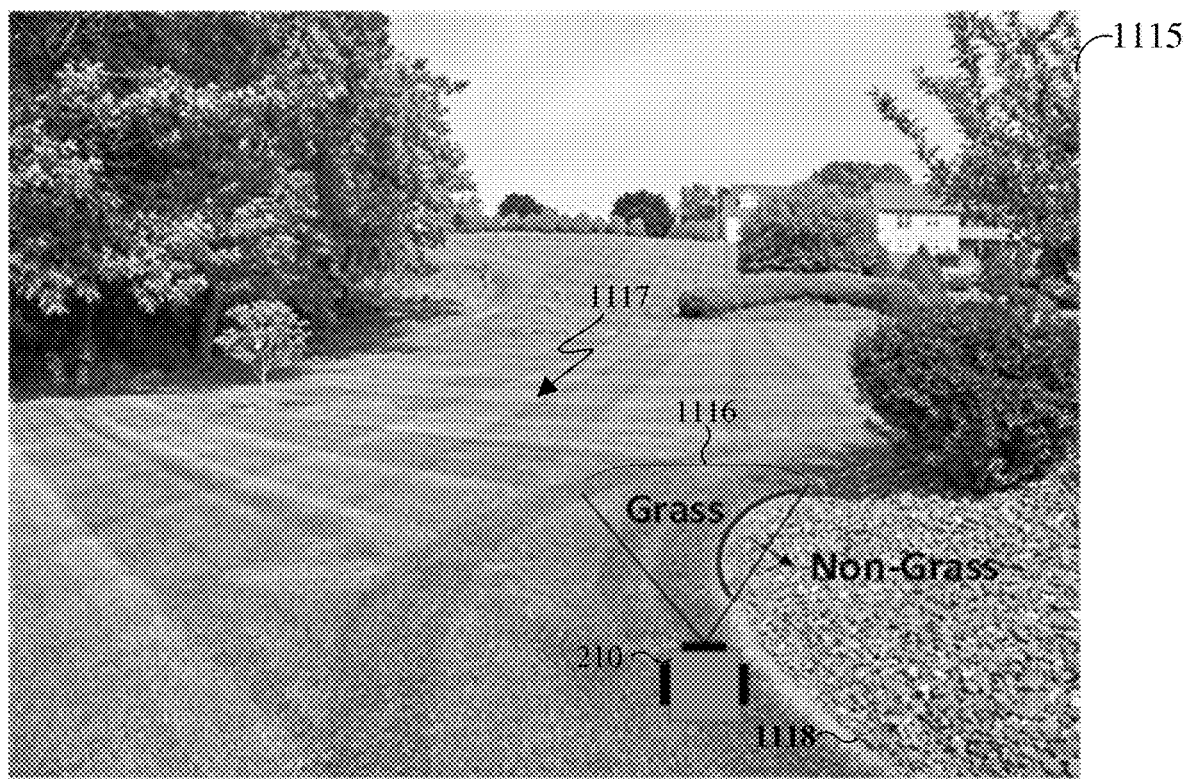
FIG. 11D illustrates an example diagram of an electronic device identifying certain areas in accordance with an embodiment of this disclosure.
Figure 11E:
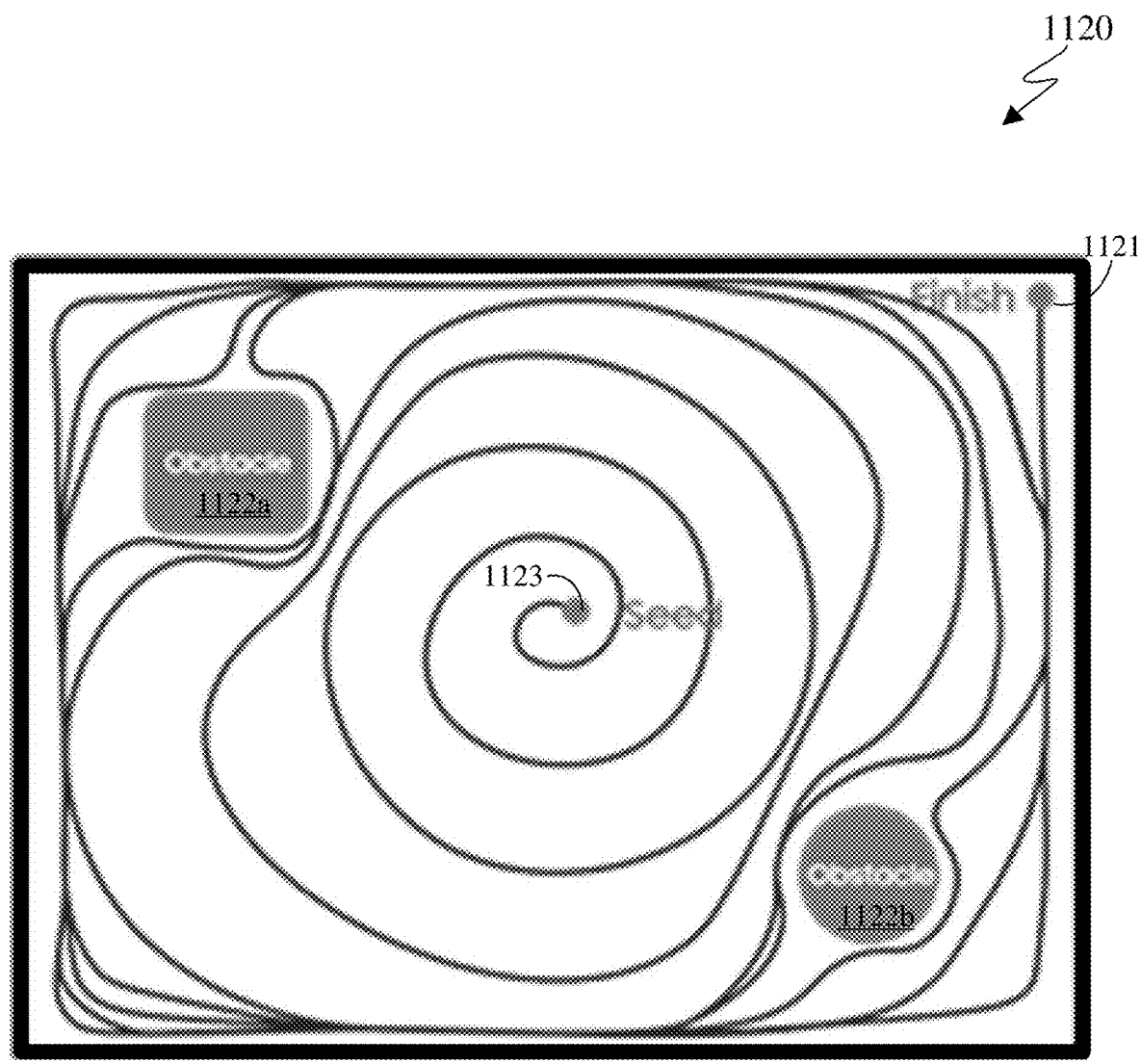
FIG. 11E illustrates an example diagram of the electronic device performing both boundary and obstacle mapping based on a spiral pattern in accordance with an embodiment of this disclosure.
Figure 11F:
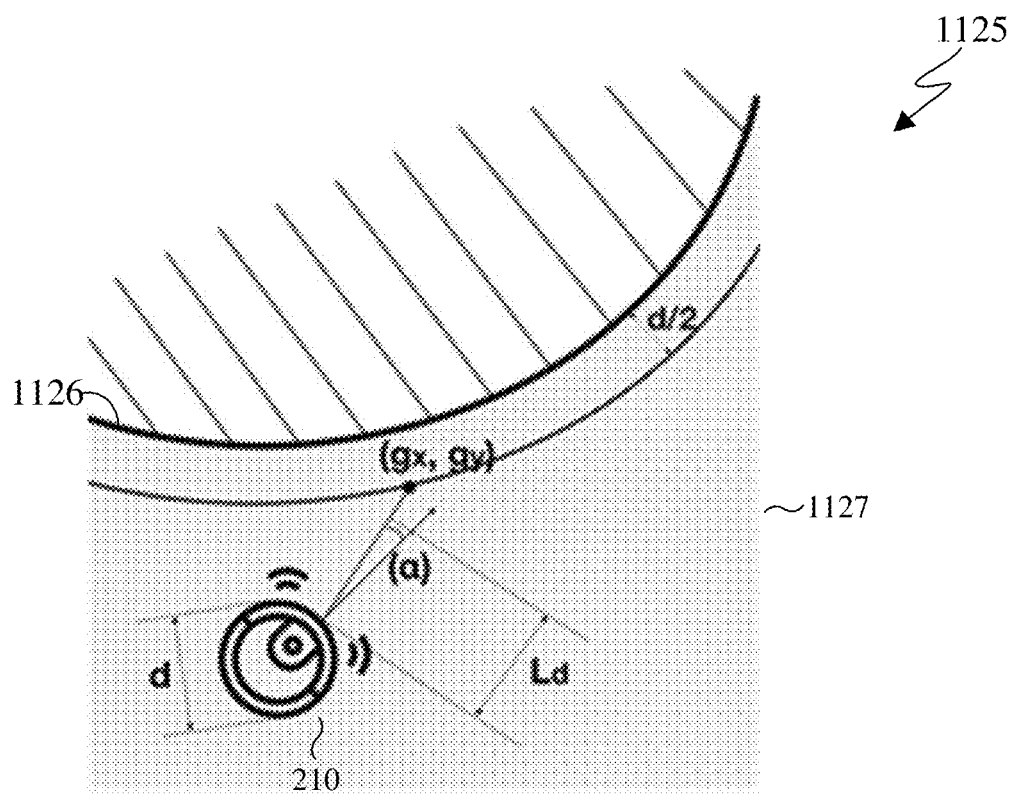
FIG. 11F illustrates an example diagram for detecting the boundary of the area in accordance with an embodiment of this disclosure.
Figure 11G:
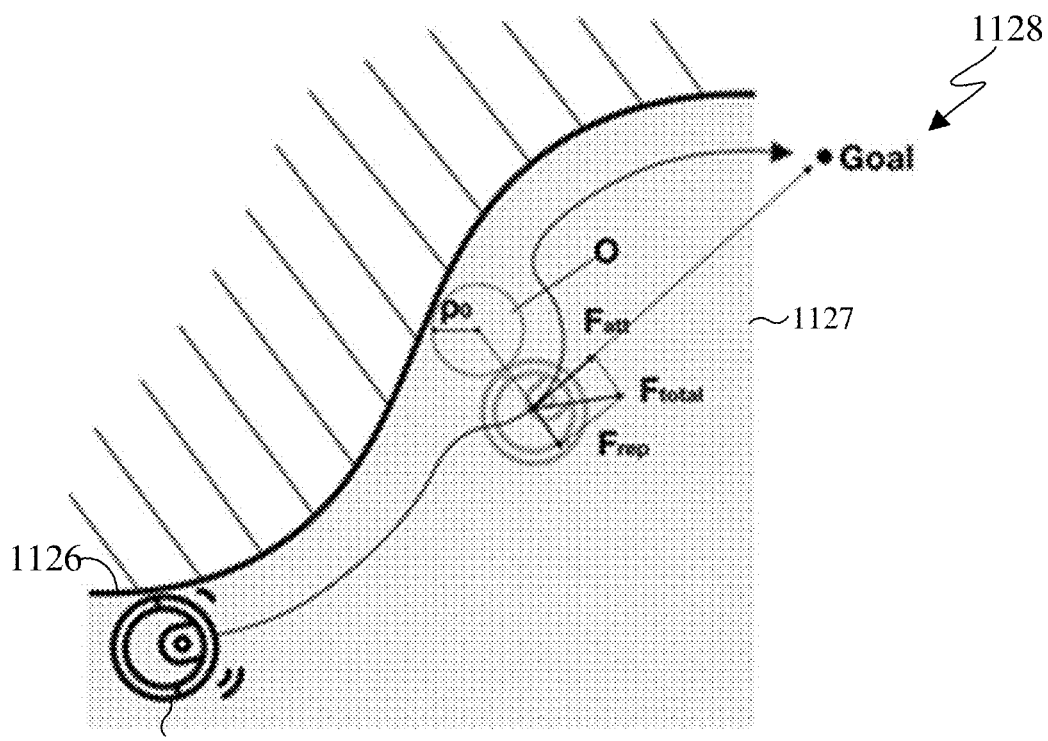
FIG. 11G illustrates an example diagram for detecting obstacles in accordance with an embodiment of this disclosure.
Figure 11H:
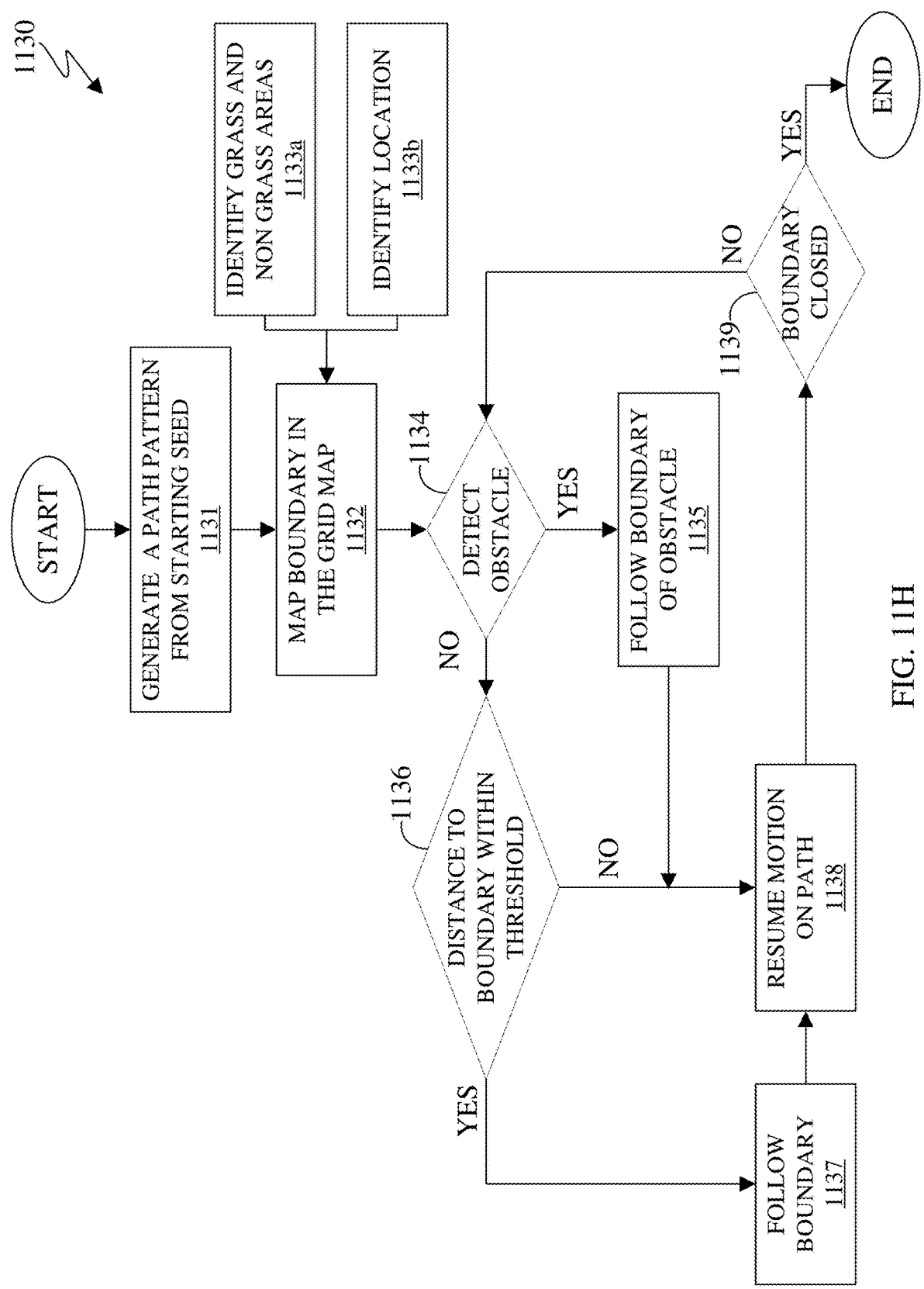
FIG. 11H illustrates an example method for boundary and obstacle mapping in accordance with an embodiment of this disclosure.
Figure 11I:
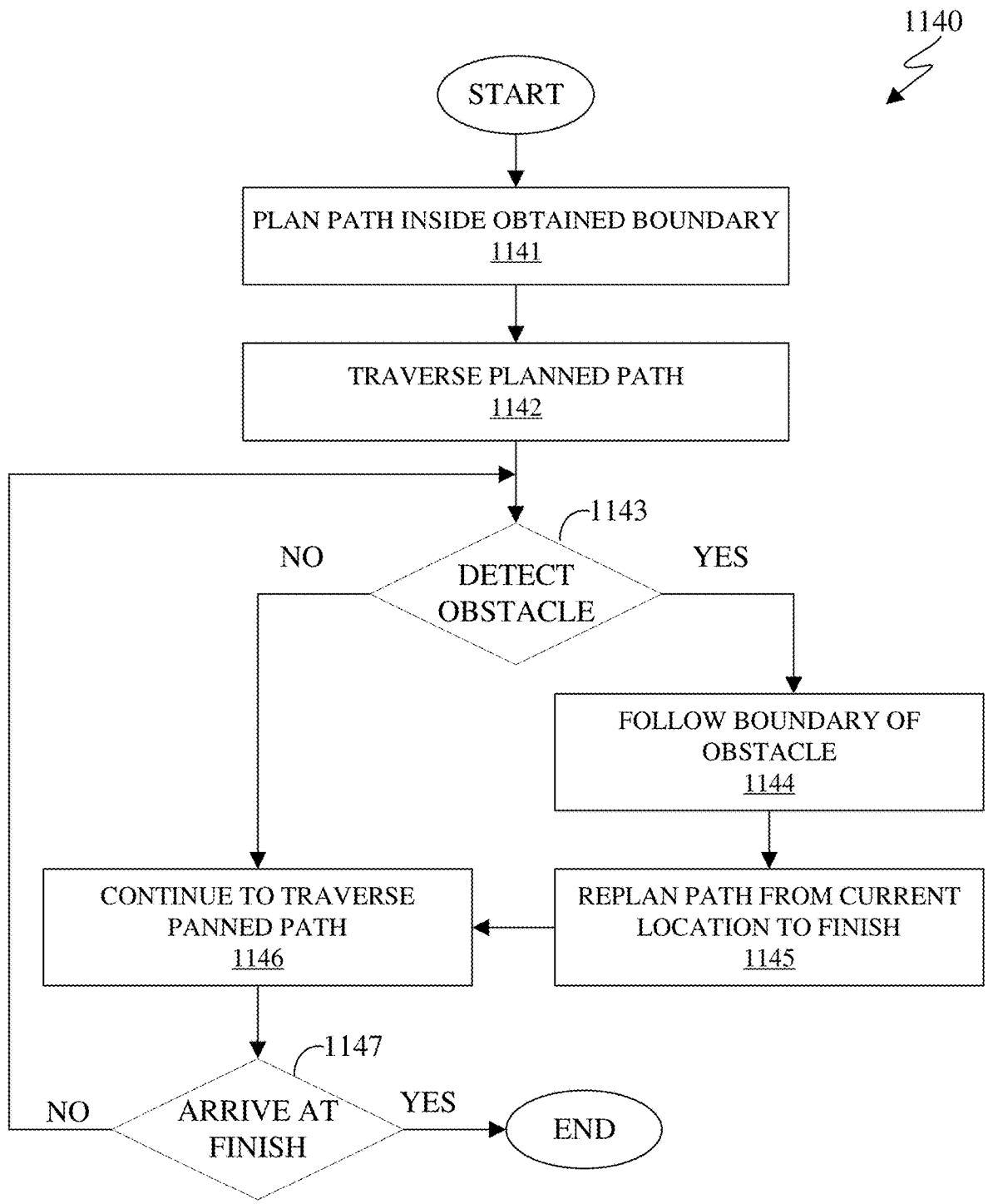
FIG. 11I illustrates an example method for obstacle mapping in accordance with an embodiment of this disclosure.
Figure 11J:
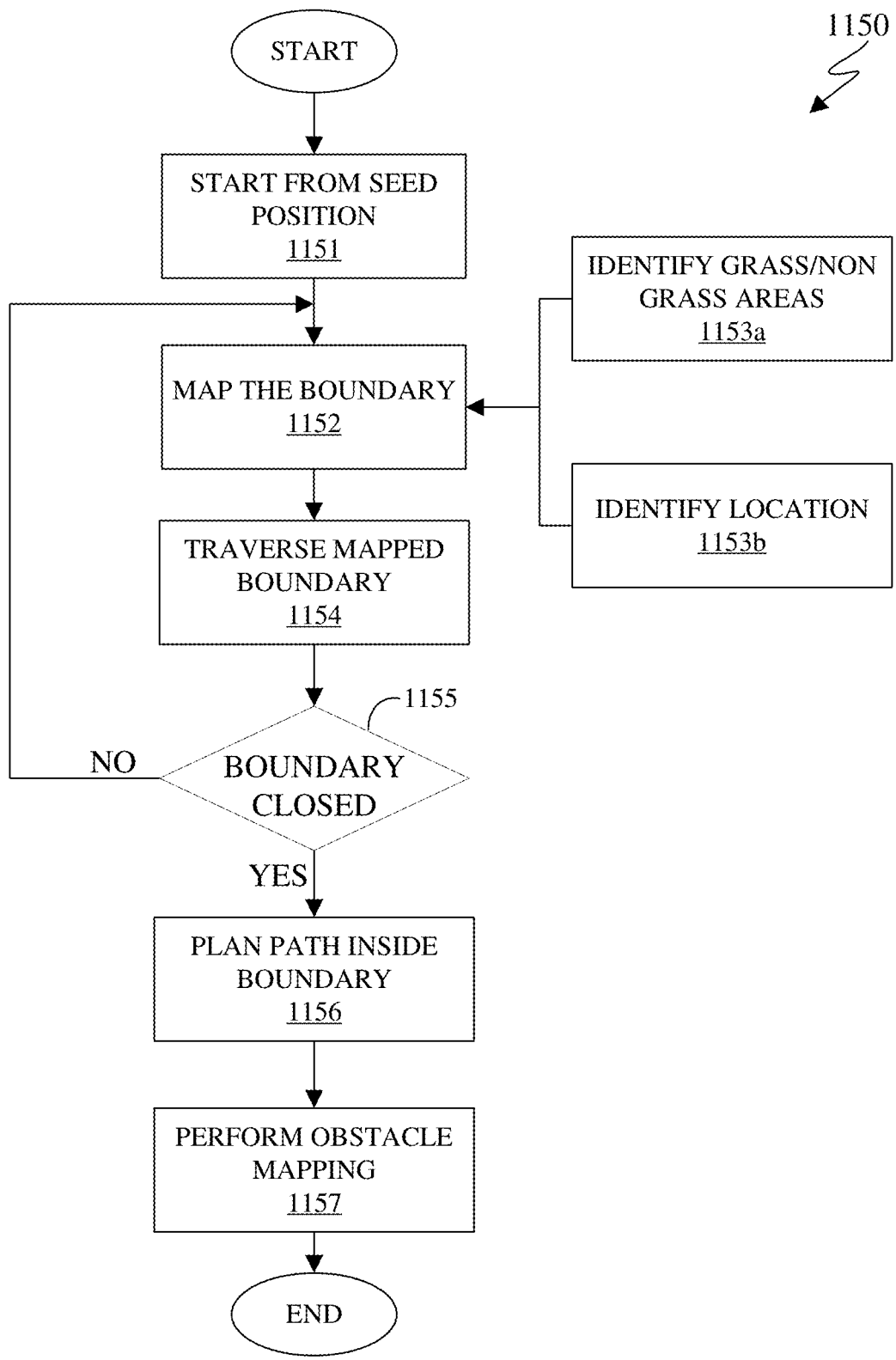
FIGS. 11J, 11K, and 11L illustrate example methods for boundary mapping in accordance with an embodiment of this disclosure.
Figure 11K:
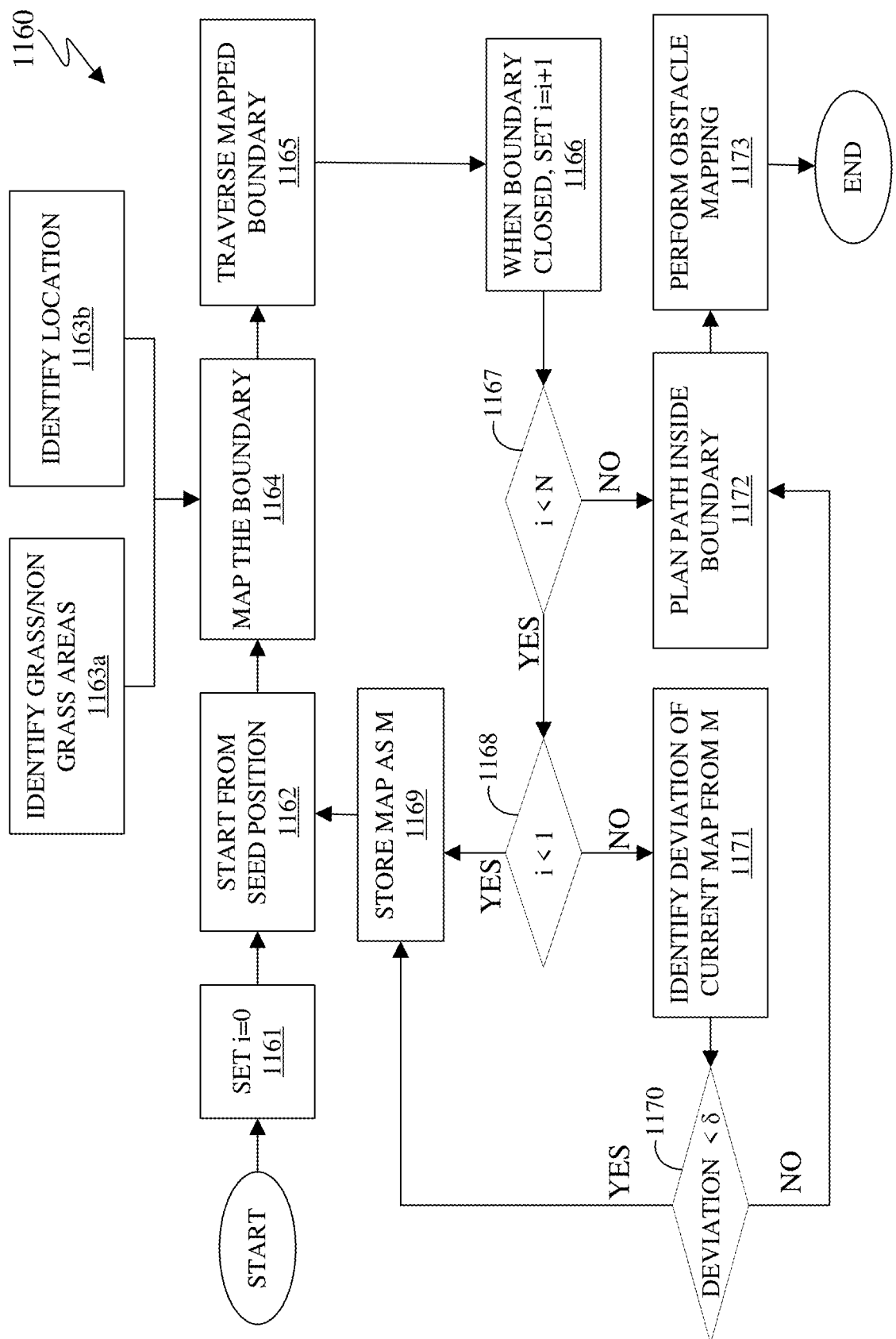
Figure 11L:
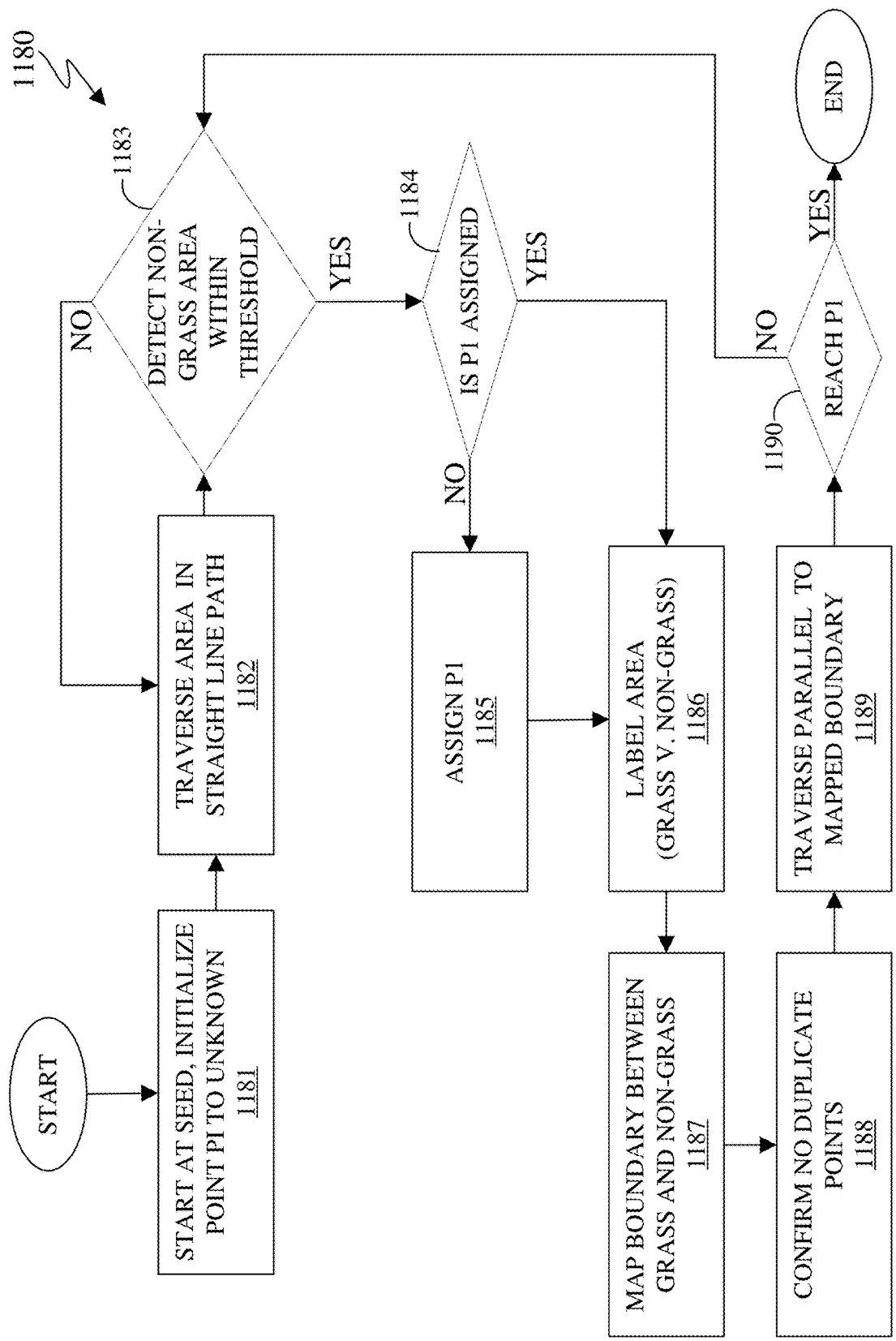

FIGS. 11A-11L describe various embodiments for boundary and obstacle detection in accordance with an embodiment of this disclosure. FIGS. 11A and 11B illustrate example methods 1100*a* and 1100*b* for mapping an area in accordance with an embodiment of this disclosure. FIG. 11C illustrates an example of an area 1110 with multiple sections with a seed point in accordance with an embodiment of this disclosure. FIG. 11D illustrates an example diagram 1115 of an electronic device identifying certain areas in accordance with an embodiment of this disclosure. FIG. 11E illustrates an example diagram 1120 of the electronic device performing both boundary and obstacle mapping based on a spiral pattern in accordance with an embodiment of this disclosure. FIG. 11F illustrates an example diagram 1125 for detecting the boundary of the area in accordance with an embodiment of this disclosure. FIG. 11G illustrates an example diagram 1128 for detecting obstacles in accordance with an embodiment of this disclosure. FIG. 11H illustrates an example method 1130 for boundary and obstacle mapping in accordance with an embodiment of this disclosure. FIG. 11I illustrates an example method 1140 for obstacle mapping in accordance with an embodiment of this disclosure. FIGS. 11J, 11K, and 11L illustrate example methods 1150, 1160, and 1180 for boundary mapping in accordance with an embodiment of this disclosure. The methods 1100*a*, 1100*b*, 1130, 1140, 1150, 1160, and 1180 can be performed by the electronic device 100 of FIG. 1 and localization generator of the electronic device 210 of FIG. 2C. For ease of explanation, methods 1100*a*, 1100*b*, 1130, 1140, 1150, 1160, and 1180 is performed by the electronic device 210.

Embodiments of the present disclosure take into consideration that the coverage path planning in electronic devices (such as an autonomous lawn mower, an autonomous vacuum cleaner, an autonomous mop, and the like) involves coming up with a path such that the electronic devices are made to move over all desired points in space. An example coverage path planning is boustrophedon or back-and-forth path planning such as the path 706*c* of FIG. 7A. For example, the electronic device 210 travels in deterministic patterns to cover the entire area 702*c* of FIG. 7A. However, to plan the pattern, the electronic device 210 should be aware of the boundary of the lawn and the location of permanent or static obstacles. The simplest way to determine the lawn boundary is to manually measure the boundary. Another common practice is wire installation on the lawn boundary that aids detection of edges. Manually teaching the boundary to the electronic device by making it go along the edges and using a sensor to localize it is another way of measuring the boundary. Sometimes a network of sensors is installed at the boundary which can be used to identify the edges of the lawn. Embodiments of this disclosure, the electronic device 210 learns the boundary of the lawn and location of permanent obstacles before planning the motion without the installation of additional sensors or wires along the boundary of the lawn.

In certain embodiments, automatic lawn mapping can be done by performing outside boundary mapping and permanent obstacle mapping at the same time, as described in the method 1100*a* of FIG. 11A. In certain embodiments, automatic lawn mapping can be done by dividing the steps of the method 1100*a* into sequential steps, that of identifying the outside boundary and then detecting and mapping the permanent obstacles in the lawn, as described in the method 1100*b* of FIG. 11B.

The method 1100*a* describes the process of automatic lawn mapping by performing outside boundary mapping and permanent obstacle mapping at the same time. In step 1101, the electronic device 210 starts driving from a start position. The start position can be referred to as a seed or seed position. While driving the electronic device 210, in step 1102, maintains a predefined path, such as a back and forth path (the path 706*c* of FIG. 7A) or a spiral path (the path 706*b* of FIG. 7A). While driving and maintaining the predefined path, the electronic device 210, in step 1103, performs both boundary mapping and obstacle mapping. The method 1130 of FIG. 11H, discussed in greater detail below, further describes the method 1100*a*.

That is, during the method 1100*a*, the electronic device 210 performs boundary and obstacle mapping during a single predefined path. For example, electronic device 210 starts at the seed of the lawn. It follows a pattern, which can be spiral or a back and forth pattern. The location of the electronic device 210 can be estimated using a sensor or fusion of sensors, for example, ultra-wide band (UWB), inertial measurement units (IMU) and wheel encoders. While following the pattern the electronic device 210 detects obstacles using additional sensors such as LiDAR or camera. While traveling the electronic device 210 performs the method 1140 of FIG. 11I and described in the diagram 1128 of FIG. 11G. to go around the obstacle and resume the patterned path. When the electronic device 210 approaches a boundary, it follows the path parallel to the boundary based on the method 1160 of FIG. 11K and the diagram 1125 of FIG. 11F until it is able to resume the pattern.

The method 1100*b* describes the process of automatic lawn mapping by performing outside boundary mapping and then performing the obstacle mapping. In step 1105, the electronic device 210 starts driving from a start position. The start position can be referred to as a seed or seed position. From the start position, the electronic device 210 travels to a boundary of the area. In step 1106, the electronic device 210 maps the outside boundary. For example, the electronic device 210 travels around the perimeter of the area. In step 1107, the electronic device 210 generates a path inside the boundary. The generated path could be path could be a back and forth path (the path 706c of FIG. 7A) or a spiral path (the path 706b of FIG. 7A). In step 1108, the electronic device 210 then travels along the generated path and performs permanent obstacle mapping inside the area.

That is, during the method 1100a, the electronic device 210 performs boundary and obstacle mapping separately. The boundary mapping is performed first, followed by obstacle mapping. In certain embodiments, boundaries can be identified by starting the electronic device 210 at a seed and using a sensor to distinguish between the lawn and non-lawn areas and then making the electronic device 210 follow a path parallel to the detected boundary. After performing a closed loop boundary detection, the electronic device 210 performs permanent obstacle mapping by navigating the electronic device 210 within the detected boundary of the lawn and avoiding the obstacles that come in the way while mapping those onto the grid map.

It is noted that in either case (the method 1100a or 1100b), tf there are multiple sections of the lawn (such as the section 1111 and 1113 of FIG. 11C), each section can be mapped individually, in which case the user can specify the seed points of each section of the lawn, as shown in FIG. 11C. The electronic device 210 starts at a seed point in the lawn, such as the seed 1112 and 1114 of FIG. 11C. The seed point can be any area on the lawn which is specified by the user via a user interface (UI). The electronic device 210 then maps each section individually. After finishing one section of the lawn, the electronic device 210 can either be physically moved to or near another seed point of another section of the yard by the user or if there is a clear path between the seed points of different sections of the yard, the electronic device 210 can plan a path and rely on localization to navigate to the seed of the next section of the yard.

In certain embodiments, boundary detection is performed using a sensor which can distinguish between the lawn and non-lawn areas. As illustrated in the diagram 1115 of FIG. 11D, a camera can be used to identify the area in the field of view 1116 as grass 1117 or non-grass 1118, as shown in FIG. 11D. Some ways of labeling the area as grass 1117 or non-grass 1118 can be hue detection on camera images or some machine learning solutions. Other sensors that can be used for this are light sensors or ultrasonic radar sensors. The patterned motion of the electronic device 210 continues until the electronic device 210 has a complete closed outside boundary.

For the lawn with clear grass and non-grass distinction, the boundary can be detected using camera or light sensors. Alternatively, where no clear boundary can be identified (such as between property lines that are not separated by a fence), a user can manually define the boundaries on the User Interface (UI). For example, the partially defined region is displayed on the graphical user interface (GUI) and the user draws the unclear boundary on the GUI. The electronic device 210 can then directly mark that boundary on the grid map based on the user input before starting to map rest of the boundary edges.

In certain embodiments, the boundary detection process is repeated with different patterns in the multiple runs to converge to a grid map. For example, the first run can be based on spiral pattern, the next run can use a square pattern and so on, until convergence is obtained. Convergence can be obtained when the difference between a new run and a previous run is below a threshold.

The diagram 1120 of FIG. 11E illustrates an example run based on a spiral pattern starting from a seed position 1123.

The electronic device 210 starting from the seed position 1123 starts in a small circle which expands to include the entire lawn. The electronic device 210 avoids the obstacles 1122a and 1122b and then resumes the path until it teaches the finish position at location 1121.

The diagram 1125 of FIG. 11F describes the process of following the boundary of an area 1127. The process of the diagram 1125 can be implemented to do path tracking using feedback controllers such as proportional-integral-derivation controller (PID), linear-quadratic regulator controller (LQR), model predictive controller, pure pursuit controller, etc. For instance, a pure pursuit controller can be used to control the steering angle of mower to track a path.

The speed of electronic device 210 is v(t) and the steering speed δ can be described in Equation (8). In Equation (8), $L_d$ is a look-ahead distance from the current position to the desired path, k is a proportional control gain, and α is the orientation error between the heading of electronic device 210 and the look-ahead vector ($g_x$, $g_y$).

$$\delta(t) = \arctan\left(\frac{2l_d \sin(\alpha)}{kv(t)}\right) \qquad \text{Equation (8)}$$

After performing boundary mapping the electronic device 210 maps the permanent or static obstacles, as illustrated in diagram 1128 of FIG. 11G. That is, the diagram 1128 describes the process of mapping permanent or static obstacles. For example, the electronic device 210 plans a path within the mapped boundary and traverses along the planned path. Whenever the electronic device 210 encounters an obstacle, it goes around the obstacle based on the processes as described in the diagram 1128 of FIG. 11G while mapping it onto the grid map. After mapping the obstacle, the electronic device 210 re-plans the path to go around the obstacle from the current location to the end point.

The process for mapping permanent or static obstacles, as described in the diagram 1128, can be implanted using artificial potential filed (APF), D*, artificial neural network, and the like. The distance between obstacles and electronic device 210 can be measured using ranger sensors such as camera, LiDAR, ultrasonic sensors, and the like. The sum of the attractive force from a goal waypoint and the repulsive forces from obstacles will drive the electronic device 210 to avoid obstacles and move to the desired goal waypoint. Equation (9) describes the attractive force $F_{att}$(x,t). In Equation (9), $k_\alpha$ is a proportional gain, x(t) is the current location of electronic device 210 and $x_d$(t) is the position of the goal waypoint. Equation (10) describes the repulsive force $F_{rep}$ (x,t). In Equation (10) Where $k_r$ is a proportional gain, ρ is the distance between the electronic device 210 and the obstacle, $ρ_0$ is the limit distance of potential filed influence, x is the current position of the electronic device 210 and $x_0$ is the position of shortest obstacle. The sum of $F_{att}$, of Equation (9), and $F_{rep}$, of Equation (10), decides the desired orientation of the electronic device 210.

$$F_{att}(x, t) = -2k_a(x(t) - x_d(t)) \qquad \text{Equation (9)}$$

$$F_{rep}(x) = \begin{cases} k_r\left(\frac{1}{\rho} - \frac{1}{\rho_0}\right)\frac{1}{\rho^3}(x - x_o) & \text{if } \rho < \rho_0 \\ 0 & \text{if } \rho > \rho_0 \end{cases} \qquad \text{Equation (10)}$$

The method 1130 of FIG. 11H describes in detail the method 1100a of FIG. 11A, which the electronic device 210 performs both boundary and obstacle mapping during the same run. In step 1131 the electronic device 210 generates a pattern path starting from a seed position. In step 1132, the electronic device 210 maps the boundary in a grid map. To map the boundary, in step 1133a the electronic device 210 identifies the grass and non-grass areas and in step 1133b, the electronic device 210 identifies its current location within the lawn. In step 1134, the electronic device 210 determines whether it detects an obstacle. When the electronic device 210 detects an obstacle, in step 1135, the electronic device 210 follows the boundary of the obstacle based on the process described in the diagram 1128 of FIG. 11G. thereafter, in step 1138, the electronic device 210 resumes the motion of the planned path.

Alternatively, when the electronic device 210 does not detects an obstacle, in step 1136, the electronic device 210 compares its current distance to a boundary to a threshold. For example, when the distance between electronic device 210 and the boundary is less than the threshold, the electronic device 210 in step 1137 follows the boundary based on the process described in the diagram 1125 of FIG. 11F. When the distance between electronic device 210 and the boundary is greater than the threshold, the electronic device 210 in step 1138 resumes the motion of the path.

After resuming the motion on the path, the electronic device 210 determines, in step 1139, whether the boundary is closed. After determining that the boundary is not closed, the electronic device 210 returns to step 1134. Alternatively, after determining that the boundary is closed, the electronic device 210 saves the generated grid map which includes the boundary and the static obstacles.

The method 1140 of FIG. 11I, the method 1150 of FIG. 11J, the method 1160 of FIG. 11K, and the method 1180 of FIG. 11L describes the process of identifying the boundary and obstacles separately, similar to the method 1100b of FIG. 11B. For example, after identifying the boundary using any of the methods 1150, 1160, and 1180, the electronic device 210 identifies the obstacles within the boundary based on the method 1140.

The method 1140 of FIG. 11I describes the process of identifying obstacles within an area after the boundary is identified. For example, after performing boundary mapping, the electronic device 210 plans a path inside the obtained boundary based on any path planning solution, described above. While navigating through that path, electronic device 210 can map the permanent obstacles in the lawn based on the method 1140. It is noted that for automatic mapping of lawn boundaries and permanent obstacles, it is important to ensure that the lawn is free of any temporary obstacles, such as toys, animals, and the like to prevent them from being mapped as permanent obstacle.

In certain embodiments, the permanent obstacle avoidance can be iterative to avoid obstacles by running the electronic device on the planned path multiple times until a stable map is obtained. This will ensure removal of static obstacles in the map if they exist.

In step 1141, the electronic device 210 obtains the previously generated boundary mapping and then plans a path inside the obtained boundary. In step 1142, the electronic device 210 traverses the planned path. In step 1143, the electronic device 210 determines whether an obstacle is detected. When an obstacle is not detected, the electronic device 210, in step 1146, continues on its planned path. When an obstacle is detected, the electronic device 210, in step 1144, follows the boundary of the obstacle while mapping it in the grid map. the electronic device 210 can follow the obstacle using the process described above in FIG. 11G. After following the boundary of the obstacle, the electronic device 210, in step 1145, replaces a path from its current location to the finish point. The electronic device 210 the continues on the re-planned path in step 1146.

In step 1147, the electronic device 210 determines whether it arrived at the finish location. If the electronic device 210 arrived at the finish location, the obstacle mapping is complete. Alternatively, if the electronic device 210 did not arrived at the finish location, the electronic device 210 determines whether an obstacle is detected in step 1143 and repeats the steps until the electronic device 210 arrived at the finish location.

The method 1150, 1160, and 1180 of FIGS. 11J, 11K, and 11L, respectively, describes the process of identifying the boundary. For example, the method 1150 of FIG. 11J uses cameras or other sensors to identify the area in the field of view as grass or non-grass. The location of the electronic device 210 can be estimated using a sensor or fusion of sensors. Based on the current location and separation between the grass and non-grass areas on the image, the boundary of the lawn can be marked in the grid map. The electronic device 210 then follows the mapped boundary based on the process described in FIG. 11F and go around the boundary to map the entire lawn boundary.

In step 1151 starts driving from a seed position and maps. In step 1152, the electronic device 210 maps the boundary in a grid map. To map the boundary, in step 1153a the electronic device 210 identifies the grass and non-grass areas and in step 1153b, the electronic device 210 identifies its current location within the lawn. In step 1154, the electronic device 210 travers the mapped boundary based on the process described in FIG. 11F. In step 1155, the electronic device 210 determines whether the boundary is closed. When the boundary is not closed, the electronic device 210 returns to step 1152 to map the boundary. Alternatively, when the boundary is closed, electronic device 210 plans a path inside the identified boundary. In step 1157, the electronic device 210 performs obstacle mapping. In certain embodiments, the obstacle mapping is based on the method 1140 of FIG. 11I.

For another example, the method 1160 of FIG. 11K, describes a variation of the method 1150 when the sensor that is providing location estimates is not very accurate, or when the labeling of grass and non-grass areas has uncertainties. The method 1160 is an iterative method. That is, the map obtained in each iteration of the method 1160 is stored and compared to the map obtained in the previous iteration. If the two maps deviate from each other, the process continues until the maps converge.

In step 1161, electronic device 210 sets a variable, i, to zero. In step 1162, the electronic device 210 starts driving from a seed position and maps. In step 1164, the electronic device 210 maps the boundary in a grid map. To map the boundary, in step 1163a the electronic device 210 identifies the grass and non-grass areas and in step 1163b, the electronic device 210 identifies its current location within the lawn. In step 1165, the electronic device 210 travers the mapped boundary based on the process described in FIG. 11F. In step 1166, when the boundary is closed, the electronic device 210 sets the value of i, to i+1. In step 1167, the electronic device determines whether the value of i is less than the value of N. When the value of i is greater than or equal to the value of N, then in step 1172, the electronic device 210 plans a path inside the identified boundary.

Alternatively, if the value of i is less than N then the electronic device 210, in step 1168, determines whether the value of i is less than one. When the value of i is greater than or equal to the one, then the electronic device 210 in step 1171, identifies a deviation of the current map from M. In step 1170, the electronic device 210 determines whether the deviation is greater than a threshold. When the deviation is greater than the threshold or when the value of i is less than one, the electronic device 210, in step 1169, stores the map as map M. After storing the map, the electronic device 210 returns to the start position at step 1162.

After planning the path inside the boundary, in step 1172, the electronic device 210, in step 1173, performs obstacle mapping. In certain embodiments, the obstacle mapping is based on the method 1140 of FIG. 11I.

For yet another example, the method 1180 of FIG. 11L, describes a variation of the that can be used in addition to the methods 1150 and 1160. The method 1180 describes when and how to map the boundary. For example, the electronic device 210 follows predefined line path (such as straight line) until it comes close to the boundary. The boundary is detected using camera or other sensors. Whenever the electronic device 210 is at a distance, x, from the boundary, it marks that point as the start point for mapping and starts to follow a path parallel to the boundary. While mapping the points onto the grid map, the electronic device 210 also performs a scan matching of the currently obtained boundary points with the already mapped point in order to avoid any redundancies or thickening of the boundaries. This enables the electronic device 210 to close the loop upon reaching the start point again. The electronic device 210 continues to map the boundary, perform scan matching and moving parallel to the boundary until it reaches the start point after traversing the perimeter.

In step 1181, the electronic device 210 starts from a seed point and initialize a point P1 to unknown. In step 1182, the electronic device 210 travels in a straight line path. In step 1183, the electronic device 210 determines whether a non-grass area is detected at a predefined distance from the electronic device 210. When a non-grass area is not detected, the electronic device 210, continues to travel in a straight line path, of step 1182. When a non-grass area is not detected within a predefined distance from the electronic device 210, in step 1184, the electronic device 210, determines whether P1 is assigned. If P1 is not assigned, in step 1185, the electronic device 210 assigns the current location of the electronic device 210 as P1. After assigning the current location as P1, or determining that P1 is already assigned, the electronic device 210, in step 1186, labels the area in the field of view as grass or non-grass. In step 1187, the electronic device 210 uses the location estimates along the labeled area to map the boundary between the grass and non-grass on the grid map. In step 1188, the electronic device 210 confirms the number of duplicate points. For example, the electronic device 210 performs a scan matching of the new map points labeled as boundary points to the previously mapped points to ensure there is no duplication of points letting to extended boundaries. In step 1189, the electronic device 210 travers parallel to the mapped boundary. In step 1190, the electronic device 210 determines whether it reached the point P1. When the electronic device 210 reaches the point P1 the boundary detecting process concludes. Alternatively, when the electronic device 210 does not reach the point P1, the method returns to step 1183.

Although FIGS. 11A through 11L illustrate example methods and diagrams, various changes may be made to FIGS. 11A through 11L. For example, while shown as a series of steps, various steps in any of the methods 1100a, 1100b, 1130, 1140, 1150, 1160, and 1180 could overlap, occur in parallel, or occur any number of times.

Figure 12:
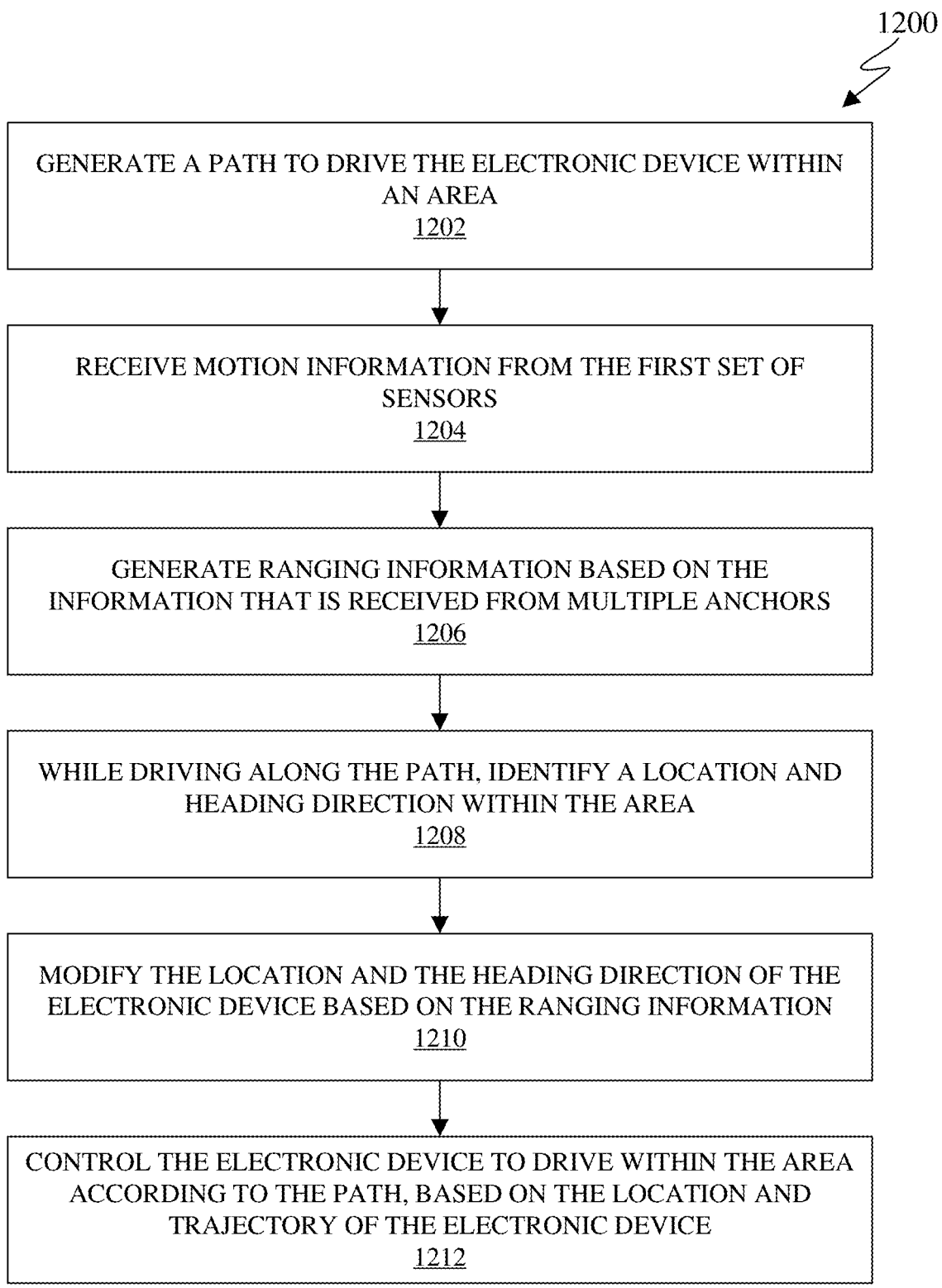
FIG. 12 illustrates an example method for controlling an electronic device in accordance with an embodiment of this disclosure.

FIG. 12 illustrates an example method 1200 for controlling an electronic device in accordance with an embodiment of this disclosure. The methods 1100a, 1100b, 1130, 1140, 1150, 1160, and 1180 can be performed by the electronic device 100 of FIG. 1 and localization generator of the electronic device 210 of FIG. 2C. For ease of explanation, methods 1200 is performed by a processor, such as the processor 140 the electronic device 210.

In step 1202, the processor 140 generates a path to drive the electronic device within the area. To generate the path the electronic device includes additional sensors for detecting obstacles.

In certain embodiments, while the electronic device is driving the along the path, the processor 140 determines whether the obstacle blocks the path. in response to a determination that the obstacle blocks the path, the processor 140 controls the electronic device to stop driving for a predetermined period of time. In response to a determination that the obstacle did not move after the predetermined period of time, the processor 140 modifies the path to avoid the obstacle in order to resume on the path.

In certain embodiments, the processor 140 controls the electronic device to drive within the area from a start location to an end location according to the path. Upon reaching the end location, the processor 140 identifies one or more areas that were not traversed. The processor 140 the generates a new path drive the electronic device to traverse the one or more areas that were not traversed.

The processor 140 can also identify missed areas after the electronic device traverses an area. For example, the processor 140 generates a map of the area, based on the location and the trajectory of the electronic device as the electronic device traverses the area. In response to the electronic device arriving at the end location, the processor 140 divides the map into a plurality of cells. The processor 140 provides a first flag to a first portion of the plurality of cells that correspond to portions of the map that the electronic device traversed and provides a second flag to a second portion of the plurality of cells that correspond to the one or more areas that were not traversed, the second flag identifies missed regions. The processor 140 then clusters the missed regions into circles of different radius and.

The processor 140 can also control the electronic device to revisit the missed regions. For example, the processor 140 generates a list of the missed regions in the area to determine an order in which the missed regions are visited by the electronic device. The processor 140 controls the electronic device to drive to a center position of a first missed region that is included in the list based on the determined order. In response to a determination that the electronic device is located at the center position of the first missed region, the processor 140 control the electronic device to drive in a predefined trajectory through the first missed region. In response to a determination that an obstacle prevents the electronic device from reaching the center position of the first missed region, the processor controls the electronic device to drive the electronic device to another missed region of the missed regions included in the list based on the determined order or control the electronic device to drive the electronic device to the end location, upon a detection of a triggering event.

In step 1204, the processor 140 receives the motion information from the first set of sensors. The first set of sensors can include an IMU and a wheel encoder. The motion information includes linear velocity and angular velocity.

In step 1206, the processor 140 generate ranging information. The ranging information is based on the information that is received from multiple anchors, via a second set of sensors. The anchors are positioned at fixed locations throughout an area, such as a yard.

In step 1208, while the electronic device 210 is driven along the path, the processor 140 identifies a location and heading direction within the area of the electronic device based on the motion information.

In certain embodiments, the processor 140 identifies a first distance traveled based on the motion information from the wheel encoder sensor, a second distance traveled based on the motion information from the inertial measurement sensor, and a third distance traveled based on the ranging information from the second set of sensors (via the step 1208). If the first distance traveled is larger than either the second distance traveled or the third distance traveled, the processor, identifies that the location and the heading direction of the electronic device based on the inertial measurement sensor and the second set of sensors while not using the wheel encoder sensor.

In step 1210, processor 140 modifies the location and the heading direction of the based on the ranging information. In certain embodiments, the processor 140 identifies a first location of the electronic device within the area based on the first set of sensors and the second set of sensors. While the first location is identified, the processor 140 identifies a second location of the electronic device within the area based on the second set of sensors. The processor 140 then compares a difference between a first attribute based on the first location and a second attribute based on the second location to a threshold, wherein the first and second attributes are headings, locations, or times. The processor then determines whether to use the first location or the second location based on the comparison.

In step 1212, processor 140 controls the electronic device to drive within the area according to the path, based on the location and the heading direction of the electronic device. In certain embodiments, when the electronic device drives within the area and approaches a border, the processor 140 can identify a boundary type of the boundary line based on a sensor. The sensor can be a camera and a grass detector. In response to a determination that the boundary type is a soft boundary, the processor 140 controls the electronic device to drive the electronic device over and along the boundary line. In response to a determination that the boundary type is a hard boundary, the processor 140 controls the electronic device to drive the electronic device a threshold distance from the boundary line within the area.

In certain embodiments, the processor 140 controls the electronic device, via a drive system to drive along a perimeter of the lawn and generate a grid map of the lawn. After the grid map is generated, the processor 140 controls the drive system to drive the electronic device within the perimeter of the lawn along a predefined path. In response to a determination that an obstacle blocks the predefined path, the processor 140 controls the drive system to drive the electronic device around the obstacle. The obstacle can be a static or dynamic obstacle. When the obstacle is static, the location of the obstacle is used when generating the path of step 1202. While the drive system drives the electronic device around the obstacle, the processor 140 includes the obstacle in the grid map. After the drive system drives the electronic device around the obstacle, the processor 140 control the drive system to resume driving the electronic device along the predefined path within the perimeter of the lawn.

In certain embodiments, the processor 140 can perform a power management function with respect to the anchors. For example, the processor 140 can identify a distance between the second set of sensors and each of the multiple anchors. The processor 140 then determines that the distance between the second set of sensors and a one or more of the multiple anchors is larger than a threshold distance. The processor 140 can then transmit, to at least one of the multiple anchors, a message indicating that the one or more anchors are to enter or exit a power saving mode.

Although FIG. 12 illustrates example methods and diagrams, various changes may be made to FIG. 12. For example, while shown as a series of steps, various steps in any of the method 1200 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a first set of sensors configured to generate motion information;
a second set of sensors configured to receive information from multiple anchors positioned at fixed locations throughout an area; and
a processor operably connected to the first set of sensors and the second set of sensors, the processor configured to:
generate a path to drive the electronic device within the area, the path configured to substantially cover the area, the path having a start location and an end location,
receive the motion information from the first set of sensors,
determine whether a wheel of the electronic device is slipping based on the motion information,
generate ranging information based on the information that is received, via the second set of sensors, from the multiple anchors,
while the electronic device is driven along the path, identify a location and heading direction within the area of the electronic device based on a subset of the motion information, wherein the subset of the motion information comprises a first subset of the motion information in response to a determination that the wheel of the electronic device is slipping or a second subset of the motion information in response to a determination that the wheel of the electronic device is not slipping,
modify the identified location and heading direction of the electronic device based on the ranging information, control the electronic device to drive within the area from the start location to the end location according to the path, based on the modified location and heading direction of the electronic device, upon the electronic device reaching the end location, identify one or more missed portions of the area that were not traversed, and generate a new path for the electronic device to traverse the one or more missed portions of the area that were not traversed.

2. The electronic device of claim 1, wherein:

the first set of sensors includes an inertial measurement sensor and a wheel encoder sensor;

the motion information, that is obtained from the first set of sensors, includes linear velocity and angular velocity; and the processor is further configured to:
identify a first distance traveled based on the motion information from the wheel encoder sensor,
identify a second distance traveled based on the motion information from the inertial measurement sensor,
identify a third distance traveled based on the ranging information from the second set of sensors, and
in response to a determination, over a period of time, that the first distance traveled is larger than either the second distance traveled or the third distance traveled, identify the location and heading direction of the electronic device based on the inertial measurement sensor and the second set of sensors while not using the wheel encoder sensor.

3. The electronic device of claim 1, wherein the processor is configured to:

identify a first location of the electronic device within the area based on the first set of sensors and the second set of sensors;

while the first location is identified, identify a second location of the electronic device within the area based on the second set of sensors;

compare a difference between a first attribute based on the first location and a second attribute based on the second location to a threshold, wherein the first and second attributes are headings, locations, or times; and determine whether to use the first location or the second location based on the comparison.

4. The electronic device of claim 1, wherein:

the electronic device comprises a third set of sensors configured to detect an obstacle; and the processor is configured to:
while the electronic device is driving along the path, determine whether the obstacle blocks the path,
in response to a determination that the obstacle blocks the path, control the electronic device to stop driving for a predetermined period of time,
in response to a determination that the obstacle did not move after the predetermined period of time, modify the path to avoid the obstacle in order to resume on the path.

5. The electronic device of claim 1, wherein the processor is configured to:

generate a map of the area, based on the location and a trajectory of the electronic device as the electronic device traverses the area;

in response to the electronic device arriving at the end location, divide the map into a plurality of cells;

provide a first flag to a first portion of the plurality of cells that correspond to portions of the map that the electronic device traversed;

provide a second flag to a second portion of the plurality of cells that correspond to the one or more missed portions of the area that were not traversed, the second flag identifying missed regions;

cluster the missed regions into circles of different radius; and control the electronic device to revisit the missed regions.

6. The electronic device of claim 5, wherein the processor is configured to:

generate a list of the missed regions in the area to determine an order in which the missed regions are visited by the electronic device, control the electronic device to drive to a center position of a first missed region that is included in the list based on the determined order, in response to a determination that the electronic device is located at the center position of the first missed region, control the electronic device to drive in a predefined trajectory through the first missed region, and in response to a determination that an obstacle prevents the electronic device from reaching the center position of the first missed region, control the electronic device to drive the electronic device to another missed region of the missed regions included in the list based on the determined order or control the electronic device to drive the electronic device to the end location, upon a detection of a triggering event.

7. The electronic device of claim 1, wherein:

the electronic device further comprises a third set of sensors that includes at least one of a camera and a grass detector; and the processor is configured to:
in response to the electronic device approaching a boundary line, determine a boundary type of the boundary line based on the third set of sensors;
in response to a determination that the boundary type is a soft boundary, control the electronic device to drive the electronic device over and along the boundary line; and
in response to a determination that the boundary type is a hard boundary, control the electronic device to drive the electronic device a threshold distance from the boundary line within the area.

8. The electronic device of claim 1, wherein the processor is configured to:

identify a distance between the second set of sensors and each of the multiple anchors;

determine that the distance between the second set of sensors and a one or more of the multiple anchors is larger than a threshold distance; and transmit, to at least one of the multiple anchors, a message indicating that the at least one anchor is to enter or exit a power saving mode, wherein the second set of sensors are positioned on opposite locations on a surface of the electronic device.

9. The electronic device of claim 1, further comprising:

a drive system configured to drive the electronic device throughout a grass covered region of a lawn; and a third set of sensors configured to identify a distance to a border of the grass covered region of the lawn, wherein the processor is configured to:
control the drive system to drive the electronic device along a perimeter of the lawn,
generate a grid map of the lawn,
after the grid map is generated, control the drive system to drive the electronic device within the perimeter of the lawn along a predefined path, in response to a determination that an obstacle blocks the predefined path, control the drive system to drive the electronic device around the obstacle, while the drive system drives the electronic device around the obstacle, include the obstacle in the grid map, after the drive system drives the electronic device around the obstacle, control the drive system to resume driving the electronic device along the predefined path within the perimeter of the lawn, and update the path while drive system drives the electronic device through the grass covered region of the lawn.

10. The electronic device of claim 1, wherein the one or more missed portions of the area were missed by the electronic device due to the electronic device moving around an obstacle along the path.

11. A method for controlling an electronic device, the method comprising:

generating a path to drive the electronic device within an area, the path configured to substantially cover the area, the path having a start location and an end location;

receiving motion information from a first set of sensors;

determining whether a wheel of the electronic device is slipping based on the motion information;

generating ranging information based on information that is received, via a second set of sensors, from multiple anchors that are positioned at fixed locations throughout the area;

while the electronic device is driven along the path, identifying a location and heading direction within the area of the electronic device based on a subset of the motion information, wherein the subset of the motion information comprises a first subset of the motion information in response to a determination that the wheel of the electronic device is slipping or a second subset of the motion information in response to a determination that the wheel of the electronic device is not slipping;

modifying the identified location and heading direction of the electronic device based on the ranging information;

controlling the electronic device to drive within the area from the start location to the end location according to the path, based on the modified location and heading direction of the electronic device;

upon the electronic device reaching the end location, identifying one or more missed portions of the area that were not traversed; and generating a new path for the electronic device to traverse the one or more missed portions of the area that were not traversed.

12. The method of claim 11, wherein:

the first set of sensors includes an inertial measurement sensor and a wheel encoder sensor;

the motion information, that is obtained from the first set of sensors includes linear velocity and angular velocity; and the method further comprises:

identifying a first distance traveled based on the motion information from the wheel encoder sensor, identifying a second distance traveled based on the motion information from the inertial measurement sensor, identifying a third distance traveled based on the ranging information from the second set of sensors, and in response to a determination, over a period of time, that the first distance traveled is larger than either the second distance traveled or the third distance traveled, identifying the location and heading direction of the electronic device based on the inertial measurement sensor and the second set of sensors while not using the wheel encoder sensor.

13. The method of claim 11, further comprising:

identifying a first location of the electronic device within the area based on the first set of sensors and the second set of sensors;

while the first location is identified, identifying a second location of the electronic device within the area based on the second set of sensors;

comparing a difference between a first attribute based on the first location and a second attribute based on the second location to a threshold, wherein the first and second attributes are headings, locations, or times; and determining whether to use the first location or the second location based on the comparison.

14. The method of claim 11, further comprising:

while the electronic device is driving along the path, determining whether an obstacle blocks the path, in response to a determination that the obstacle blocks the path, controlling the electronic device to stop driving for a predetermined period of time, in response to a determination that the obstacle did not move after the predetermined period of time, modifying the path to avoid the obstacle in order to resume on the path.

15. The method of claim 11, further comprising:

generating a map of the area, based on the location and a trajectory of the electronic device as the electronic device traverses the area;

in response to the electronic device arriving at the end location, dividing the map into a plurality of cells;

providing a first flag to a first portion of the plurality of cells that correspond to portions of the map that the electronic device traversed;

providing a second flag to a second portion of the plurality of cells that correspond to the one or more missed portions of the area that were not traversed, the second flag identifying missed regions;

clustering the missed regions into circles of different radius; and controlling the electronic device to revisit the missed regions.

16. The method of claim 15, further comprising:

generating a list of the missed regions in the area to determine an order in which the missed regions are visited by the electronic device, controlling the electronic device to drive to a center position of a first missed region that is included in the list based on the determined order, in response to a determination that the electronic device is located at the center position of the first missed region, controlling the electronic device to drive in a predefined trajectory through the first missed region, and in response to a determination that an obstacle prevents the electronic device from reaching the center position of the first missed region, controlling the electronic device to drive the electronic device to another missed region of the missed regions included in the list based on the determined order or control the electronic device to drive the electronic device to the end location, upon a detection of a triggering event.

17. The method of claim 11, further comprising:

in response to the electronic device approaching a boundary line, determining a boundary type of the boundary line based on a third set of sensors that includes at least one of a camera and a grass detector;

in response to a determination that the boundary type is a soft boundary, controlling the electronic device to drive the electronic device over and along the boundary line; and in response to a determination that the boundary type is a hard boundary, controlling the electronic device to drive the electronic device a threshold distance from the boundary line within the area.

18. The method of claim 11, further comprising:

identifying a distance between the second set of sensors and each of the multiple anchors;

determining that the distance between the second set of sensors and a one or more of the multiple anchors is larger than a threshold distance; and transmitting, to at least one of the multiple anchors, a message indicating that the at least one anchor is to enter or exit a power saving mode, wherein the second set of sensors are positioned on opposite locations on a surface of the electronic device.

19. The method of claim 11, further comprising:

driving the electronic device along a perimeter of a lawn, generating a grid map of the lawn, after the grid map is generated, driving the electronic device within the perimeter of the lawn along a predefined path, in response to a determination that an obstacle blocks the predefined path, driving the electronic device around the obstacle, while driving the electronic device around the obstacle, including the obstacle in the grid map, after driving around the obstacle, resume driving the electronic device along the predefined path within the perimeter of the lawn, and updating the path while driving the electronic device through a grass covered region of the lawn.

20. The method claim 11, wherein the one or more missed portions of the area were missed by the electronic device due to the electronic device moving around an obstacle along the path.

* * * * *